(12) United States Patent
Schnittman et al.

(10) Patent No.: US 8,370,985 B2
(45) Date of Patent: *Feb. 12, 2013

(54) COMPACT AUTONOMOUS COVERAGE ROBOT

(75) Inventors: Mark Schnittman, Cambridge, MA (US); Zivthan A. Dubrovsky, Waltham, MA (US); Jeffrey W. Mammen, Westford, MA (US); Aaron Solochek, Somerville, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,118

(22) Filed: Sep. 26, 2011

(65) Prior Publication Data

US 2012/0011669 A1 Jan. 19, 2012

Related U.S. Application Data

(63) Continuation of application No. 12/118,117, filed on May 9, 2008, now Pat. No. 8,239,992.

(60) Provisional application No. 60/938,699, filed on May 17, 2007, provisional application No. 60/917,065, filed on May 9, 2007.

(51) Int. Cl.
*A47L 11/24* (2006.01)

(52) U.S. Cl. ............ 15/41.1; 15/52.1; 15/319; 15/340.4

(58) Field of Classification Search .................. 15/41.4, 15/46, 52.1, 319, 340.4; 700/23, 258
See application file for complete search history.

(56) References Cited

U.S. PATENT DOCUMENTS

| | | | |
|---|---|---|---|
| 1,755,054 | A | 4/1930 | Darst |
| 1,780,221 | A | 11/1930 | Buchmann |
| 1,970,302 | A | 8/1934 | Gerhardt |
| 2,136,324 | A | 11/1938 | Simon |
| 2,302,111 | A | 11/1942 | Dow et al. |
| 3,457,575 | A | 7/1969 | Bienek |

(Continued)

FOREIGN PATENT DOCUMENTS

| | | |
|---|---|---|
| DE | 19849978 | 2/2001 |
| DE | 10242257 A1 | 4/2003 |

(Continued)

OTHER PUBLICATIONS

Examination report dated Jun. 9, 2011 for corresponding application JP 2010-507685.

(Continued)

*Primary Examiner* — Monica Carter
*Assistant Examiner* — Michael Jennings
(74) *Attorney, Agent, or Firm* — Fish & Richardson P.C.

(57) ABSTRACT

An autonomous coverage robot includes a chassis having forward and rearward portions and a drive system carried by the chassis. The forward portion of the chassis defines a substantially rectangular shape. The robot includes a cleaning assembly mounted on the forward portion of the chassis and a bin disposed adjacent the cleaning assembly and configured to receive debris agitated by the cleaning assembly. A bin cover is pivotally attached to a lower portion of the chassis and configured to rotate between a first, closed position providing closure of an opening defined by the bin and a second, open position providing access to the bin opening. The robot includes a body attached to the chassis and a handle disposed on an upper portion of the body. A bin cover release is actuatable from substantially near the handle.

23 Claims, 30 Drawing Sheets

U.S. PATENT DOCUMENTS

| | | | |
|---|---|---|---|
| 4,004,313 A | 1/1977 | Capra | |
| 4,306,329 A | 12/1981 | Yokoi | |
| 4,369,543 A | 1/1983 | Chen et al. | |
| 4,674,048 A | 6/1987 | Okumura | |
| 4,962,453 A | 10/1990 | Pong et al. | |
| 5,070,567 A | 12/1991 | Holland | |
| 5,109,566 A | 5/1992 | Kobayashi et al. | |
| 5,204,814 A | 4/1993 | Noonan et al. | |
| 5,208,521 A | 5/1993 | Aoyama | |
| 5,279,672 A | 1/1994 | Betker et al. | |
| 5,284,522 A | 2/1994 | Kobayashi et al. | |
| 5,293,955 A | 3/1994 | Lee | |
| 5,321,614 A | 6/1994 | Ashworth | |
| 5,341,540 A * | 8/1994 | Soupert et al. | 15/319 |
| 5,353,224 A | 10/1994 | Lee et al. | |
| 5,369,838 A | 12/1994 | Wood et al. | |
| 5,454,129 A | 10/1995 | Kell | |
| 5,534,762 A | 7/1996 | Kim | |
| 5,537,711 A | 7/1996 | Tseng | |
| 5,555,587 A | 9/1996 | Guha | |
| 5,568,589 A | 10/1996 | Hwang | |
| 5,610,488 A | 3/1997 | Miyazawa | |
| 5,613,261 A | 3/1997 | Kawakami et al. | |
| 5,621,291 A | 4/1997 | Lee | |
| 5,646,494 A | 7/1997 | Han | |
| 5,652,489 A | 7/1997 | Kawakami | |
| 5,682,313 A | 10/1997 | Edlund et al. | |
| 5,696,675 A | 12/1997 | Nakamura et al. | |
| 5,709,007 A | 1/1998 | Chiang | |
| 5,781,960 A | 7/1998 | Kilström et al. | |
| 5,787,545 A | 8/1998 | Colens | |
| 5,841,259 A | 11/1998 | Kim et al. | |
| 5,894,621 A | 4/1999 | Kubo | |
| 5,903,124 A | 5/1999 | Kawakami | |
| 5,911,260 A | 6/1999 | Suzuki | |
| 5,940,930 A | 8/1999 | Oh et al. | |
| 5,947,225 A | 9/1999 | Kawakami et al. | |
| 5,991,951 A | 11/1999 | Kubo et al. | |
| 5,995,883 A | 11/1999 | Nishikado | |
| 5,996,167 A | 12/1999 | Close | |
| 5,998,953 A | 12/1999 | Nakamura et al. | |
| 6,012,618 A | 1/2000 | Matsuo | |
| 6,025,687 A | 2/2000 | Himeda et al. | |
| 6,030,464 A | 2/2000 | Azevedo | |
| 6,076,226 A | 6/2000 | Reed | |
| 6,108,859 A | 8/2000 | Burgoon | |
| 6,112,996 A | 9/2000 | Matsuo | |
| 6,119,057 A | 9/2000 | Kawagoe | |
| 6,138,063 A | 10/2000 | Himeda | |
| 6,142,252 A | 11/2000 | Kinto et al. | |
| 6,276,478 B1 | 8/2001 | Hopkins et al. | |
| 6,321,515 B1 | 11/2001 | Colens | |
| 6,327,741 B1 | 12/2001 | Reed | |
| 6,339,735 B1 | 1/2002 | Peless et al. | |
| 6,430,471 B1 | 8/2002 | Kintou et al. | |
| 6,443,509 B1 | 9/2002 | Levin et al. | |
| 6,459,955 B1 | 10/2002 | Bartsch et al. | |
| 6,493,612 B1 | 12/2002 | Bisset et al. | |
| 6,493,613 B2 | 12/2002 | Peless et al. | |
| 6,553,612 B1 * | 4/2003 | Dyson et al. | 15/340.1 |
| 6,574,536 B1 | 6/2003 | Kawagoe et al. | |
| 6,601,265 B1 | 8/2003 | Burlington | |
| 6,605,156 B1 | 8/2003 | Clark et al. | |
| 6,611,738 B2 | 8/2003 | Ruffner | |
| 6,625,843 B2 | 9/2003 | Kim et al. | |
| 6,671,592 B1 | 12/2003 | Bisset et al. | |
| 6,741,054 B2 | 5/2004 | Koselka et al. | |
| 6,774,596 B1 | 8/2004 | Bisset | |
| 6,841,963 B2 | 1/2005 | Song et al. | |
| 6,883,201 B2 * | 4/2005 | Jones et al. | 15/319 |
| 6,901,624 B2 | 6/2005 | Mori et al. | |
| 6,968,592 B2 | 11/2005 | Takeuchi et al. | |
| 6,999,850 B2 | 2/2006 | McDonald | |
| 7,053,578 B2 | 5/2006 | Diehl et al. | |
| 7,055,210 B2 | 6/2006 | Keppler et al. | |
| 7,079,923 B2 | 7/2006 | Abramson et al. | |
| D526,753 S | 8/2006 | Tani et al. | |
| 7,085,624 B2 | 8/2006 | Aldred et al. | |
| 7,155,308 B2 | 12/2006 | Jones | |
| 7,167,775 B2 | 1/2007 | Abramson et al. | |
| 7,225,500 B2 | 6/2007 | Diehl et al. | |
| 7,248,951 B2 | 7/2007 | Hulden | |
| D548,411 S | 8/2007 | Schroter | |
| 7,318,248 B1 | 1/2008 | Yan | |
| 7,360,277 B2 | 4/2008 | Moshenrose et al. | |
| 7,389,166 B2 | 6/2008 | Harwig et al. | |
| 7,441,298 B2 | 10/2008 | Svendsen et al. | |
| 7,444,206 B2 * | 10/2008 | Abramson et al. | 700/245 |
| 7,474,941 B2 | 1/2009 | Kim et al. | |
| 7,503,096 B2 | 3/2009 | Lin | |
| D593,265 S | 5/2009 | Carr et al. | |
| 7,555,363 B2 | 6/2009 | Augenbraun et al. | |
| 7,568,259 B2 | 8/2009 | Yan | |
| 7,571,511 B2 * | 8/2009 | Jones et al. | 15/319 |
| 7,578,020 B2 | 8/2009 | Jaworski et al. | |
| 7,603,744 B2 | 10/2009 | Reindle | |
| 7,617,557 B2 * | 11/2009 | Reindle | 15/41.1 |
| 7,620,476 B2 | 11/2009 | Morse et al. | |
| 7,636,982 B2 * | 12/2009 | Jones et al. | 15/319 |
| 7,660,650 B2 | 2/2010 | Kawagoe et al. | |
| 7,765,635 B2 | 8/2010 | Park | |
| 7,805,220 B2 | 9/2010 | Taylor et al. | |
| 7,832,048 B2 | 11/2010 | Harwig et al. | |
| 7,849,555 B2 | 12/2010 | Hahm et al. | |
| 2001/0047231 A1 | 11/2001 | Peless et al. | |
| 2002/0011813 A1 | 1/2002 | Koselka et al. | |
| 2002/0016649 A1 | 2/2002 | Jones | |
| 2002/0120364 A1 | 8/2002 | Colens | |
| 2002/0124343 A1 | 9/2002 | Reed | |
| 2003/0030399 A1 | 2/2003 | Jacobs | |
| 2003/0060928 A1 | 3/2003 | Abramson et al. | |
| 2003/0120389 A1 | 6/2003 | Abramson et al. | |
| 2004/0031113 A1 | 2/2004 | Wosewick et al. | |
| 2004/0074038 A1 | 4/2004 | Im et al. | |
| 2004/0074044 A1 | 4/2004 | Diehl et al. | |
| 2004/0085037 A1 | 5/2004 | Jones et al. | |
| 2004/0111821 A1 | 6/2004 | Lenkiewicz et al. | |
| 2004/0117064 A1 | 6/2004 | McDonald | |
| 2004/0187249 A1 | 9/2004 | Jones et al. | |
| 2004/0204792 A1 | 10/2004 | Taylor et al. | |
| 2004/0211444 A1 | 10/2004 | Taylor et al. | |
| 2004/0255425 A1 | 12/2004 | Arai et al. | |
| 2005/0010330 A1 | 1/2005 | Abramson et al. | |
| 2005/0010331 A1 | 1/2005 | Taylor et al. | |
| 2005/0021181 A1 | 1/2005 | Kim et al. | |
| 2005/0085947 A1 | 4/2005 | Aldred et al. | |
| 2005/0150519 A1 | 7/2005 | Keppler et al. | |
| 2005/0166355 A1 | 8/2005 | Tani | |
| 2005/0204717 A1 | 9/2005 | Colens | |
| 2005/0217042 A1 | 10/2005 | Reindle | |
| 2005/0229340 A1 | 10/2005 | Sawalski et al. | |
| 2005/0229355 A1 | 10/2005 | Crouch et al. | |
| 2005/0235451 A1 | 10/2005 | Yan | |
| 2005/0273967 A1 | 12/2005 | Taylor et al. | |
| 2006/0020369 A1 | 1/2006 | Taylor et al. | |
| 2006/0021168 A1 | 2/2006 | Nishikawa | |
| 2006/0042042 A1 | 3/2006 | Mertes et al. | |
| 2006/0064828 A1 | 3/2006 | Stein et al. | |
| 2006/0087273 A1 | 4/2006 | Ko et al. | |
| 2006/0150361 A1 | 7/2006 | Aldred et al. | |
| 2006/0185690 A1 | 8/2006 | Song et al. | |
| 2006/0190146 A1 | 8/2006 | Morse et al. | |
| 2006/0196003 A1 | 9/2006 | Song et al. | |
| 2006/0288519 A1 | 12/2006 | Jaworski et al. | |
| 2007/0006404 A1 | 1/2007 | Cheng et al. | |
| 2007/0032904 A1 | 2/2007 | Kawagoe et al. | |
| 2007/0042716 A1 | 2/2007 | Goodall et al. | |
| 2007/0142964 A1 | 6/2007 | Abramson | |
| 2007/0244610 A1 * | 10/2007 | Ozick et al. | 701/23 |
| 2008/0039974 A1 | 2/2008 | Sandin et al. | |
| 2008/0109126 A1 | 5/2008 | Sandin et al. | |
| 2008/0184518 A1 | 8/2008 | Taylor et al. | |
| 2008/0276407 A1 | 11/2008 | Schnittman et al. | |
| 2008/0282494 A1 | 11/2008 | Won et al. | |
| 2010/0268384 A1 | 10/2010 | Jones et al. | |
| 2010/0312429 A1 | 12/2010 | Jones et al. | |

FOREIGN PATENT DOCUMENTS

| | | |
|---|---|---|
| DE | 102004038074.0 | 6/2005 |
| DE | 102004041021 B3 | 8/2005 |
| DE | 102005046813 A1 | 4/2007 |
| EP | 1 018 315 | 7/2000 |
| EP | 1380245 | 1/2004 |
| EP | 1557730 | 7/2005 |
| GB | 2213047 A | 8/1989 |
| JP | 53-021869 | 2/1978 |
| JP | 53110257 A2 | 9/1978 |
| JP | 57014726 A2 | 1/1982 |
| JP | 59033511 U | 3/1984 |
| JP | 59-120124 | 7/1984 |
| JP | SHO 59-120124 | 7/1984 |
| JP | 2283343 A2 | 11/1984 |
| JP | 60089213 | 5/1985 |
| JP | 61023221 A2 | 1/1986 |
| JP | 62-164431 | 7/1987 |
| JP | 63-158032 | 1/1988 |
| JP | SHO 63-079623 | 4/1988 |
| JP | 63-158032 | 7/1988 |
| JP | SHO 63-158032 | 7/1988 |
| JP | 63-079623 | 9/1988 |
| JP | 2006312 U1 | 1/1990 |
| JP | 2006312 Y2 | 2/1990 |
| JP | 3051023 A2 | 3/1991 |
| JP | 5-042076 | 2/1993 |
| JP | 5046246 | 2/1993 |
| JP | 5054620 | 3/1993 |
| JP | 5091604 A2 | 4/1993 |
| JP | 5054620 U | 7/1993 |
| JP | 6026312 | 2/1994 |
| JP | 6-105781 | 4/1994 |
| JP | 6026312 U | 4/1994 |
| JP | 7059702 A2 | 3/1995 |
| JP | 7129239 A | 5/1995 |
| JP | 7222705 A2 | 8/1995 |
| JP | 7281742 A2 | 10/1995 |
| JP | 7281752 A | 10/1995 |
| JP | 7102204 | 11/1995 |
| JP | 7295636 A | 11/1995 |
| JP | 7311041 A2 | 11/1995 |
| JP | 7313417 A | 12/1995 |
| JP | 7319542 A2 | 12/1995 |
| JP | 8000393 B2 | 1/1996 |
| JP | 8016241 A2 | 1/1996 |
| JP | 8016776 B2 | 2/1996 |
| JP | 8063229 A2 | 3/1996 |
| JP | 8083125 A2 | 3/1996 |
| JP | 8089451 A | 4/1996 |
| JP | 2520732 B2 | 5/1996 |
| JP | 8152916 A2 | 6/1996 |
| JP | 8-089449 | 9/1996 |
| JP | 8256960 A2 | 10/1996 |
| JP | 8286741 A2 | 11/1996 |
| JP | 8286744 A2 | 11/1996 |
| JP | 8322774 A2 | 12/1996 |
| JP | 9047413 A | 2/1997 |
| JP | 9160644 A2 | 6/1997 |
| JP | 9179625 A | 7/1997 |
| JP | 9179625 A2 | 7/1997 |
| JP | 9179685 A2 | 7/1997 |
| JP | 9192069 A2 | 7/1997 |
| JP | 9204223 A2 | 8/1997 |
| JP | 9206258 A | 8/1997 |
| JP | 9206258 A2 | 8/1997 |
| JP | 09251318 | 9/1997 |
| JP | 9251318 A | 9/1997 |
| JP | 9265319 A | 10/1997 |
| JP | 9269807 A | 10/1997 |
| JP | 9269810 A | 10/1997 |
| JP | 9319431 A2 | 12/1997 |
| JP | 9319432 A | 12/1997 |
| JP | 9319434 A | 12/1997 |
| JP | 9325812 A | 12/1997 |
| JP | 10117973 A2 | 5/1998 |
| JP | 10214114 A2 | 8/1998 |
| JP | 10228316 | 8/1998 |
| JP | 10240342 A2 | 9/1998 |
| JP | 10260727 A2 | 9/1998 |
| JP | 11065655 A2 | 3/1999 |
| JP | 11085269 A2 | 3/1999 |
| JP | 11102219 A2 | 4/1999 |
| JP | 11212642 A2 | 8/1999 |
| JP | 11346964 A2 | 12/1999 |
| JP | 10240343 A2 | 5/2000 |
| JP | 2000353014 A2 | 12/2000 |
| JP | 2001022443 | 1/2001 |
| JP | 2001087182 | 4/2001 |
| JP | 2001258807 A | 9/2001 |
| JP | 2001275908 A | 10/2001 |
| JP | 2002532178 A | 10/2002 |
| JP | 2002323925 A | 11/2002 |
| JP | 03356170 B1 | 12/2002 |
| JP | 2002355206 A | 12/2002 |
| JP | 2002360471 A | 12/2002 |
| JP | 2002360482 A | 12/2002 |
| JP | 2002369778 A2 | 12/2002 |
| JP | 03375843 B2 | 2/2003 |
| JP | 2003036116 | 2/2003 |
| JP | 2003038401 A | 2/2003 |
| JP | 2003038402 A | 2/2003 |
| JP | 2003505127 A | 2/2003 |
| JP | 2003- 190064 | 7/2003 |
| JP | 2003190064 A2 | 7/2003 |
| JP | 2003310509 | 11/2003 |
| JP | 2004148021 | 5/2004 |
| JP | 2004-166968 | 6/2004 |
| JP | 2004174228 | 6/2004 |
| JP | 2005-224265 | 8/2005 |
| JP | 2005346700 A2 | 12/2005 |
| JP | 2006-164223 | 6/2006 |
| WO | WO0036962 A1 | 6/2000 |
| WO | WO0038026 A1 | 6/2000 |
| WO | WO0038028 A1 | 6/2000 |
| WO | WO0038029 A1 | 6/2000 |
| WO | WO0106904 A1 | 2/2001 |
| WO | WO0106905 A9 | 6/2001 |
| WO | WO01/80703 | 11/2001 |
| WO | WO0239868 A1 | 5/2002 |
| WO | WO02062194 A1 | 8/2002 |
| WO | WO02/067752 | 9/2002 |
| WO | WO02/071175 | 9/2002 |
| WO | WO 03/002492 | 2/2003 |
| WO | WO03/024292 | 3/2003 |
| WO | WO03040846 A1 | 5/2003 |
| WO | WO03026474 A3 | 11/2003 |
| WO | WO2004043215 A1 | 5/2004 |
| WO | WO2004/058028 | 7/2004 |
| WO | WO2004/059409 | 7/2004 |
| WO | WO2004058028 | 7/2004 |
| WO | WO2005036292 A1 | 4/2005 |
| WO | WO2005/055795 | 6/2005 |
| WO | WO2005055796 A2 | 6/2005 |
| WO | WO2005077244 A1 | 8/2005 |
| WO | WO2005082223 A1 | 9/2005 |
| WO | WO2006/061133 | 6/2006 |
| WO | WO2007028049 | 3/2007 |
| WO | WO2007036490 A3 | 5/2007 |

OTHER PUBLICATIONS

Feature definition; Hitachi Appliances, Inc., retrieved from the World Wide Web at http://kadenfan.hitachi.co.jp/robot/feature/feature.html, accessed Nov. 19, 2008.

Home Robot—UBOT; Microrobotusa.com, retrieved from the World Wide Web at http://www.microrobotusa.com/product_1_1_1.html, accessed Dec. 2, 2008.

Intelligent Machines; InMach Intelligente Maschinen Gmbh, retrieved from the World Wide Web at http://www.inmach.de/inside.html, accessed Nov. 19, 2008.

Invitation to Pay Additional Fees dated Oct. 13, 2008 from International Application No. PCT/US2008/063174.

eVac Robotic Vacuum S1727 instruction Manual, Sharper Image Corp, Copyright 2004, 16 pages.

Franz, et al. "Biomimetric robot navigation", Robotics and Autonomous Systems vol. 30 pp. 133-153, 2000.

Robotic Vacuum Cleaner-Blue website: http://www.shaperimage.com/us/en/catalog/productview.jhtml?sku=S1727BLU, accessed Mar. 18, 2005, 3 pages.
Zoombot Remote Controlled Vaccuum-RV-500 NEW Roomba 2, website: http://cgi.ebay.com/ws/eBayISAPI.dll?ViewItem&category=43526&item=4373497618&rd=1, accessed Apr. 20, 2005, 7 pages.
Roboking—not just a vacuum cleaner, a robot! Jan. 21, 2004, 5 pages.
USPTO, Non-Final Office Action for U.S. Appl. No. 12/118,117, mailed Oct. 31, 2011, 35 pages.
USPTO, Non-Final Office Action for U.S. Appl. No. 13/245,095, mailed Nov. 23, 2011, 18 pages.
Prassler et al., "A Short History of Cleaning Robots," Autonomous Robots, 9:211-226 (2000).
EPO Authorized Officer Klaus Hubrich, PCT International Search Report and Written Opinion for International Application No. PCT/US2008/063174, mailed Feb. 18, 2009, 22 pages.
Korean Intellectual Property Office, "English Translation of KIPO's Notice of Preliminary Rejection", issued on Apr. 13, 2012, Korean Patent Application No. 10-2011-7029801 (6 pages).
Karcher RoboCleaner RC 3000 Product Details, webpages: "http://wwwrobocleaner.de/english/screen3.html" through "...screen6.html" Dec. 12, 2003, 4 pages.
Everyday Robots "Everyday Robots: Reviews, Discussion and News for Consumers", www.everydayrobots.com/index.php?option=content&task=view&id=9, Apr. 20, 2005, 7 pages.
Florbot GE Plastics Image (1989-1990).
Taipei Times, Robotic vacuum by Matsuhita about of undergo testing, Mar. 26, 2002 http://www.taipeitimes.com/News/worldbiz/archives/2002/03/26/0000129338 accessed.
Tech-on! http://techon.nikkeibp.co.jp/members/01db/200203/1006501/, 4 pages, accessed Nov. 1, 2011.
http://ascii.jp/elem/000/000/330/330024/.
Andersen et al., "Landmark based navigation strategies", SPIE Conference on Mobile Robots XIII, SPIE vol. 3525, pp. 170-181, Jan. 8, 1999.
Ascii, Mar. 25, 2002, http://ascii.jp/elem/000/000/330/330024/ accessed Nov. 1, 2011.
Certified U.S. Appl. No. 60/605,066 as provided to WIPO in PCT/US2005/030422, corresponding to U.S. National Stage Entry Application No. 11/574,290, U.S. publication 2008/0184518, filed Aug. 27, 2004.
Certified U.S. Appl. No. 60/605,181 as provided to WIPO in PCT/US2005/030422, corresponding to U.S. National Stage Entry Application No. 11/574,290, U.S. publication 2008/0184518, filed Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May, 2004, accessed Jul. 27, 2012.
Electrolux Trilobite, Jan. 12, 2001, http://www.electrolux-ui.com:8080/2002%5C822%5C833102EN.pdf, accessed Jul. 2, 2012, 10 pages.
Florbot GE Plastics, 1989-1990, 2 pages, available at http://www.fuseid.com/, accessed Sep. 27, 2012.
Gregg et al., "Autonomous Lawn Care Applications," 2006 Florida Conference on Recent Advances in Robotics, Miami, Florida, May 25-26, 2006, Florida International University, 5 pages.
Hitachi 'Feature', http://kadenfan.hitachi.co.jp/robot/feature/feature.htm1, 1 page, Nov. 19, 2008.
Hitachi, http://www.hitachi.co.jp/New/cnews/hi_030529_030529.pdf , 8 pages, May 29, 2003.
Home Robot—UBOT; Microbotusa.com, retrieved from the WWW at www.microrobotusa.com, accessed Dec. 2, 2008.
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Martishevcky, "The Accuracy of point light target coordinate determination by dissectoral tracking system", SPIE vol. 2591, pp. 25-30, Oct. 23, 2005.
Maschinemarkt Würzburg 105, Nr. 27, pp. 3, 30, Jul. 5, 1999.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
Sebastian Thrun, "Learning Occupancy Grid Maps With Forward Sensor Models," Autonomous Robots 15, 111-127, Sep. 1, 2003.
SVET Computers—New Technologies—Robot Vacuum Cleaner, Oct. 1999, available at http://www.sk.rs/1999/10/sknt01.html, accessed Nov. 1, 2011.
Written Opinion of the International Searching Authority, PCT/US2004/001504, Aug. 20, 2012, 9 pages.

* cited by examiner

COMPACT AUTONOMOUS COVERAGE ROBOT

CROSS REFERENCE TO RELATED APPLICATIONS

This U.S. patent application is a continuation, and claims priority under 35 U.S.C. §120, from U.S. patent application Ser. No. 12/118,117, filed May 9, 2008, now U.S. Pat. No. 8,239,992 entitled Compact Autonomous Coverage Robot, now pending, which claims priority under 35 U.S.C. §119(e) to U.S. Provisional Application 60/938,699, filed on May 17, 2007 and U.S. Provisional Application 60/917,065, filed on May 9, 2007. The disclosure of each of these prior applications is considered part of the disclosure of this application and each of these prior applications is hereby incorporated by reference in its entireties.

The contents of U.S. Pre-grant Publications 2003/0192144, 2006/0200281, and 2007/0016328, and also U.S. Pat. Nos. 6,748,297 and 6,883,201 are hereby incorporated herein by reference in their entireties.

TECHNICAL FIELD

This disclosure relates to autonomous coverage robots for cleaning floors or other surfaces.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

Mobile robots for cleaning floors have been described in, for example, U.S. Pat. No. 6,883,201 to JONES et al. ("JONES"), which discloses an autonomous floor-cleaning robot that traverses a floor while removing debris using rotating brushes, vacuums, or other cleaning mechanisms. JONES further describes a robot having a generally round form factor supported by three wheels, which can rotate freely to maneuver around obstacles, inter alia.

SUMMARY

Presently disclosed is a compact mobile robot for cleaning floors, countertops, and other related surfaces, such as tile, hardwood or carpeted flooring. The robot has a rectangular front form factor that facilitates cleaning along wall edges or in corners. In one example, the robot includes both a rounded section and a rectangular section, in which a cleaning mechanism within the rectangular section is disposed proximally to opposite side corners of the rectangular section. As an advantage, the robot can maneuver so as to bring the rectangular section flush with a wall corner or wall edge, with the cleaning mechanism extending into the wall corner or wall edge.

In one aspect, an autonomous coverage robot includes a chassis having forward and rearward portions and a drive system carried by the chassis. The forward portion of the chassis defines a substantially rectangular shape. The robot includes a cleaning assembly mounted on the forward portion of the chassis and a bin disposed adjacent the cleaning assembly. The bin is configured to receive debris agitated by the cleaning assembly. A bin cover is pivotally attached to a lower portion of the chassis and configured to rotate between a first, closed position providing closure of an opening defined by the bin and a second, open position providing access to the bin opening. The robot includes a body attached to the chassis and a handle disposed on an upper portion of the body. A bin cover release is configured to control movement of the bin cover between its first and second positions. The bin cover release is actuatable from substantially near the handle.

Implementations of this aspect of the disclosure may include one or more of the following features. In some implementations, the bin cover release is configured to move between a first, locking position which locks the bin cover in its first, closed position and a second, disengaged position which allows the bin cover to move to its second, open position. The bin cover release may be a spring biased latch. In some examples, the bin cover release includes a button disposed on the handle configured to actuate the latch, thereby allowing actuation of the bin cover release while holding the handle. In some implementations, the drive system includes right and left differentially driven drive wheels rotatably mounted to the rearward portion of the chassis. The drive system is capable of maneuvering the robot to pivot in place.

In another aspect, an autonomous coverage robot includes a chassis having forward and rearward portions, and a drive system carried by the rearward portion of the chassis. The drive system is configured to maneuver the robot over a cleaning surface. The robot includes a controller in communication with the drive system. The controller is configured to maneuver the robot to pivot in place. The robot includes a cleaning assembly mounted on the forward portion of the chassis. The robot includes a bump sensor in communication with the controller which is configured to detect movement in multiple directions. A body is flexibly attached to the chassis and substantially covers the chassis. Contact with the body is translated to the bump sensor for detection. The controller is configured to alter a drive direction of the robot in response to a signal received from the bump sensor. The bump sensor includes a sensor base, a sensor shroud positioned adjacent the sensor base and connected to the body, an emitter housed by the sensor shroud, and at least three detectors carried by the sensor base. The emitter emits a signal onto the sensor base, and the detectors are configured to detect the emitted signal. Movement of the sensor shroud causes movement of the emitted signal over the detectors. In some implementations, the robot includes a bin disposed adjacent the cleaning assembly and configured to receive debris agitated by the cleaning assembly.

Implementations of this aspect of the disclosure may include one or more of the following features. In some implementations, the bump sensor detects 360 degrees of movement of the body about the bump sensor. Preferably, the bump sensor includes four detectors arranged in a rectangular configuration with respect to each other. The sensor shroud defines an orifice through which the emitter emits its signal onto the sensor base. The emitter comprises an infrared light emitter and the detectors comprise infrared light detectors, the orifice collimating the emitted signal onto the sensor base. In some examples, the robot includes a bumper guide configured to confine body movements to along two directions. The bumper guide may include two orthogonal grooves defined by the body and configured to receive a guide pin disposed on the chassis. The forward portion defines a substantially rectangular shape, in some examples. The drive system, in some examples, includes right and left drive wheels differentially driven by corresponding right and left motors.

In yet another aspect, an autonomous coverage robot includes a chassis having forward and rearward portions, and a drive system carried by the rearward portion of the chassis. The forward portion defines a substantially rectangular shape and the rearward portion of the chassis defines an arcuate shape. The drive system is configured to maneuver the robot over a cleaning surface and includes right and left drive wheels differentially driven by corresponding right and left motors. The robot includes a controller in communication with the drive system. The controller is configured to maneuver the robot to pivot in place. The robot includes a cleaning assembly mounted on the forward portion of the chassis. The robot includes an accelerometer in communication with the controller, which controls the drive system in response to a signal received from the accelerometer. In some implementations, the robot includes a bin disposed adjacent the cleaning assembly and configured to receive debris agitated by the cleaning assembly.

Implementations of this aspect of the disclosure may include one or more of the following features. In some implementations, the controller alters a drive direction of the robot in response to a signal received from the accelerometer indicating an abrupt speed change. The controller alters a drive direction of the robot in response to a signal received from the accelerometer indicating stasis of the robot. The controller reduces a drive speed of the robot in response to a signal received from the accelerometer indicating a maximum speed. In some examples, the maximum speed is between about 200 mm/s and about 400 mm/s.

Implementations of the above aspects of the disclosure may include one or more of the following features. In some implementations, the cleaning assembly includes a first roller brush rotatably mounted substantially near a front edge of the chassis. The cleaning assembly may include a second roller brush rotatably mounted substantially parallel to and rearward of the first roller brush, the first and second roller brushes rotate in opposite directions. The bin is disposed rearward of the first and second roller brushes and forward of the drive system. Each roller brush includes right and left end brushes extending from respective ends of the roller brush beyond a lateral extend of the body, each end brush extending at angle $\phi$ of between 0° and about 90° from a longitudinal axis defined by the roller brush. In other implementations, the cleaning assembly includes a front roller brush rotatably mounted substantially near the front edge of the chassis, and right and left side roller brushes rotatably mounted orthogonal to the front brush substantially near the respective right and left side edges of the chassis. The bin is disposed rearward of the front roller brush and substantially between the right and left side roller brushes and forward of the drive system.

In another aspect, an autonomous coverage robot includes a chassis having forward and rearward portions, and a drive system carried by the rearward portion of the chassis. The forward portion defines a substantially rectangular shape and the rearward portion defines an arcuate shape. The drive system is configured to maneuver the robot over a cleaning surface and includes right and left drive wheels differentially driven by corresponding right and left motors. The robot includes a controller in communication with the drive system. The controller is configured to maneuver the robot to pivot in place. The robot includes a cleaning assembly mounted on the forward portion of the chassis and includes a first roller brush rotatably mounted substantially near a front edge of the chassis and a second roller brush rotatably mounted substantially parallel to and rearward of the first roller brush. The first and second roller brushes rotate in opposite directions. A bin is disposed rearward of the cleaning assembly and is configured to receive debris agitated by the cleaning assembly. A bin cover is pivotally attached to a lower portion of the chassis and is configured to rotate between a first, closed position providing closure of an opening defined by the bin and a second, open position providing access to the bin opening. The robot includes a bin cover release configured to control movement of the bin cover between its first and second positions. A handle is disposed on the chassis. The bin cover release is actuatable from substantially near the handle. A body is flexibly attached to the chassis and substantially covers the chassis. The body is movable in relation to the handle and the chassis. The robot includes a bump sensor in communication with the controller and configured to detect movement in multiple directions. Contact with the body is translated to the bump sensor for detection. The controller is configured to alter a drive direction of the robot in response to a signal received from the bump sensor.

Implementations of this aspect of the disclosure may include one or more of the following features. In some implementations, the bump sensor includes a sensor base, a sensor shroud positioned adjacent the sensor base and connected to the body, an emitter housed by the sensor shroud, and at least three detectors carried by the sensor base. The emitter emits a signal onto the sensor base and the detectors detect the emitted signal. Movement of the sensor shroud causes movement of the emitted signal over the detectors.

In some implementations, the robot includes a bumper guide configured to confine body movements to along two directions. The bumper guide may include two orthogonal grooves defined by the body and configured to receive a guide pin disposed on the chassis.

The robot may include an idler wheel disposed on the bin cover. In some examples, the rearward portion of the chassis defines a substantially semi-circular shape and the idler wheel is position at least ⅓ the radius of the substantially semi-circular shaped rearward portion forward of the drive wheels.

In specific examples, the drive wheels are disposed less than 9 cm rearward of the cleaning assembly. The robot may include a power source disposed in the rearward portion of the chassis substantially between the right and left wheels. The power source is disposed adjacent and rearward of the bin. The cleaning assembly further comprises a brush motor configured to drive the first and second roller brushes. In some examples, the brush motor is disposed substantially near a forward edge of the chassis. The first roller brush may be disposed substantially near a forward edge of the chassis.

Implementations of the disclosure may include one or more of the following features. In some implementations, the right and left drive wheels are rotatably mounted to the rearward portion of the chassis, and the drive system is capable of maneuvering the robot to pivot in place. Preferably, the rearward portion of the chassis defines an arcuate shape; however other shapes are possible as well, such as rectangular or polygonal. In some examples, the rearward portion of the chassis defines a substantially semi-circular shape and the axes of the right and left drive wheels are disposed on or rearward of a center axis defined by the rearward portion of the chassis. In some implementations, the chassis and the body together have a length of less than 23 cm and a width of less than 19 cm.

In some implementations, the robot includes at least one proximity sensor carried by a dominant side of the robot. The at least one proximity sensor responds to an obstacle substantially near the body. The controller alters a drive direction in response to a signal received from the at least one proximity sensor.

In some implementations, the robot includes at least one cliff sensor carried by a forward portion of the body and arranged substantially near a front edge of the body. The at least one cliff sensor responds to a potential cliff forward of the robot. The drive system alters a drive direction in response to a signal received from the cliff sensor indicating a potential cliff. In some examples, right and left front cliff sensors are disposed at the respective right and left corners of a forward portion of the robot. This allows the robot to detect when a either of the front corners swing over a cliff edge, so as to avoid moving the drive wheels any closer to the cliff edge. In some implementations, the robot includes at least one cliff sensor carried by a rearward portion of the body and arranged substantially near the rear edge of the body. The at least one cliff sensor responds to a potential cliff rearward of the robot. The drive system alters a drive direction in response to a signal received from the cliff sensor indicating a potential cliff. In some examples, right and left rear cliff sensors are disposed directly rearward of the respective right and left drive wheels. This allow the robot to detect a cliff edge while driving in reverse at an angle or in an arc, in which the drive wheel may encounter the cliff edge before the rear center portion of the robot.

In some implementations, the robot includes an idler wheel disposed on the bin cover. Preferably, the rearward portion of the chassis defines a substantially semi-circular shape, which allows the robot to spin in place without catching any portion of the rearward portion of the chassis on a detected obstacle. The idler wheel is position at least ⅓ the radius of the substantially semi-circular shaped rearward portion forward of the drive wheels. In some examples, the idler wheel is a stasis detector including a magnet disposed in or on the idler wheel, and a magnet detector disposed adjacent the wheel for detecting the magnet as the idler wheel rotates.

In other more general aspects that are combinable with any of the above implementations, an autonomous coverage robot includes a chassis and a drive system carried by the chassis. The drive system is configured to maneuver the robot over a cleaning surface. In some examples, the drive system includes right and left differentially driven drive wheels; however other means of driving the robot are applicable as well, such as skid steer tracks. In some examples, the chassis has forward and rearward portions with the forward portion defining a substantially rectangular shape. Optionally, the rearward portion can define an arcuate shape.

In some implementations, the robot includes a cleaning assembly mounted on the forward portion of the chassis (e.g. substantially near a forward edge of the chassis). A bin is disposed adjacent the cleaning assembly and configured to receive debris agitated by the cleaning assembly. In some examples, a bin cover is pivotally attached to the robot and is configured to rotate between a first, closed position providing closure of an opening defined by the bin and a second, open position providing access to the bin opening. In other examples, the bin cover is slidably attached to the robot and slides between the first, closed position and the second, open position.

In some implementations, a body is attached to the chassis. The body may conform to the profile of the chassis. In some examples, the body is flexibly or movably attached to the chassis. The robot may include a handle for carrying the robot. The handle can be disposed on the body or on the chassis. If the handle is disposed on the chassis, the body is allowed to move in relation to the handle and/or the chassis. The robot may include a bin cover release configured to control movement of the bin cover between its first and second positions. Preferably, the bin cover release is actuatable from substantially near the handle. However, the bin cover release may be actuatable from substantially near or on the bin cover.

In some implementations, the robot includes a bump sensor, which may be configured to detect movement in multiple directions. In some examples, contact with the body is translated to the bump sensor for detection. The robot may include a controller configured to alter a drive direction of the robot in response to a signal received from the bump sensor. In some examples, the robot includes an accelerometer in communication with the controller, such that the controller controls the drive system in response to a signal received from the accelerometer.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
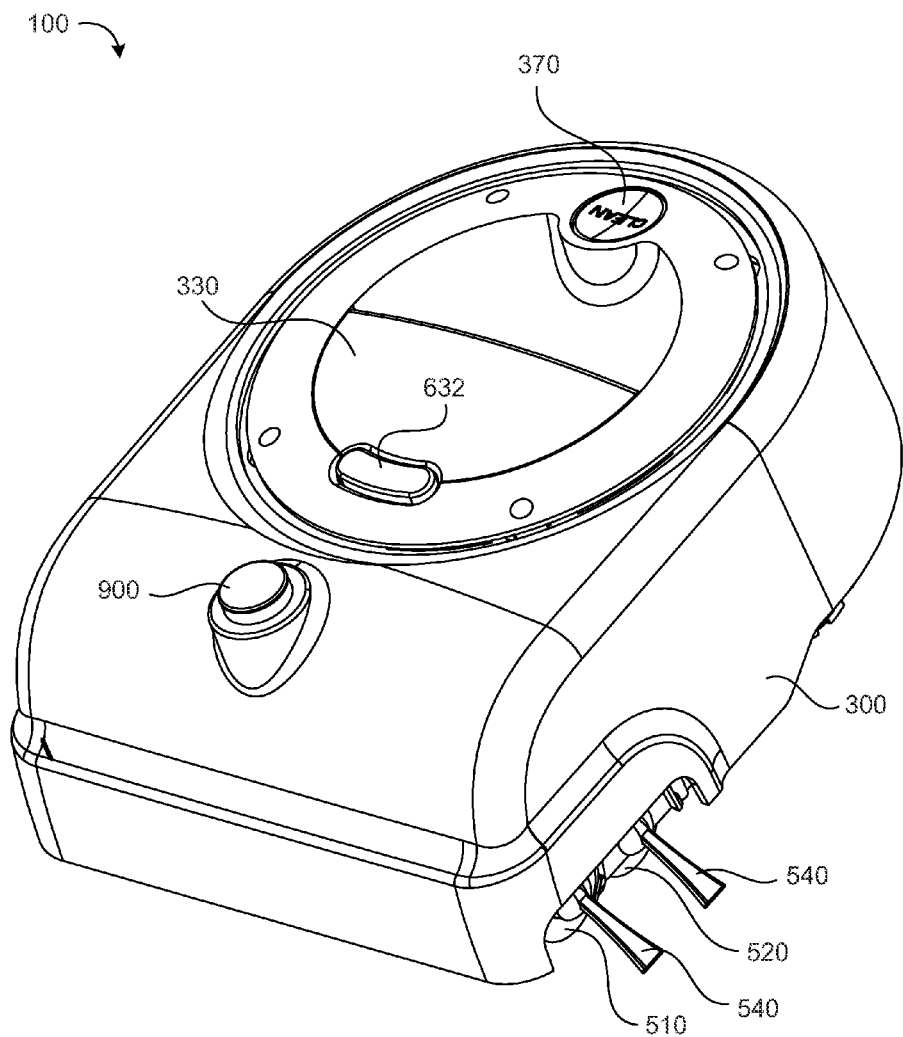
FIG. 1 is a top perspective view of a compact autonomous coverage robot.
Figure 2:
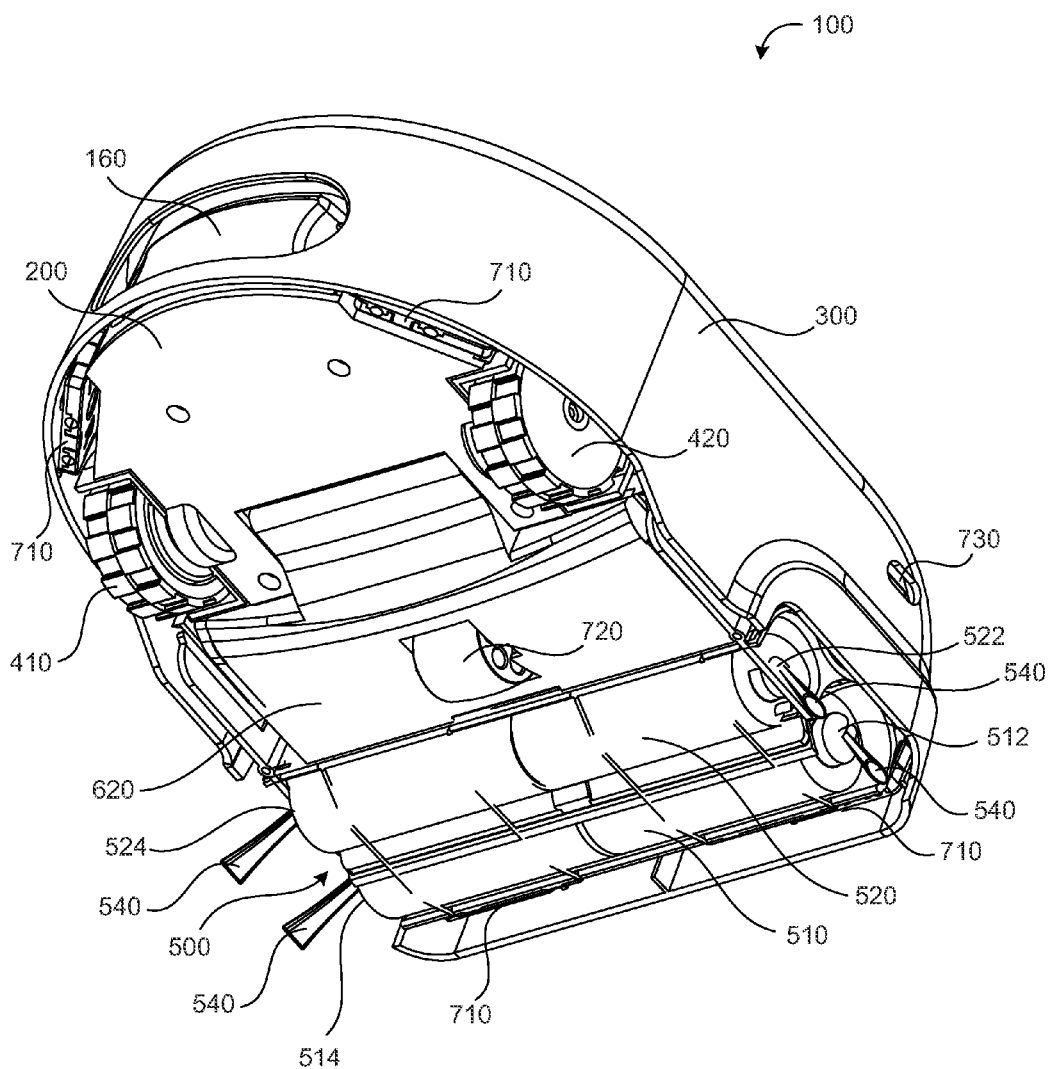
FIG. 2 is a bottom perspective view of the robot shown in FIG. 1.
Figure 3:
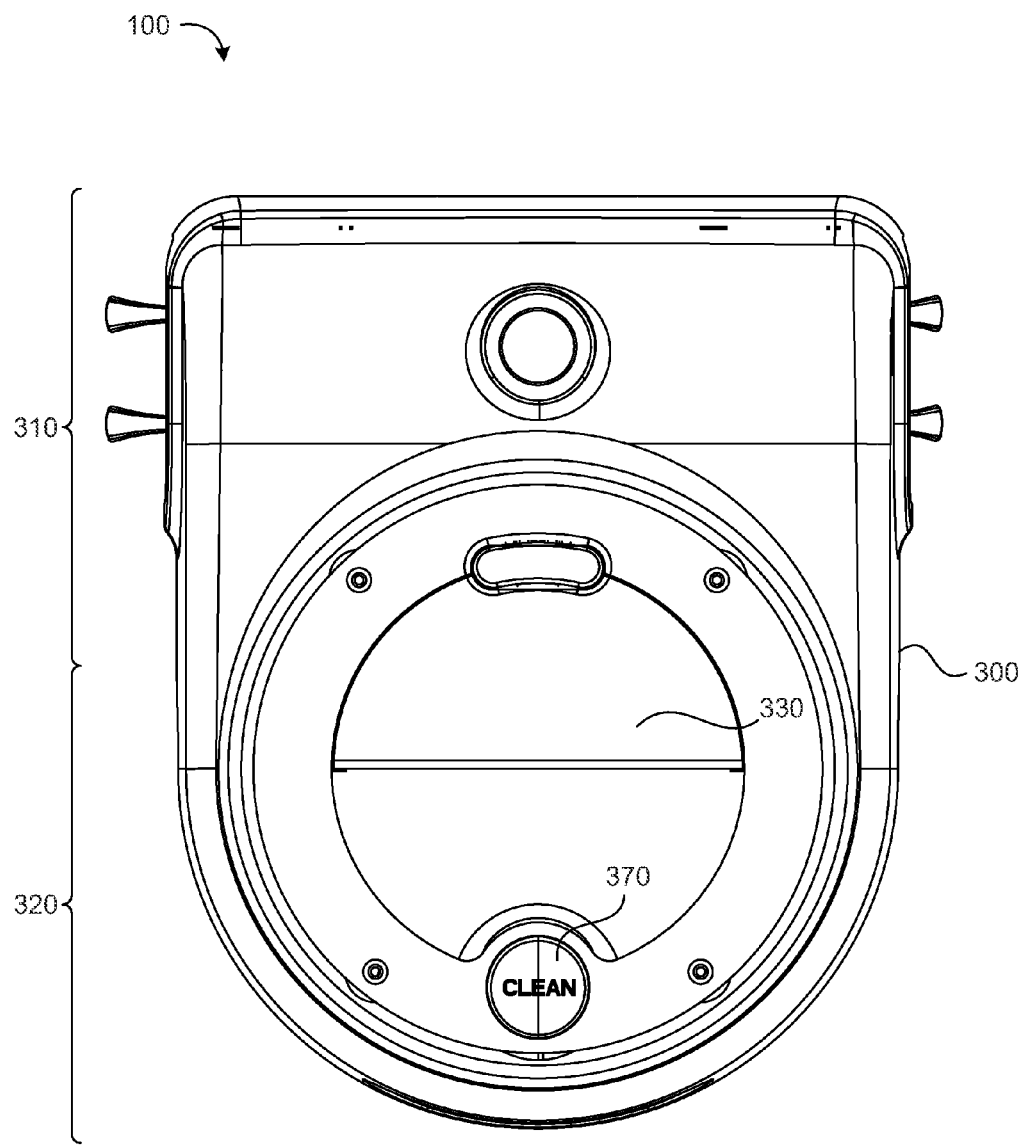
FIG. 3 is a top view of the robot shown in FIG. 1.

Referring to FIGS. 1-3, an autonomous coverage robot 100 includes a chassis 200 having a forward portion 210 and a rearward portion 220. The forward portion 210 of the chassis 200 defines a substantially rectangular shape. In the example shown, the rearward portion 220 of the chassis 200 defines an arcuate shape (e.g., in the example shown the rearward portion 220 is rounded); however, the rearward portion 220 may define other shapes as well, such as, but not limited to, rectangular, triangular, pointed, or wavy shapes.

Figure 5:
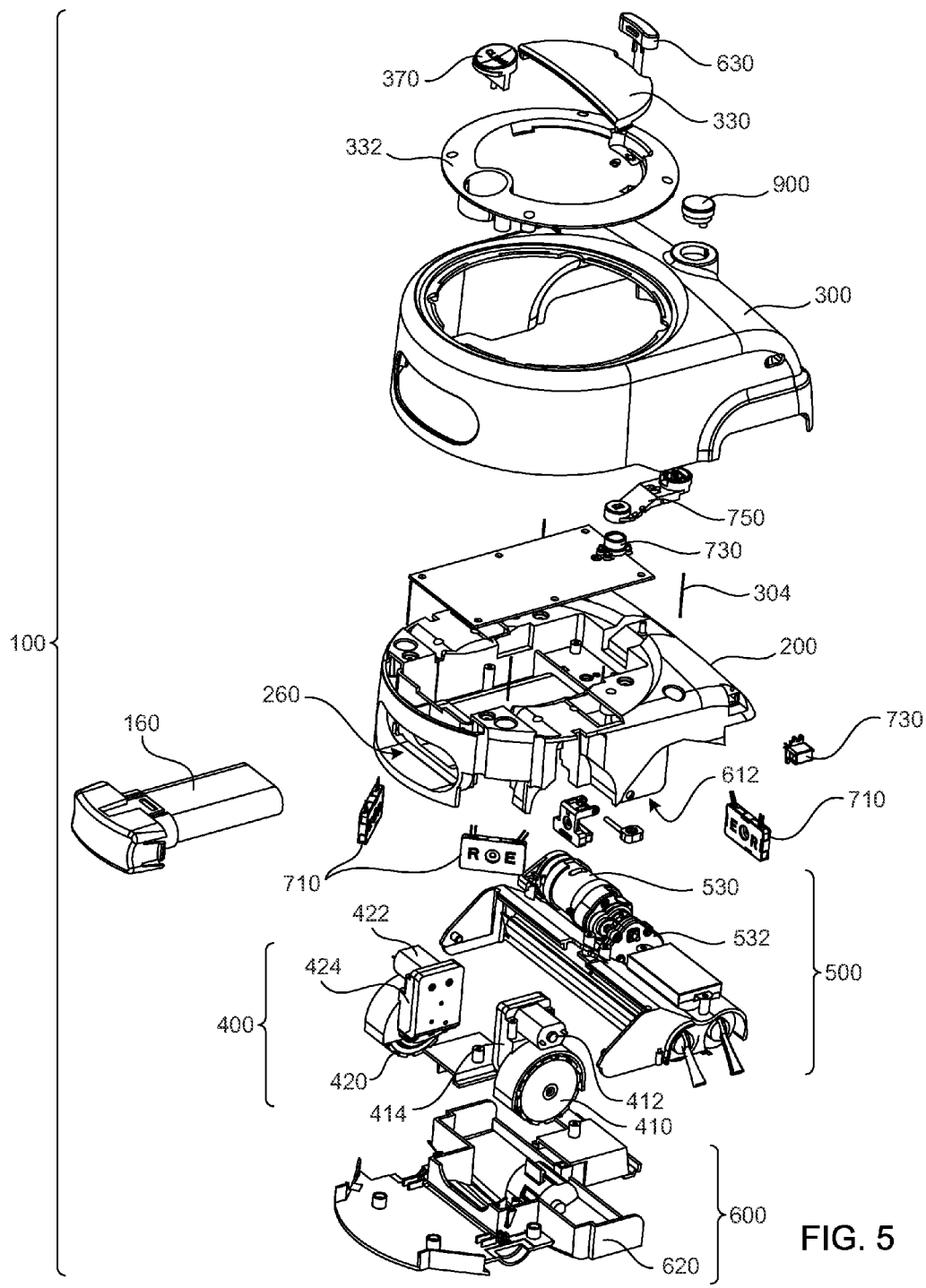
FIG. 5 is an exploded view of the top aspect shown in FIG. 1.
Figure 6:
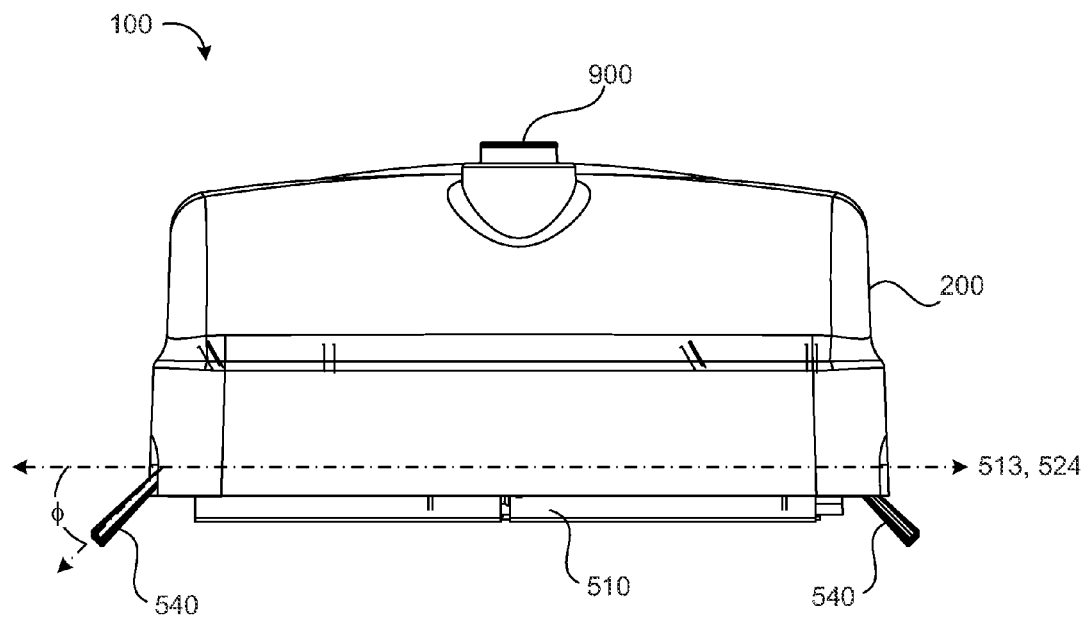
FIG. 6 is a front view of the robot shown in FIG. 1.
Figure 7:
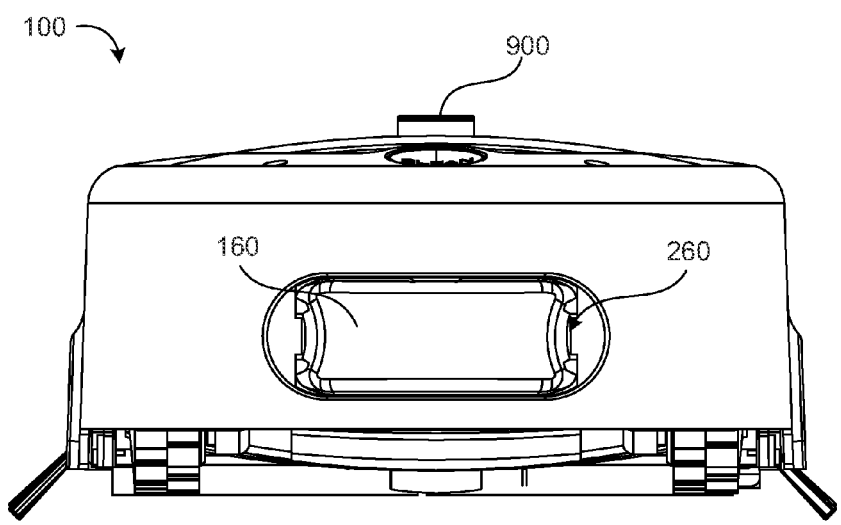
FIG. 7 is a rear view of the robot shown in FIG. 1.

Referring to FIGS. 1 and 5, the robot 100 includes a body 300 configured to substantially follow the contours of the chassis 200. The body 300 may be flexibly connected to the chassis 200 (e.g., by a spring or elastic element), so as to move over the chassis 200. In some examples, a handle 330 is disposed on or defined by an upper portion of the body 300. In other examples, the handle 330 is secured to or extends from a mounting piece 332, which is secured to an upper portion 205 of the chassis 200. The mounting piece 332 can be removable and interchangeable with other mounting pieces 332 that have different arrangements or carry other components (e.g., different handles 330 and/or sensors). The body 300 moves with respect to the mounting piece 332 and the chassis 200. In the example shown, the body 300 floats below the mounting piece 332. The mounting piece 332 can by circular and sized to be offset from a respective opening defined by an upper portion (305) of the body 300, so as to provide a 360° displacement limit for body movement (e.g., 2-4 mm of bumper movement) due to contact with the body (e.g., along a lower portion 303 of the body 300 (see FIG. 8). The robot 100 (including the chassis 200 and the body 300) has a compact footprint with a length of less than 23 cm and a width of less than 19 cm.

Figure 4:
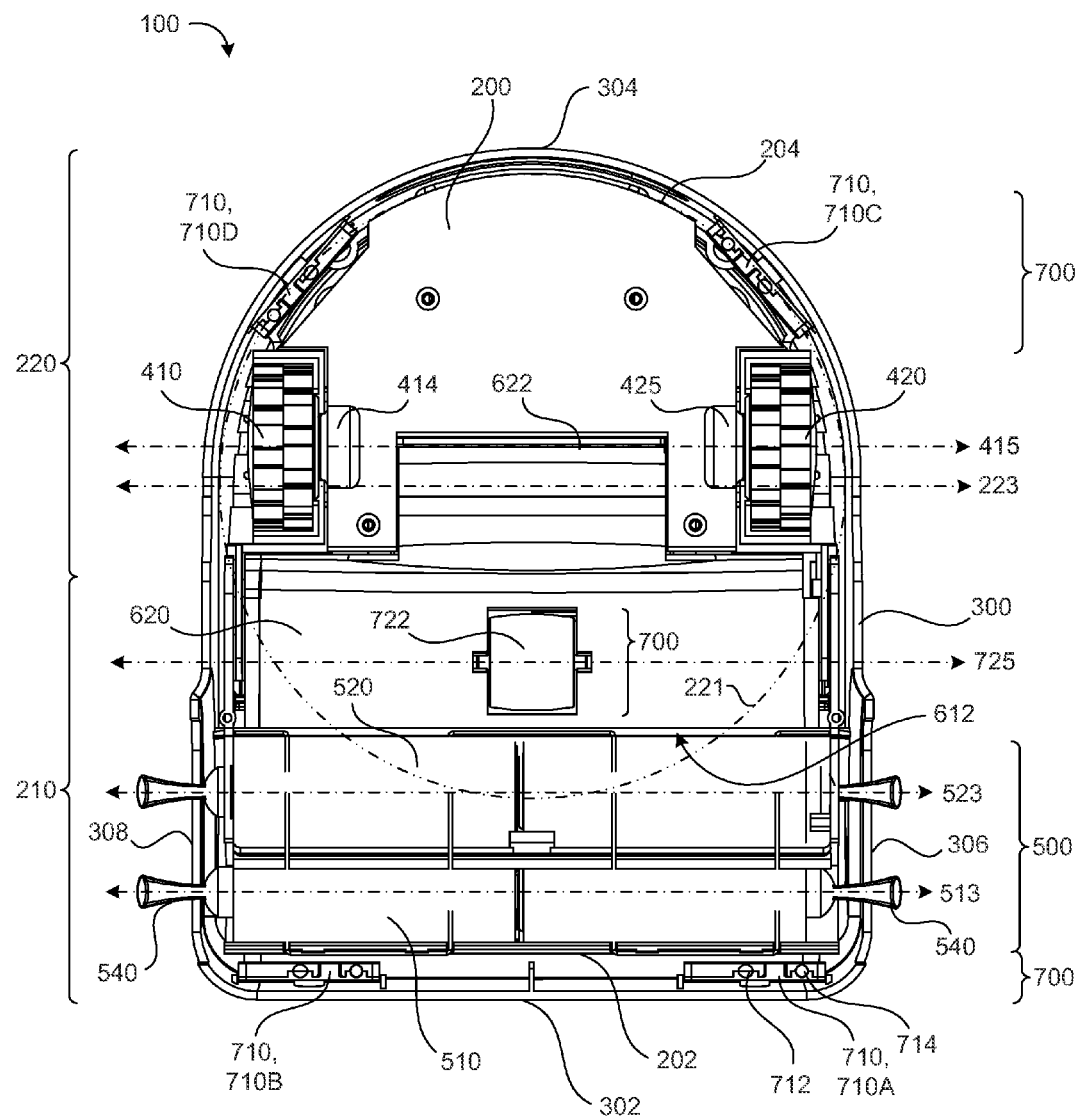
FIG. 4 is a bottom view of the robot shown in FIG. 1.

Referring to FIGS. 4 and 5, the robot 100 includes a drive system 400 carried by the chassis 200 and configured to maneuver the robot 100 over a cleaning surface. In the example shown, the drive system 400 includes right and left drive wheels 410 and 420, respectively, which are differentially driven by corresponding right and left drive motors 412 and 422, respectively. The drive motors 412, 422 are mounted above their respective drive wheels 410, 420, in the example shown, to help maintain the compact footprint of the robot 100. However, other implementations include having the drive motors 412, 422 mounted adjacent (e.g., co-axially with) their respective drive wheels 410, 420. In some examples, the robot includes a gear box 414, 424 coupled between the drive wheel 410, 420 and its respective drive motor 412, 422. The gear boxes 414, 424 and the drive motors 412, 422 are configured to propel the robot at a maximum velocity of between about 200 mm/s and about 400 mm/s (preferably 306 mm/s) and a maximum acceleration of about 500 mm/s$^2$. In some implementations, the center axles of the drive wheels 410, 420 are disposed less than 9 cm (preferably 8 cm) rearward of a cleaning assembly 500, which will be described below. The robot 100 includes a controller 450 in communication with the drive system 400. The controller 450 is configured to maneuver the robot 100 to pivot in place.

The advantage of the conventional cylindrical robot with drives wheels disposed on the diameter of the robot is that it is not hindered from turning in the presence of obstacles. This enables a simple and effective escape strategy—spin in place until no objects are detected forward of the robot. If the robot is non-cylindrical or the axes of wheel rotation are not on a diameter of the robot then the normal and tangential forces on the robot change as the robot rotates while in contact with an object. To ensure that such a non-conventional robot is able to escape an arbitrary collision, the forces and torques applied to the robot by the environmental cannot combine with the robot-generated forces and torques to halt robot motion. In practice this means that the robot shape should be constant width (to within the shell compliance distance) and that the robot's wheels be capable of lateral motion. Particular shapes then yield different requirements for maximum lateral wheel forces and maximum allowable environmental coefficient of friction. However, the robot 100 presently disclosed, in some examples, has a rectangular forward portion 210 to allow cleaning fully into corners.

Referring again to the example shown in FIG. 4, a profile circle 221 defining the substantially semi-circular profile of the rearward portion 220 of the chassis 200 extends into the forward portion 210 of the chassis 200 and has a center axis 223. The drive wheels 410, 420 are positioned on or substantially near the center axis 223 of the profile circle 221. In the example shown, the drive wheels 410, 420 are positioned slightly rearward of the center axis 223 of the profile circle 221. By positioning the drive wheels 410, 420 on or rearward of the center axis 223 of the profile circle 221, the robot 100 can turn in place without catching rearward portion 220 of the chassis 200 on an obstacle.

Referring to FIGS. 2, 4 and 5-9, the robot 100 includes a cleaning assembly 500 mounted on the front portion 210 of the chassis 200 substantially near a front edge 202 of the chassis 200. In the examples shown, the cleaning assembly 500 includes first and second roller brushes 510, 520 rotatably mounted substantially parallel to each other. The roller brushes 510, 520 are driven by a cleaning motor 530 coupled to a middle portion of the roller brushes 510, 520 by a gear box 532. The cleaning motor 530 is positioned above the roller brushes 510, 520 to confine the cleaning assembly 500 to the forward portion 210 of the chassis 200 and to help maintain a compact robot with a relatively small footprint. Each roller brush 510, 520 may include an end brush 540 disposed at each longitudinal end 512, 514, 522, 524 of the roller brush 510, 520. Each end brush 540 is disposed at an angle φ with a longitudinal axis 513, 523 defined by the roller brush 510, 520 of between 0° and about 90° (preferably 45°). The end brush 540 extends beyond the chassis 200 and the body 300 (e.g., beyond respective right and left side edges 306, 308) to agitate debris on or along objects adjacent the robot 100 (e.g., to clean up against walls). Other implementations of the cleaning assembly 500 will be discussed later with reference to another implementation of the robot 100.

Referring to FIGS. 1-5, 8, and 10, the robot 100 includes a bin assembly 600 disposed adjacent the cleaning assembly 500 and configured to receive debris agitated by the cleaning assembly 500. In some examples, the chassis 200 defines a debris chamber or bin 610 (see FIG. 10). In other examples, a bin 610 is disposed below the chassis and positioned to receive debris agitated by the cleaning assembly 500. In the examples shown, the bin 610 is positioned substantially between the cleaning assembly 500 and the drive system 400. Specifically, the bin 610 is forward of the drive wheels 410, 420 and rearward of the roller brushes 510, 520.

Preferably, the debris chamber/bin 610 is defined by, and thus formed integrally with, the chassis 200. In an alternative configuration, the robot 101 may include a modular, removable cartridge or bag serving as the debris chamber/bin 610, such that the user can remove the debris by removing and emptying the cartridge or bag. The cartridge or bag 610 is removably secured to the chassis 200.

A bin cover 620 is pivotally attached to a lower portion 203 of the chassis 200 and configured to rotate between a first, closed position providing closure of an opening 612 defined by the bin 610 and a second, open position providing access to the bin opening 610. In some examples, the bin cover 620 is releasably connected to the chassis 200 by one or more hinges 622. The bin assembly 600 includes a bin-cover release 630 configured to control movement of the bin cover 620 between its first and second positions. The bin-cover release 630 is configured to move between a first, locking position which locks the bin cover 620 in its first, closed position and a second, disengaged position which allows the bin cover 620 to move to its second, open position (see FIG. 8). The bin-cover release 630 is actuatable from substantially near or at the handle 330, thereby allowing actuation of the bin-cover release 630 while holding the handle 330. This allows a user to pick up the robot 100 via the handle 330 with one hand, hold the robot 100 over a trash bin (not shown), and actuate the bin-cover release 630 with the same hand holding the handle 330 to release the bin cover 620 and empty the contents of the bin 610 into the trash bin. In some implementations, the bin cover release 630 is a spring biased latch or latching button attractable by pressing downwardly (e.g., button) or pulling upwardly (e.g., trigger).

Figure 8:
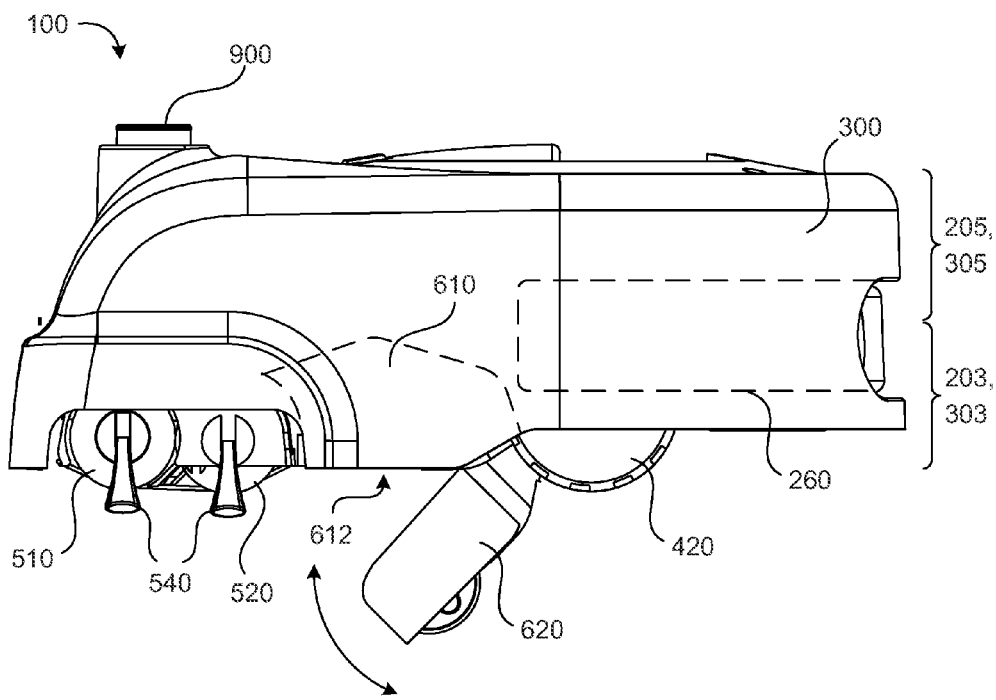
FIG. 8 is a left side view of the robot shown in FIG. 1 with a bin cover in its open position.

The robot 100 includes a power source 160 (e.g., battery) in communication with the drive system 400 and/or the controller 450, and removably secured to the chassis 200. In the examples shown in FIGS. 2, 4, 5, and 7-8, the power source 160 is received by a power receptacle 260 defined by the rearward portion 220 of the chassis 200. In some examples, the power source 160 is positioned substantially under the controller 450 and between the right and left drive wheels 410, 420, while extending forward to a distance sufficient to place a center of gravity of the robot 100 substantially at the center of the chassis 200 or substantially between a first transverse axis 415 defined by the drive wheels 410, 420 and a second transverse axis 425 defined by a free-wheel 722 (e.g., stasis wheel 722) (see FIG. 4). If the weight of the power source 160 is positioned too far rearward, there will not be enough weight over the cleaning assembly 500, allowing the forward portion 210 of the chassis 200 to tip upward. As being a compact robot 100 with a relatively small footprint, the arrangement of components on and within the chassis 200 is important to achieve the compact size of the robot 100 while remaining functional. Referring to FIGS. 5 and 8, the debris chamber/bin 610 impedes the forward placement of the power source 160 (e.g., the power source 160 is limited to positioning in the rearward portion 210 of the chassis 200). Nevertheless, the power source 160 is positioned between the drive wheels 410, 420 and as far forward as possible, substantially abutting the bin 610, so as to place the center of gravity of the robot forward of the first transverse axis 415 defined by the drive wheels 410, 420. By placing the center of gravity forward of the drive wheels 410, 420, the robot 100 is less likely to tip up and backwards (e.g., when going over thresholds).

Referring to FIGS. 1-11, the robot 100 includes a navigational sensor system 700 in communication with the controller 450 that allows the robot 100 to be aware of its surroundings/environment and react in prescribed manners or behaviors according to its sensed perception of its surroundings/environment. A description of behavior control can be found in detail in Jones, Flyun & Seiger, Mobile Robots: Inspiration to Implementation second edition, 1999, A K Peters, Ltd., the text of which is hereby incorporated by reference in its entirety. The navigational sensor system 700 includes one or more cliff sensors 710, a stasis detector 720, a proximity sensor 730, at least one bump sensor 800, and/or an omni-directional receiver 900. Using input from the navigational sensor system 700, the controller 450 generates commands to be carried out by the robot 100. As a result, the robot 100 is capable of cleaning surfaces in an autonomous fashion.

The cliff sensors 710 may be used to sense when the robot 100 has encountered the edge of the floor or work surface, such as when it encounters a set of stairs. The robot 100 may have behaviors that cause it to take an action, such as changing its direction of travel, when an edge is detected. In the examples shown in FIGS. 2, 4, 5, and 10, the body 300 of the robot 100 houses four cliff sensors 710 along a perimeter of the body 300, with two cliff sensors 710 substantially along a front edge 302 of a forward portion 310 of the body 300 (preferably near forward outer corners or lateral edges) and two cliff sensors 710 substantially along a rearward edge 304 of a rearward portion 320 of the body 300 (preferably near rearward outer corners or lateral edges) (see FIG. 4). Each cliff sensor 710 includes an emitter 712 that sends a signal and a receiver 714 configured to detect a reflected signal. In some implementations, cliff sensors 1074 may be installed within a mounting apparatus that stabilizes and protects the sensor and which positions the sensor to point towards the window installed onto the bottom of the mounting apparatus. Together the sensor, the mounting apparatus and the window comprise a cliff sensor unit. Reliability of the cliff sensor 710 may be increased by reducing dust buildup. In some implementations, a window may be installed on the bottom of the mounting apparatus which includes a shield mounted within a slanted molding composed of a material which prevents dust build up, such as an antistatic material. The shield component and the molding may be welded together. To further facilitate the reduction in dust and dirt buildup, the shield may be mounted on a slant to allow dirt to more easily slide off. In some implementations, a secondary cliff sensor 710 may be present behind existing cliff sensors 710 to detect floor edges in the event that a primary cliff sensor 710 fails.

Robots defining shapes of constant width can turn in place about their centroid locus of the respective shape. A shape of constant width is a convex planar shape whose width, measured by the distance between two opposite parallel lines touching its boundary, is the same regardless of the direction of those two parallel lines. The width of the shape in a given direction is defined as the perpendicular distance between the parallels perpendicular to that direction. The Reuleaux triangle is the simplest example (after the circle) of shapes of constant width. However, in the examples shown, the robot 100 has a rectangular shaped forward portion 210 of the chassis 200, and thus not a robot of constant width, which can prevent the robot from spinning in place to escape from various stuck positions, such as with canyoning situations, inter alia. Canyoning situations arise when the robot 100 drives down a narrow corridor (with side walls) or plank (with side cliffs) that is slightly wider than the robot 100. When the robot 100 reaches the end of the corridor or plank it can only escape by driving in reverse back out of the corridor or off of the plank. If the robot 100 tries to spin in place (e.g., to rotate 180°) one of the robot's corners will hit a wall or go off a cliff. In the case of cliffs, the placement of cliff sensors 710 substantially along a rearward edge 304 of the body 300 or a rearward edge 204 of the chassis 200 allows the robot 100 to backup intelligently to escape without backing off a cliff. Similarly, the bump sensor 800, which will be described below, detects reward bumps, allowing the robot 100 to back out of narrow corridors.

Referring to FIGS. 2, 4, 5 and 11A, the stasis detector 720 indicates when the robot 100 is moving or stationary. In the examples shown, the stasis detector 720 includes a stasis wheel 722 with a magnet 724 either embedded in or disposed on the wheel 722. A magnetic receiver 726 (e.g., inductor) is position adjacent the wheel 722 to detect the magnet 724 moving past. The magnetic receiver 726 provides an output signal to the controller 450 that indicates when the magnet 724 moves past the magnetic receiver 726. The controller 450 can be configured to determine how fast and far the robot 100 is traveling based on the output signal of the magnetic receiver 726 and the circumference of the stasis wheel 722. In other implementations, the stasis detector 720 includes a stasis wheel 722 with circumferential surface having at least two different reflective characteristics (e.g., white and black). A stasis emitter and receiver pair (e.g., infrared) is disposed adjacent the stasis wheel 722. The stasis emitter is configured to emit a signal onto the circumferential surface of the stasis wheel 722, and the stasis receiver is configured to detect or receive a reflected signal off of the circumferential surface of the stasis wheel 722. The stasis detector 720 monitors the transitions between reflection states and non-reflection states to determine if the robot 100 is moving, and perhaps even the rate of movement.

Again due to the compact nature of the robot 100 and the compact positioning of components, the stasis wheel 722 acts as a third wheel for stable ground contact. If the stasis wheel 722 was placed forward of the cleaning assembly 500, it would need to be a caster wheel, rather than a directional wheel, which would drag in an arc when the robot 100 turns. However, the need for a rectangular forward portion 210 of the chassis 200, so as to fully clean in corners, prohibits placement of the stasis wheel 722 forward of the cleaning assembly 500 (e.g., which would result in a shape other than rectangular). A wheel is needed forward of the drive wheels 410, 420 to lift the forward portion 210 of the chassis 200 to an appropriate height for cleaning and brush rotation.

Referring to again FIG. 4, the stasis wheel 722 is disposed in the bin cover 620, just rearward of the cleaning assembly 500 and forward of the drive system 400 and the power source 160. The stasis/idler wheel 722 is positioned forward of the drive wheels 410, 420, forward of the center axis 223 of the profile circle 221, and within the profile circle 221. This positioning of the stasis wheel 722 allows the robot 100 to turn in place without substantially dragging the stasis wheel 722 across its rolling direction, while also providing support and stability to the forward portion 210 of the chassis 200. Preferably, the stasis wheel 722 is positioned at least 1/3 the radius of the center axis 223. The forward positioning of the stasis wheel 722 and the power source 160 is obstructed by the cleaning assembly 500. As a result, decreasing the size of the cleaning assembly 500 would allow further forward placement of the stasis wheel 722 and the power source 160 or a decrease in the overall length of the robot 100.

Figure 11A:
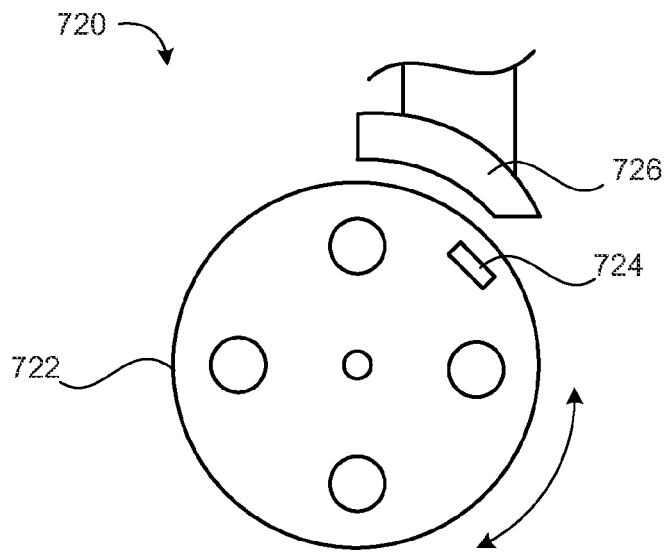
FIG. 11A is a side view of a stasis detector.
Figure 11B:
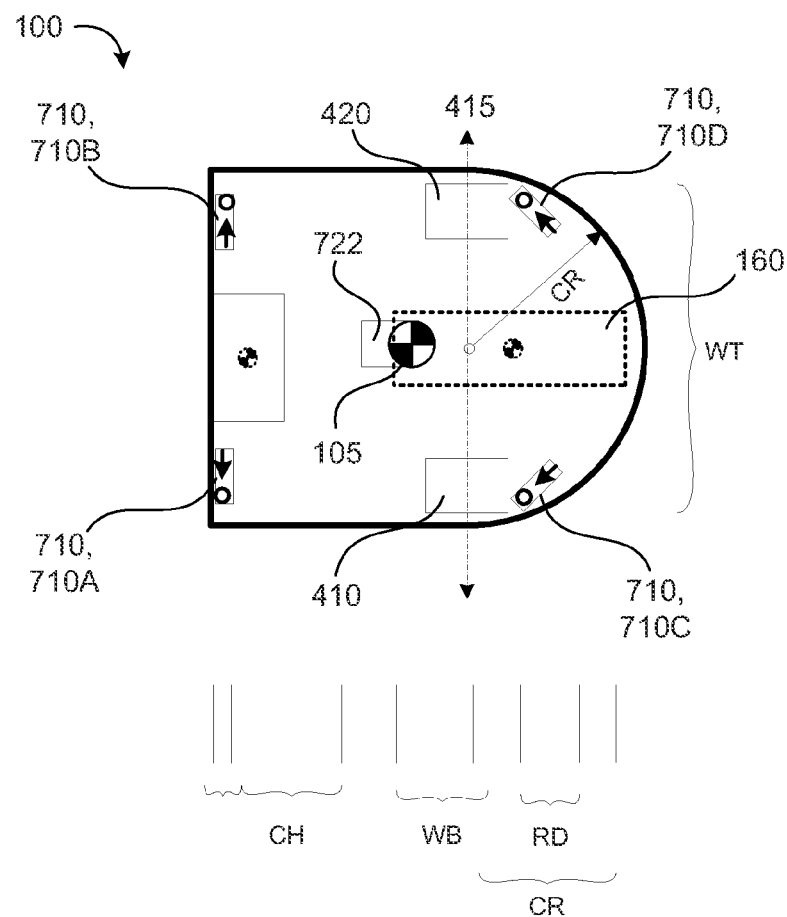
FIG. 11B is a top schematic view of a compact autonomous coverage robot.
Figure 11C:
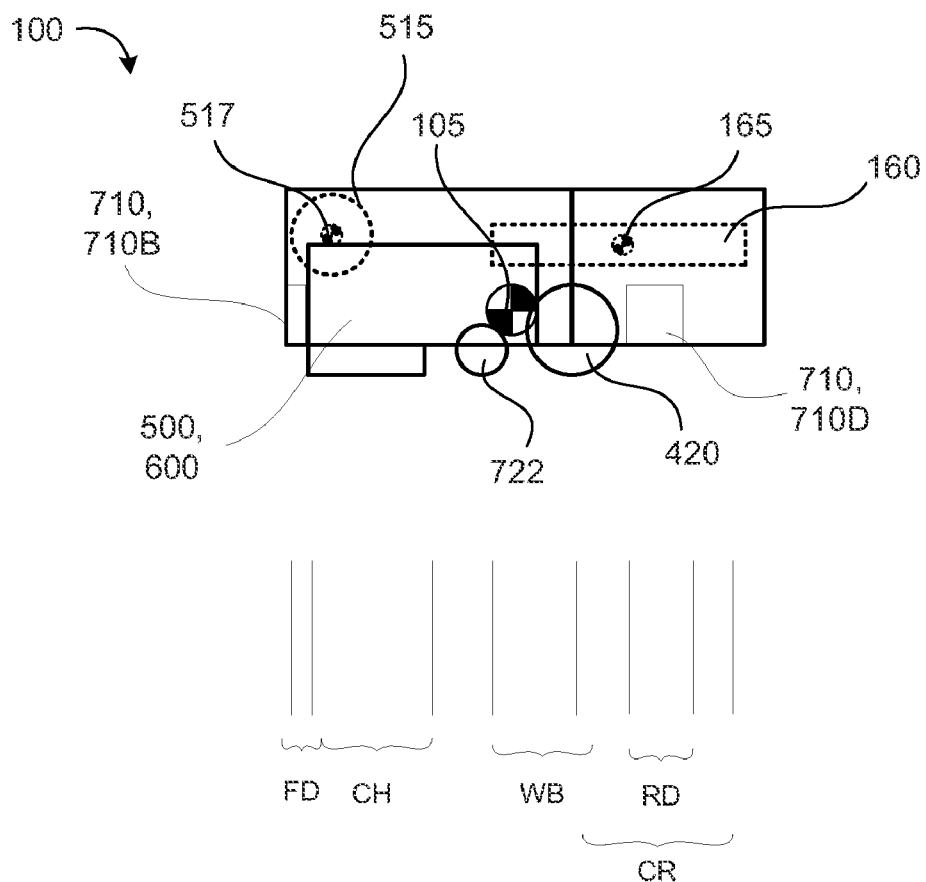
FIG. 11C is a side schematic view of a compact autonomous coverage robot.

The examples shown in FIGS. 11B-11C illustrate the placement of components in the robot 100 to achieve a compact morphology as well as stability for movement. Where LD=flat cliff detector 710 A, 710B thickness, CH=cleaning head 500 front-to-back length, WB=wheelbase, RD=angled cliff detector 710C, 710D front to back length, WT=Wheel Track, and CR=circular radius (>1/2 wheel track), the tombstone shaped robot 100 has a length that is: 1) greater than LD+CH+WB+CR and 2) Equal to or less than 1.4 CR, where 3) RD<1/2 CR, WB>1/3 CR, CG is within WB. The placement of the components to satisfy the above relationship places the center of gravity 105 of the robot forward of the drive wheels 410, 420 and within the circular radius CR. The figures also illustrate the placement of two of the heaviest components, which include the power source 160 having a center of gravity 165 and the brush motor 515 having a center of gravity 517. The brush motor 515 is positioned as far forward as possible to place its center of gravity 517 as far forward as possible, so as to offset the weight of the power source 160. Similarly, the power source 160 is positioned as far forward as possible to place its center of gravity 165 as far forward as possible as well. However, forward placement of the power source 160 is generally obstructed by the cleaning assembly 500 and the bin 610.

Figure 9:
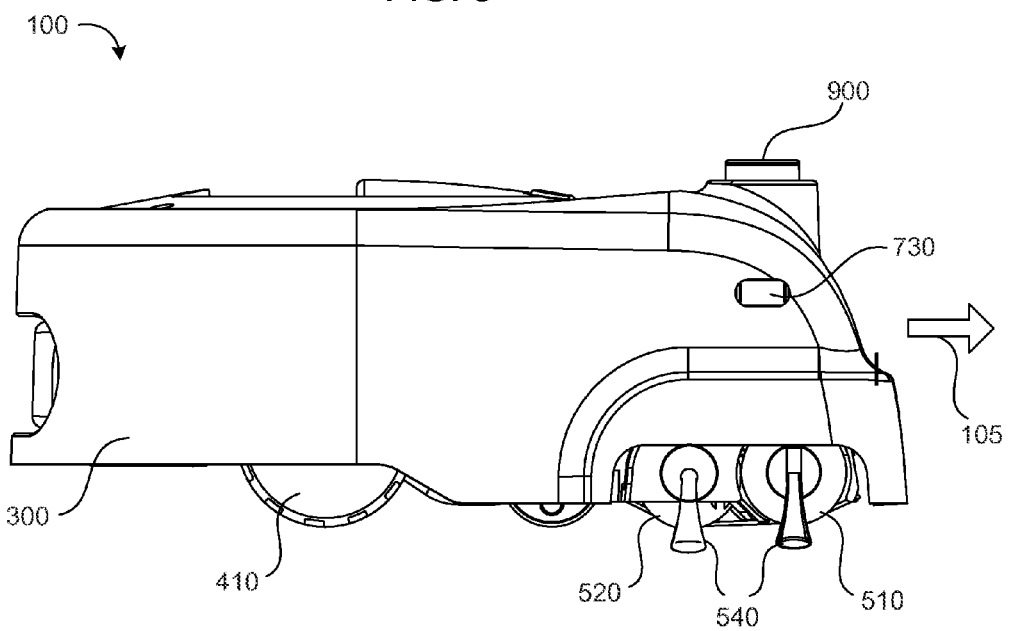
FIG. 9 is right side view of the robot shown in FIG. 1.

Referring to FIGS. 1, 5 and 9, the proximity sensor 730 may be used to determine when an obstacle is close to or proximate the robot 100. The proximity sensor 730 may, for example, be an infrared light or ultrasonic sensor that provides a signal when an object is within a given range of the robot 100. In the examples shown, the proximity sensor 730 is disposed on a side (e.g., right side) of the robot 100 for detecting when an object, such as a wall, is proximate that side.

In a preferred implementation, as shown, the side of the robot 100 having the proximity sensor 730 is the dominant side of the robot 100, which in this case is the right-hand side relative to a primary direction of travel 105. In some examples, the wall proximity sensor 730 is an infrared light sensor composed of an emitter and detector pair collimated so that a finite volume of intersection occurs at the expected position of a wall. This focus point is approximately three inches ahead of the drive wheels 410, 420 in the direction of robot forward motion. The radial range of wall detection is about 0.75 inches. The proximity sensor 730 may be used to execute wall following behaviors, examples of which are described in U.S. Pat. No. 6,809,490, the entire contents of which is hereby incorporated by reference in its entirety.

In some implementation, the proximity sensor 730 includes an emitter and a detector disposed substantially parallel. The emitter has an emission field projected substantially parallel to a detection field of the detector. The proximity sensor 730 provides a signal to the controller 450, which determines a distance to a detected object (e.g., a wall). The proximity sensor 730 needs to be calibrated to accurately detect and allow the controller 450 to determine an object distance. To calibrate the proximity sensor 730 to the albedo (e.g., color or reflectivity) of an adjacent object, the robot 100 bumps into the object on its dominant side and records a reflection characteristic. In the example of an infrared emitter and detector, the controller 450 records a reflection intensity at the moment of contact with the object, which is assumed to be a wall. Based on the recorded reflection intensity at the known calibration distance between the edge of the body 300 and the proximity sensor 730, the controller 450 can determine a distance to the wall thereafter while driving alongside the wall. The controller 450 can implement servo control on the drive motors 412, 422 to drive at a certain distance from the wall, and hence wall follow. The robot 100 may periodically turn into the wall to side-bump the wall and re-calibrate the proximity sensor 730. If the proximity sensor 730 senses an absence of the wall, the robot 100 may decide to re-calibrate the proximity sensor 730 upon recognition of the wall again.

The robot 100 can actively wall follow on its dominant side by using the proximity sensor 730. The robot 100 can passively wall follow on its non-dominant side (or the dominant side if the proximity sensor 730 is not present or active). After bumping into an object (e.g., sensed by the bump sensor 800), the robot 100 can assume that the object is a wall and turn to follow the wall. The robot 100 may back-up before turning, so as to not catch a front corner of the body 300 on the object/wall, thus re-triggering the bump sensor 800 in a forward direction. After turning (e.g., about 90°), the robot 100 drives straight (e.g., along the wall) and slightly turns into the wall, so as to scrape along the wall. The robot 100 can sense that it's scraping along the wall by detecting a side-bump via the multi-directional bump sensor 800, which will be described below. The robot 100 can continue to passively wall follow until the bump sensor 800 no longer detects a side-bump on the current wall-following side of the robot 100 for a certain period of time.

Figure 12A:
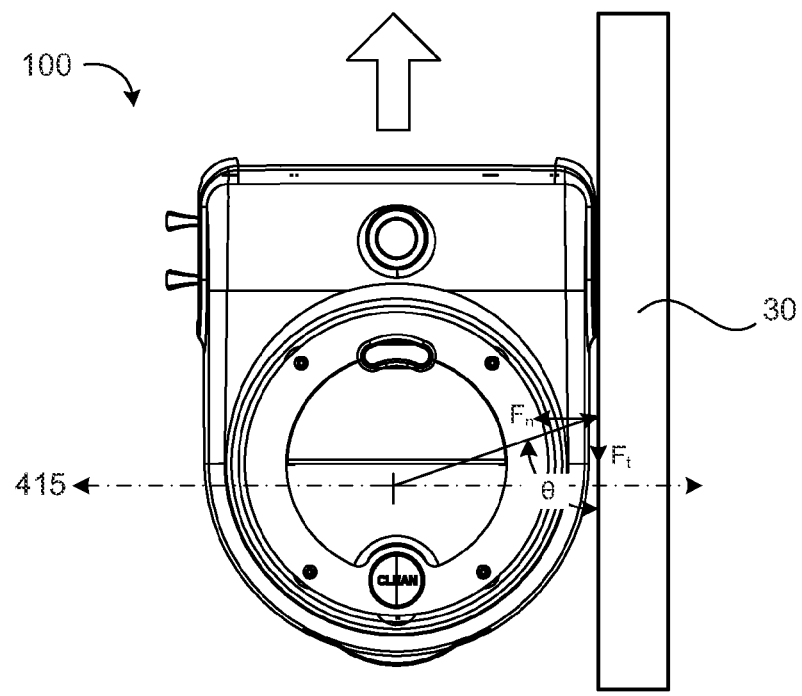
FIG. 12A is a top view of a compact autonomous coverage robot scraping along a wall.

The robot 100 can passively wall follow due in-part to its flat sides of the body 300 and the rear placement of the drive wheels 410, 420. The flat sides allow the robot 100 to scrape along the wall (e.g., substantially parallel to the wall). The positioning of the drive wheels 410, 420 in the rear portion 220 of the chassis 200 allows the robot 100 to swing its forward portion 210 of the chassis 200 into the wall, so as to scrape along the wall. Referring to FIG. 12A, the robot 100 moving forward while in contact with a wall 30 is subject to two forces—a force normal to the wall, $F_n$, and a force tangential to the wall, $F_t$. These forces create opposing torques about a point midway between the wheels, the natural center of rotation of the robot. It can be shown that the torque, $\tau$, is:

$$\tau = rF(\cos\theta \sin\theta - \mu \sin^2\theta)$$

Where $\mu$ is the coefficient of friction between the wall and the robot. Given a value for $\mu$ there is some critical angle $\theta_c$ where the torques are balanced. For $\theta<\theta_c$ the first term to the right in the equation is larger and the robot tends to align with the wall. If $\theta>\theta_c$ then the second term is larger and the robot 100 tends to turn into the wall.

Certain robot geometries, such as the tombstone shape of the robot disclosed can achieve useful values for $\theta_c$. Note that the standard cylindrical geometry has $\theta_c=\pi/2$ regardless of the robot's approach angle to the wall. Thus, passive wall following cannot be achieved with this configuration. To successfully passively wall follow, the offset between the natural axis of robot rotation and the contact point with the wall should be as far forward as possible when robot motion is aligned with the wall. Also, the maximum wall step height that allows passive recovery is an important consideration and is affected by robot shape.

In some examples, the robot 100 can semi-passively wall follow. The robot 100 wall follows on its dominant side, which has the side proximity sensor 730. After detecting an object, assumed to be a wall, by either the bump sensor 800 or the proximity sensor 730, the robot 100 turns to align the dominant side of the robot 100 with the assumed wall. The robot 100 then proceeds to drive along the wall while turning slightly into the wall so as to scrape along the wall. The robot 160 maintains contact with the wall by sensing contact with the wall via the bump sensor 800 or the proximity sensor 730 and the controller 450 implements servo control or the drive motors 412, 422 to drive accordingly along the wall.

Figure 12B:
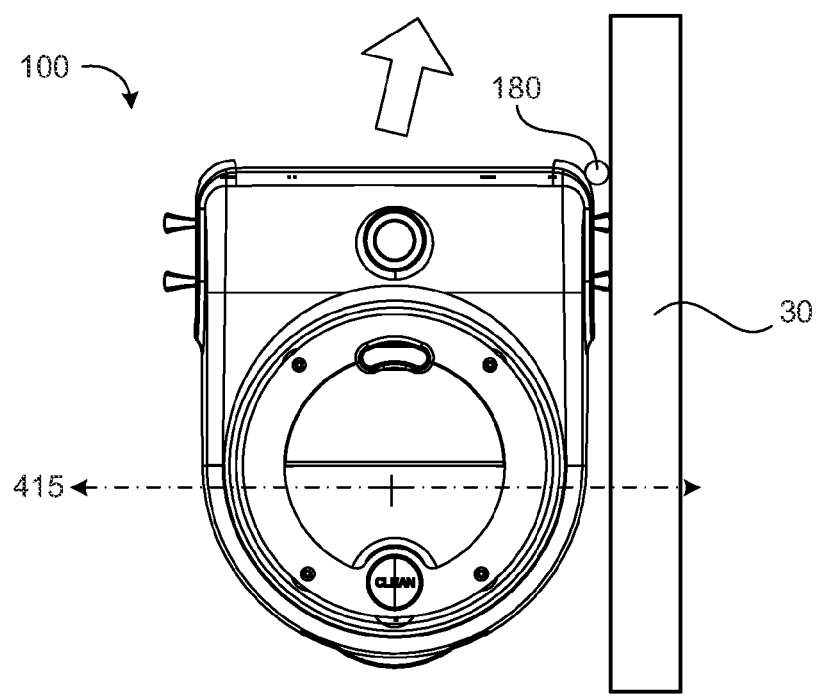
FIG. 12B is a top view of a compact autonomous coverage robot bumping a wall.

In some examples, as shown in FIG. 12B, the robot 100 includes a contact element 180 (e.g., a roller, bearing, bushing, or soft contact point) disposed at one or both of the front corners of the robot 100 to aid wall following. Preferably, the contact element 180 is at least disposed on the front corner of the dominant side of the robot 100. As the robot 100 moves along the wall, it contacts the will with the contact element 180, instead of merely scraping along the wall. In some implementations, the contact element 180 is a side brush that notes along a vertical axis and extends beyond the body 300. The side brush maintains a buffer space between a wall and the robot body 300.

The bump sensor 800 is used to determine when the robot 100 has physically encountered an object. Such sensors may use a physical property such as capacitance or physical displacement within the robot 100 to determine when it has encountered an obstacle. In some implementations, the bump sensor 800 includes contract sensors disposed about the periphery of the body 300. In preferred implementations, the bump sensor 800 is configured to detect movement of the body 300 over the chassis 200. Referring to FIGS. 5, 10 and 13A-13D, the body 300 of the robot 100 functions as a bumper and is flexibly coupled to the chassis 200 by one or more elastic elements 309 (e.g., springs, flexible pins, elastomeric pegs, etc) (see FIG. 5). The elastic elements 309 allow the bumper style body 300 to move in at least two directions (preferably three directions). In some examples, the bump sensor 800 includes a bump sensor base 810 carrying at least three (preferably four) detectors 820 (e.g., light or infrared light detectors, such as a photo-detector) equally spaced on the bump sensor base 810. In the example shown, the bump sensor base 810 is a printed circuit board carrying the detectors 820. The printed circuit board—bump sensor base 810 is in communication with and may carry the controller 450. The bump sensor 800 includes a bump sensor shroud 830 defining a cavity 832 that is positioned over and covering the bump sensor base 810. The bump sensor shroud 830 houses an emitter 840 (e.g., light or infrared light emitter), which emits a signal 842 (e.g., light) through an orifice 834 defined by the bump sensor shroud 830 through a wall 836 of the cavity 832. The orifice 834 collimates the signal 842, so as to have a directed path. As the bump sensor shroud 830 moves over the bump sensor base 810, the signal 842 moves over the detectors 820, which provide corresponding signals to the controller 450 (e.g., proportional to signal intensity). Based on the detector signals, the controller 450 is configured to determine the direction of movement of the body 300 over the chassis 200, and optionally the rate of movement. The bump sensor 800 may detect 360 degrees of movement of the bump sensor shroud 830 over the bump sensor base 810. The drive system 400 and/or the controller 450 are configured to alter a drive direction of the robot 100 in response to the detector signal(s) received from the detectors 820.

Figure 13A:
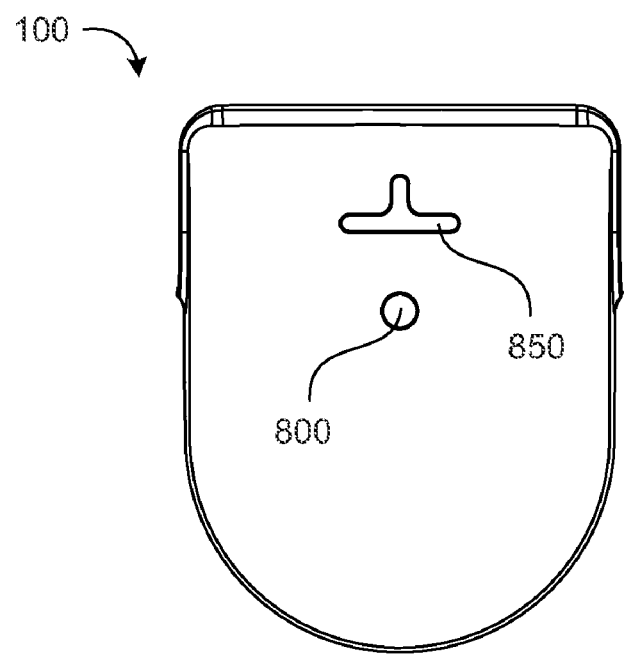
FIG. 13A is a top schematic view of a compact autonomous coverage robot with a bumper guide.
Figure 13B:
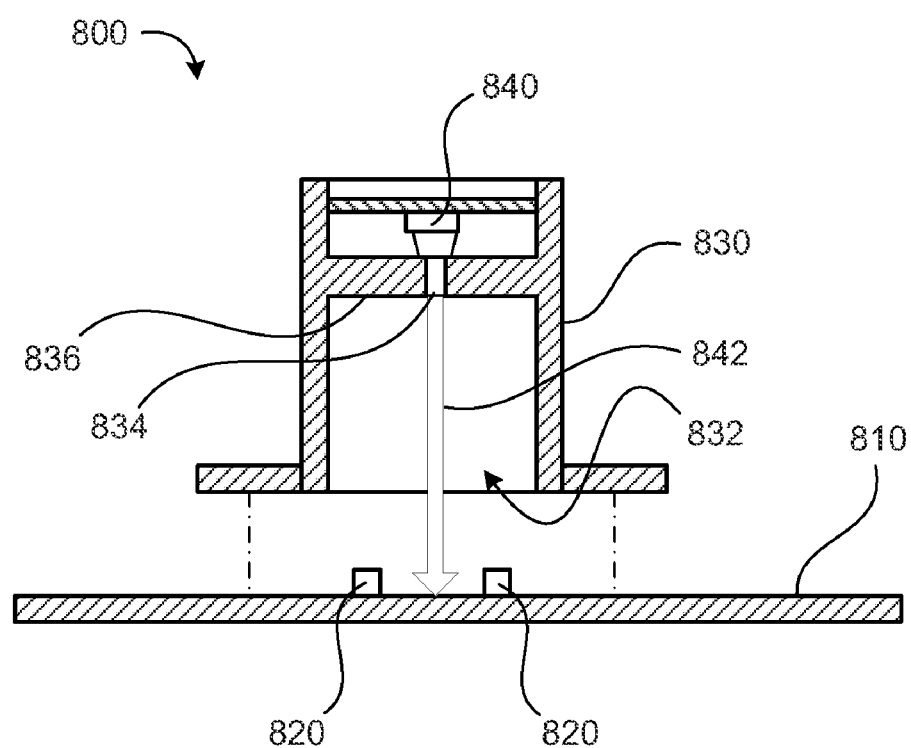
FIG. 13B is a side section view of a bump sensor.
Figure 13C:
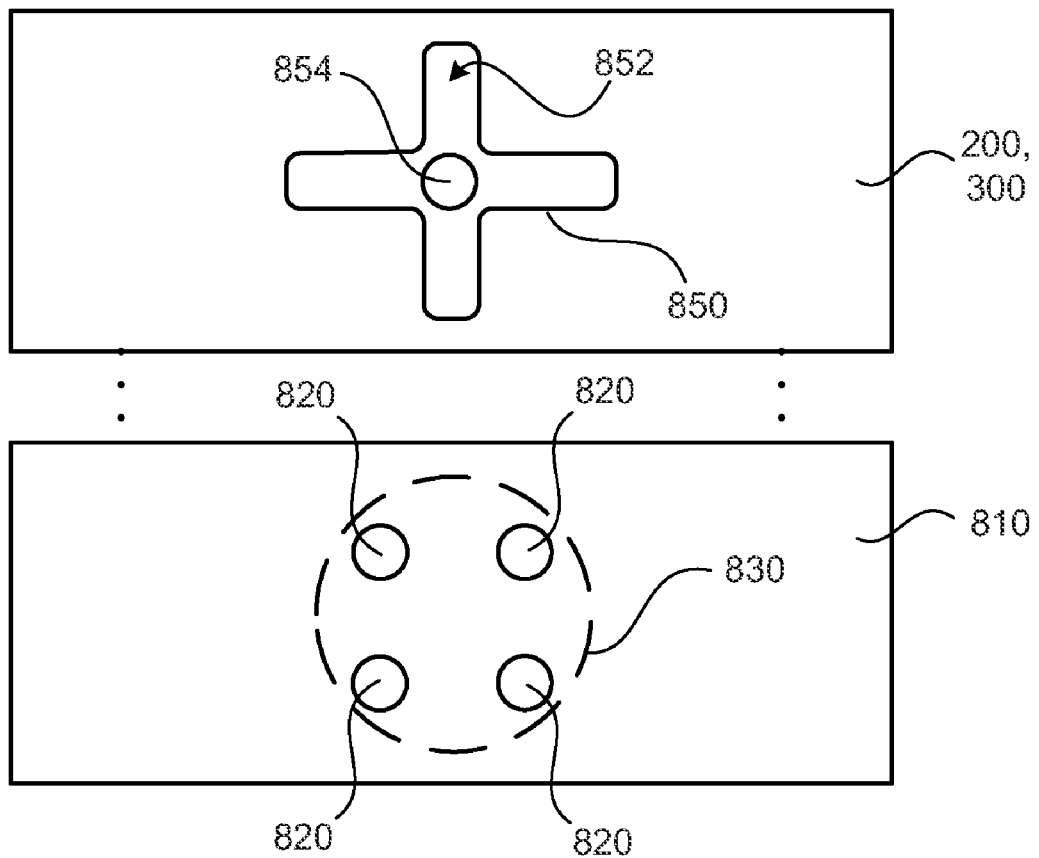
FIG. 13C is a top schematic view of a bump sensor system with a bumper guide.

In the example shown in FIGS. 13A and 13C, the bump sensor 800 includes a bumper guide 850 that guides the body 300 along two directions of movement. As noted above, the body 300 is coupled to the chassis by elastic elements 309 that allow the body 300 to be displaces both by translation and rotation. The bumper guide 850 may be configured as a "T", cross shaped, or orthogonal groove(s) 852 formed in a member that moves with the bumper 300 (relative to the chassis 300), mated to at least one guide pin 854 on the chassis 200 that doesn't move (relative to the chassis 200). In other implementations, the bumper guide 850 is defined in a portion of the chassis 200 and the guide pin 854 is secured to the bumper body 300. When the bumper 300 is displaced, bumper guide 850 tends to guide the bumper 300 in that area along an arm of the bumper guide 850, which permits "translate" bumps as is and tends to otherwise reduce rotational components or guide rotation into translation, improving the detection of the bump sensor 800.

Figure 10:
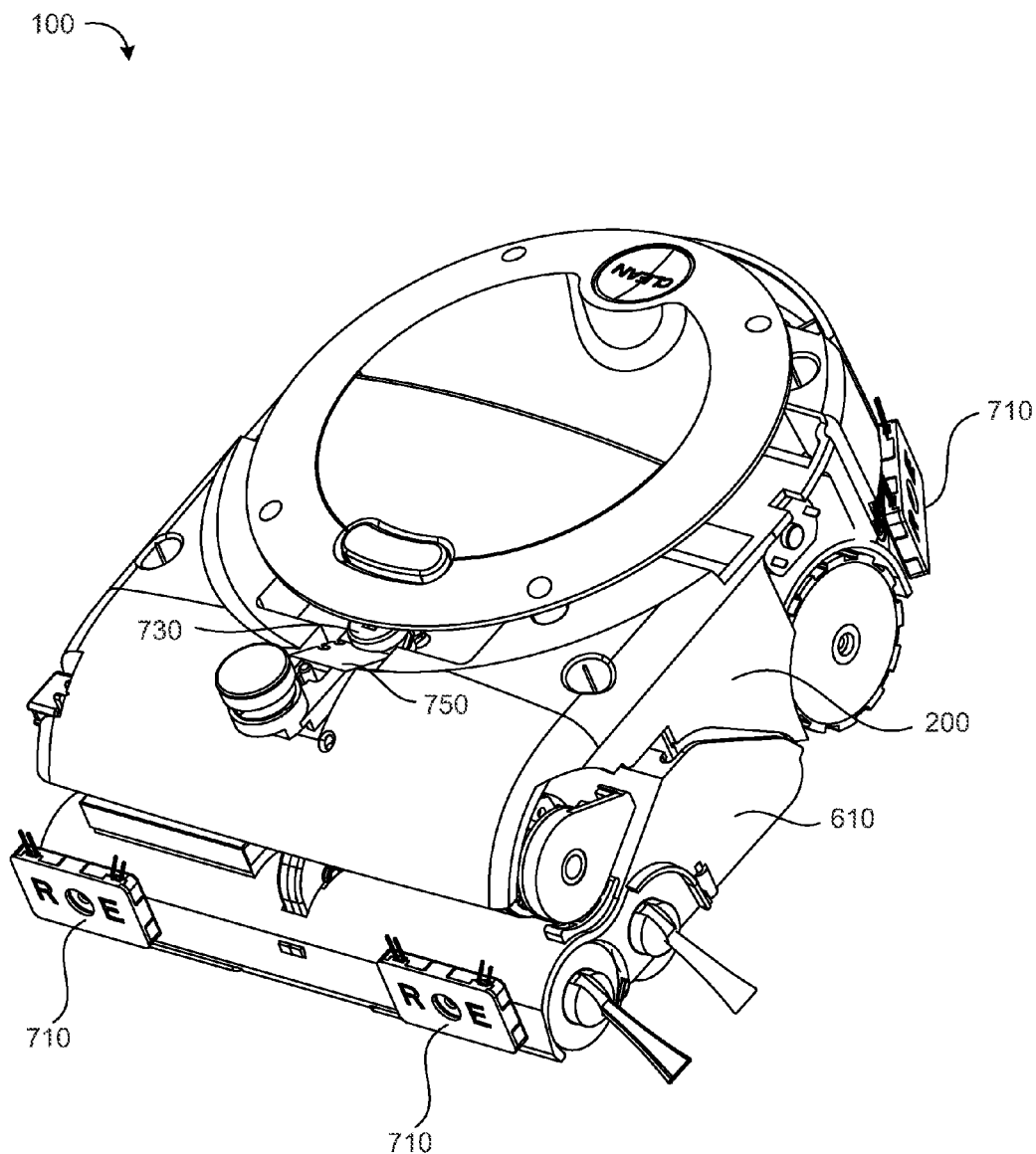
FIG. 10 is top perspective view of a compact autonomous coverage robot.
Figure 13D:
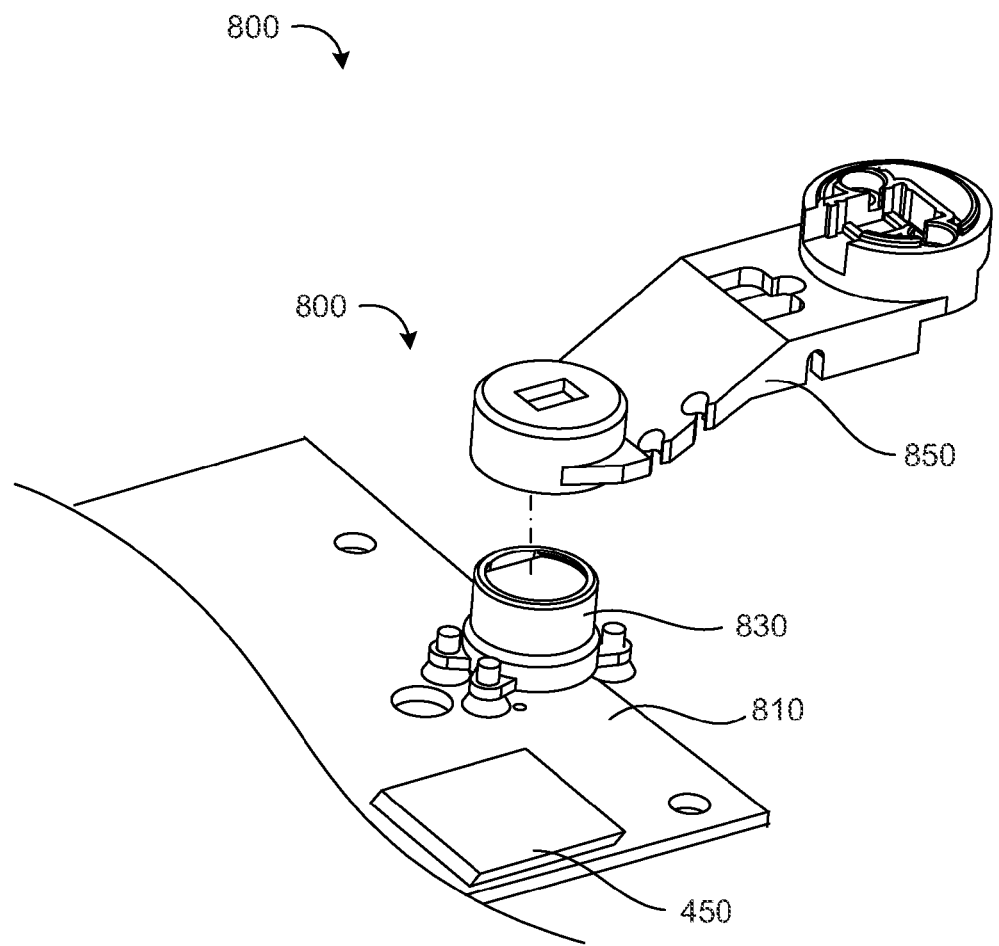
FIG. 13D is a perspective view of a bump sensor system.

In the examples shown in FIGS. 5, 10 and 13D, the bump sensor 800 includes a bumper connector arm 850 secured between the bump sensor shroud 830 and the bumper style body 300. The bumper connector arm 850 translates movement of the body 300 to the bump sensor shroud 830. The bump sensor shroud 830 can be secured to the bump sensor base 710 and be comprised of an elastic material such that the bump sensor shroud 830 can move by elastic deflection in relation to the bump sensor base 810. In other examples, the bump sensor shroud 830 is positioned over the bump sensor base 710 and allowed to move freely in relation to the bump sensor base 810.

The robot 100 has a forward drive direction and carries the omni-directional receiver 900 on an upper portion 305 of the body 300 above the forward portion 202 of the chassis 200. FIG. 1 illustrates an example position of the omni-directional receiver 900 on the robot 100, as being the highest part of the robot 100. The omni-directional receiver 900 may be used to sense when the robot 100 is in close proximity to a navigation beacon (not shown). For example, the omni-directional receiver 900 may relay a signal to a control system that indicates the strength of an emission, where a stronger signal indicates closer proximity to a navigation beacon.

Figure 14:
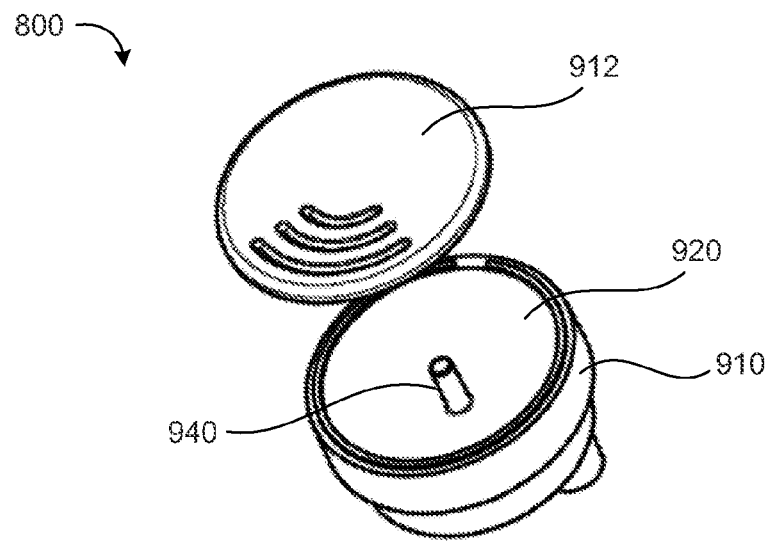
FIG. 14 is a contour shaded diagram of the view of the compact cleaning robot shown in FIG. 3.
Figure 15:
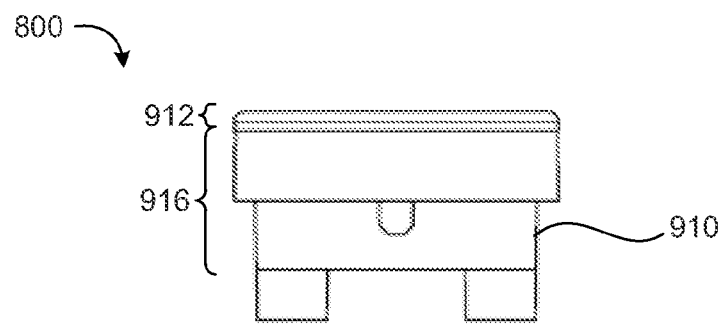
FIG. 15 is a perspective exploded view of an omni-directional sensor.
Figure 16:
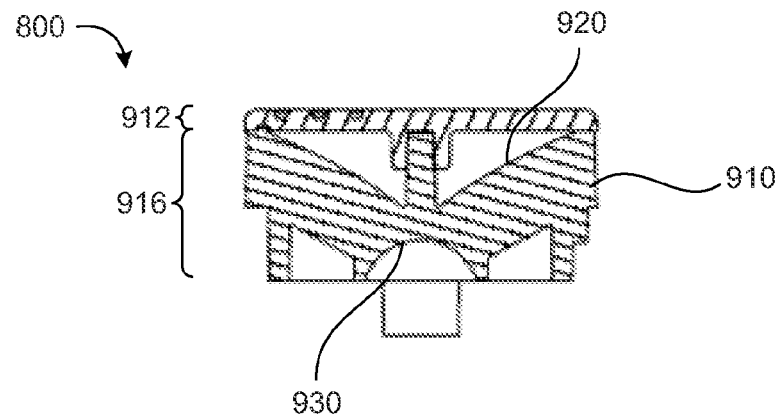
FIG. 16 is a side view of the omni-directional sensor shown in FIG. 15.

FIGS. 14-16 show perspective, side, and cut-away views of the omni-directional receiver 900. The omni-directional receiver 900 includes a housing 910, a conical reflector 920 and an emission receiver 930. The housing 910 has an upper portion 912 and an inner cavity 916. The upper portion 912 may allow a transmission of an emission into the inner cavity 916. The conical reflector 920 is located on an upper surface of the cavity 916 to reflect emissions falling on the upper portion 912 of the housing 910 into the inner cavity 916. The emission receiver 930 is located in the inner cavity 916 below the conical reflector 920. In some implementations, the omni-directional receiver 900 is configured to receive transmissions of infrared light (IR). In such cases, a guide 940 (e.g., a light pipe) may guide emissions reflected off the conical reflector 920 and channel them to the emission receiver 930.

The controller 450 may be configured to propel the robot 100 according to a heading setting and a speed setting. Signals received from the navigational sensor system 700 may be used by a control system to issue commands that deal with obstacles, such as changing the commanded speed or heading of the robot 100. For instance, a signal from the proximity sensor 730 due to a nearby wall may result in the control system issuing a command to slow down. In another instance, a collision signal from the bump sensor 800 due to an encounter with an obstacle may cause the control system to issue a command to change heading. In other instances, the speed setting of the robot 100 may be reduced in response to the contact sensor and/or the heading setting of the robot 100 may be altered in response to the proximity sensor 730.

The controller 450 may include a first independent behavioral routine configured to adjust the speed setting of the robot 100; and a second independent behavioral routine configured to alter the heading setting of the robot 100, in which the first and second independent behavioral routines are configured to execute concurrently and mutually independently. The first independent behavioral routine may be configured to poll the proximity sensor 730, and the second independent behavioral routine may be configured to poll the bump sensor 800. While implementations of the robot 100 discussed herein may use behavioral based control only in part or not at all, behavior based control is effective at controlling the robot to be robust (i.e. not getting stuck or failing) as well as safe.

FIGS. 17-25 illustrate another implementation of the autonomous coverage robot 101. The robot 101 includes a chassis 200 having a forward portion 210 and a rearward portion 220 and a body 300 having a forward portion 301 and a rearward portion 303 configured to substantially follow the contours of the chassis 200. The forward portion 210 of the chassis 200 defines a substantially rectangular shape and the rearward portion 220 defines an elliptical shape. The forward portion 301 of the body 300 may be flexibly connected to the chassis 200. A handle 330 is disposed on or defined by an upper portion 305 of the rearward portion 303 of the body 300.

In an example configuration, the form factor of the robot 101 is about 15 cm in diameter, about 7.5 cm in height, and functions on battery power to clean for about six hours before requiring recharge. Also, for example, the robot 101 may effectively clean the floor of a single average-size room in about 45 minutes, or several smaller areas.

Figure 18:
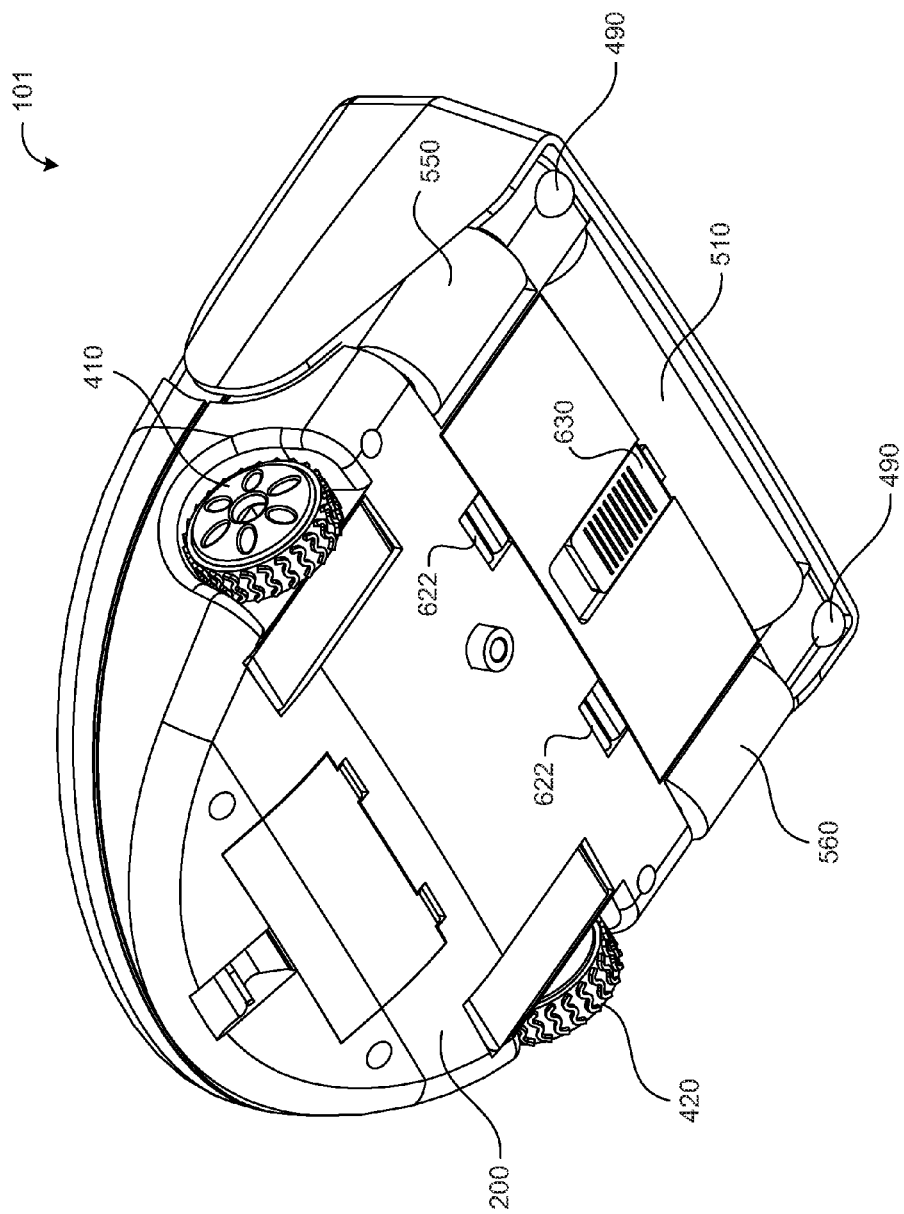
FIG. 18 is a bottom perspective view of the robot shown in FIG. 17.
Figure 19:
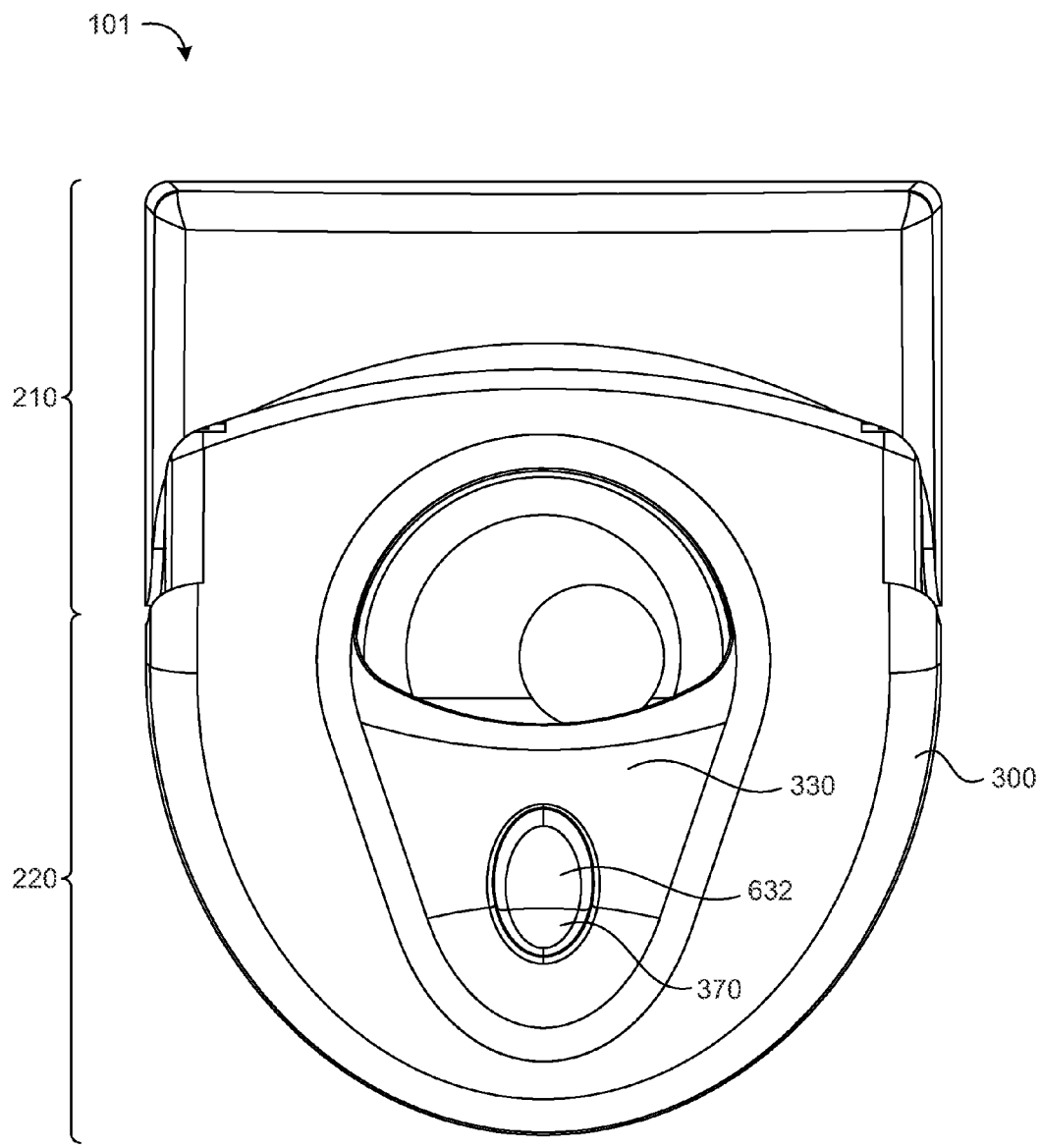
FIG. 19 is a top view of the robot shown in FIG. 17.
Figure 20:
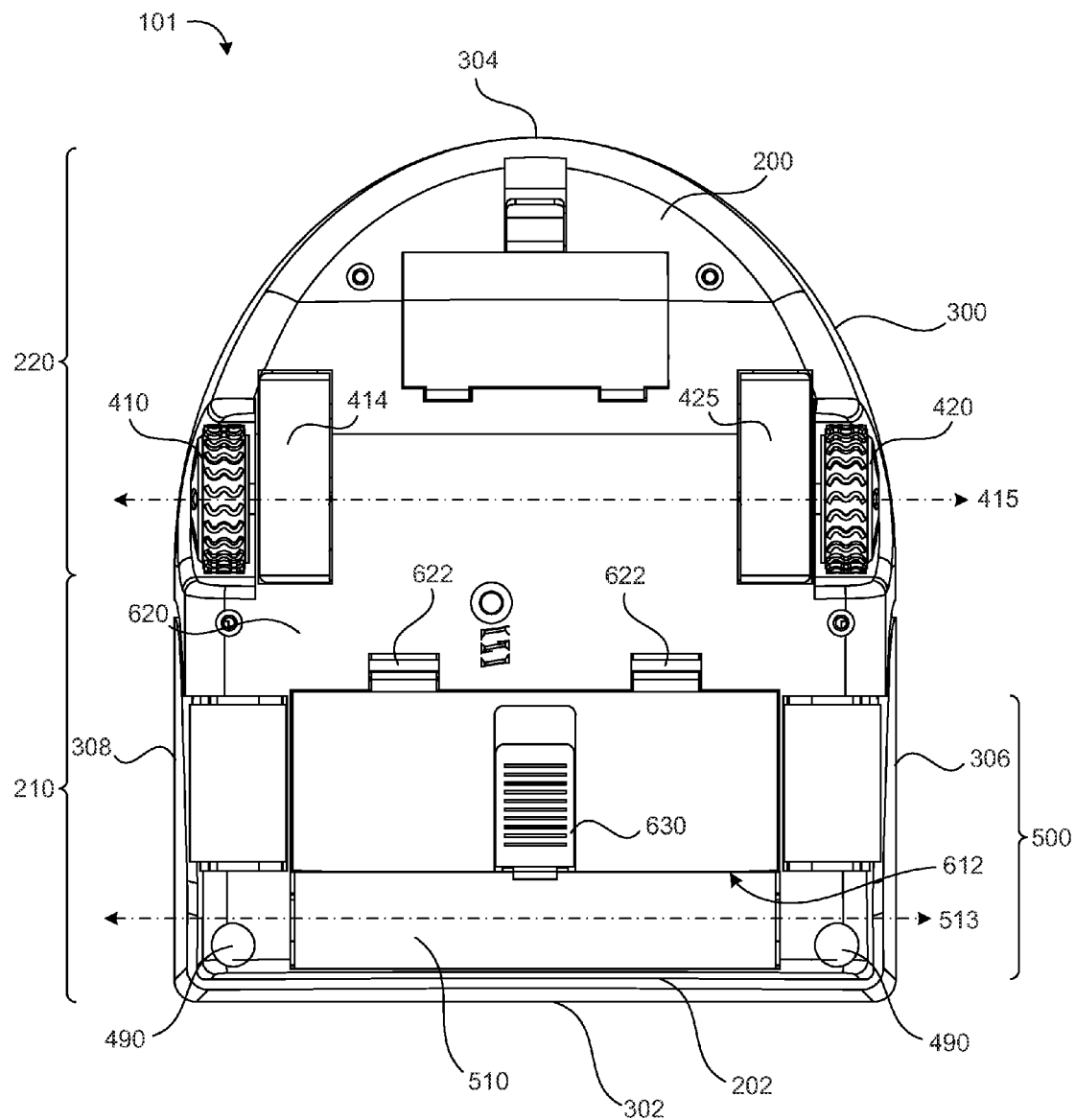
FIG. 20 is a bottom view of the robot shown in FIG. 17.
Figure 21:
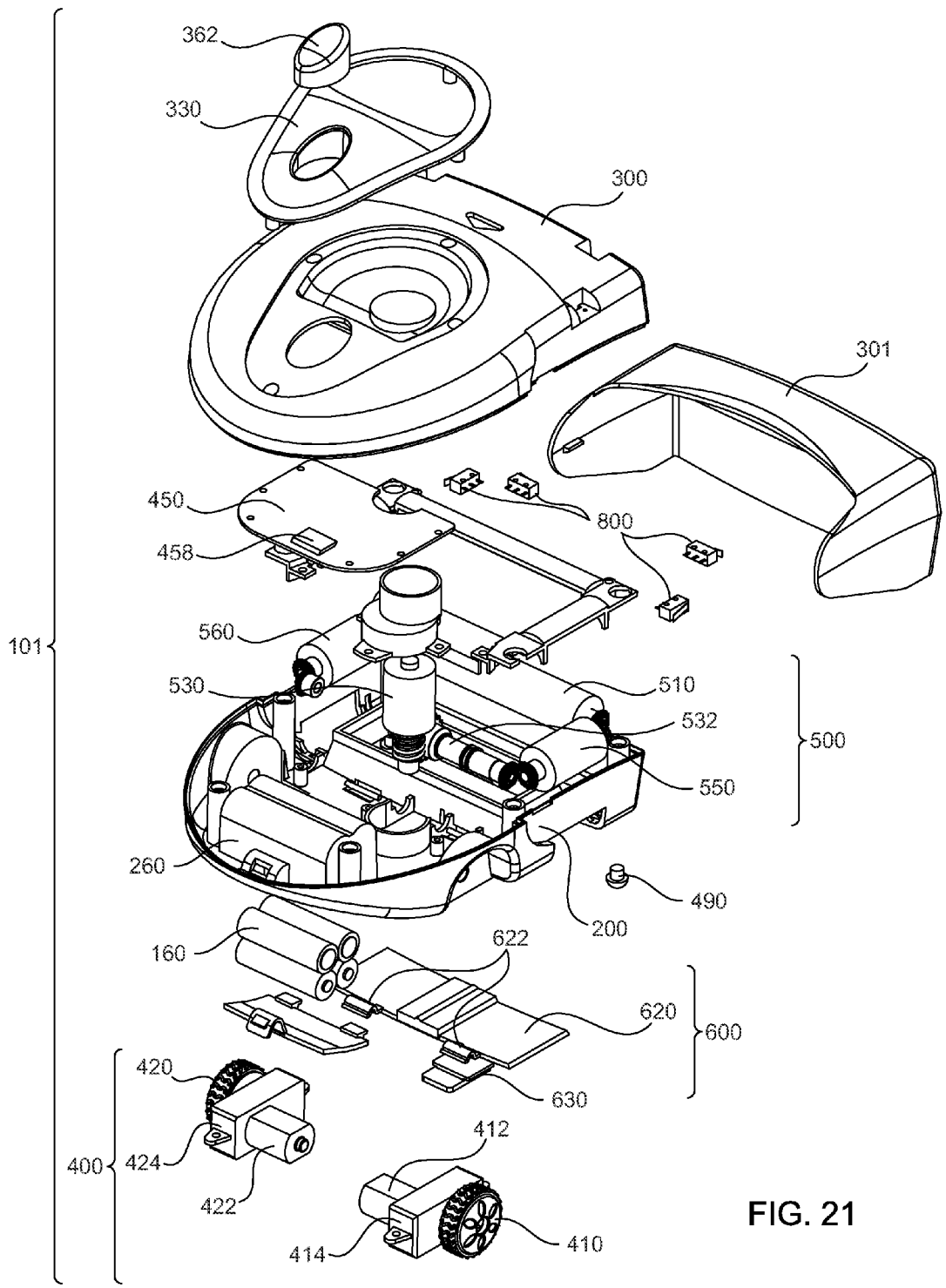
FIG. 21 is an exploded view of the top aspect shown in FIG. 17.
Figure 22:
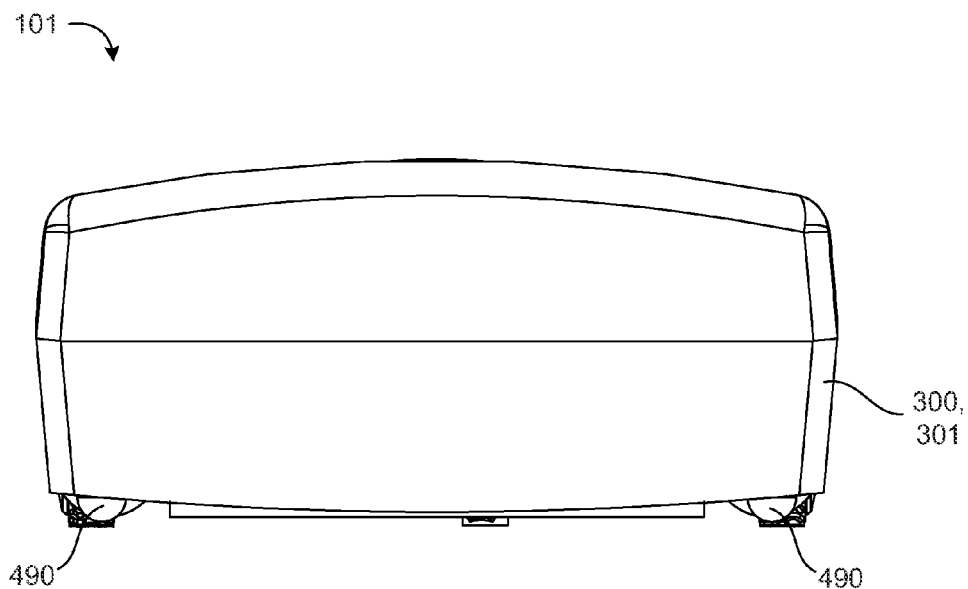
FIG. 22 is a front view of the robot shown in FIG. 17.
Figure 23:
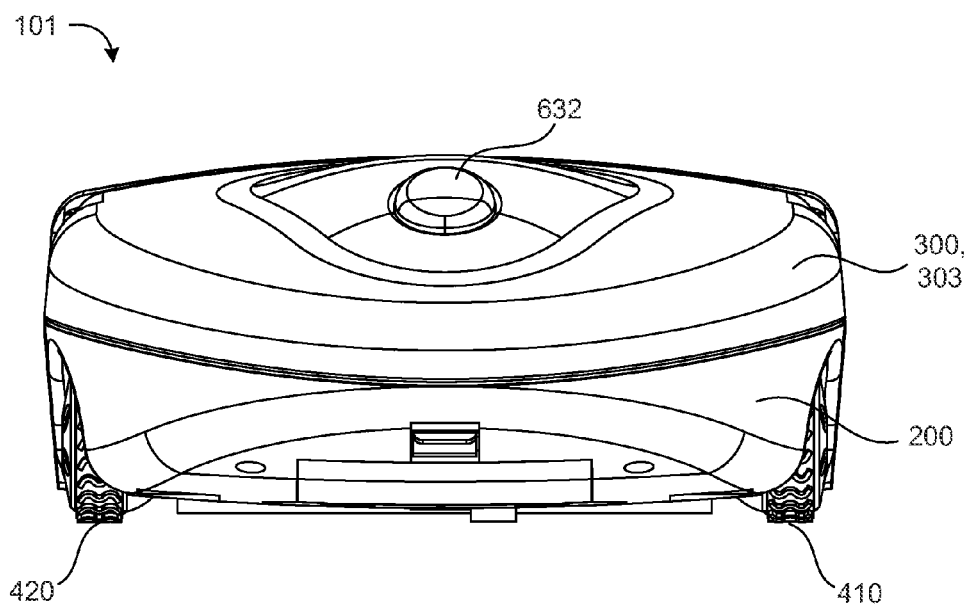
FIG. 23 is a rear view of the robot shown in FIG. 17.

Referring to FIGS. 18, 20 and 21, the robot 101 includes a drive system 400 carried by the chassis 200, as described above. In the implementation shown, the drive motors 412, 422 are disposed adjacent and in-line (e.g., co-axial) with their respective drive wheels 410 and 420. In some examples, the robot includes a gear box 414, 424 coupled between the drive wheel 410, 420 and its respective drive motor 412, 422. The robot 101 includes a controller 450 in communication with the drive system 400. The controller 450 is configured to maneuver the robot 101 to pivot in place.

The robot 101 includes a cleaning assembly 500 mounted on the front portion 210 of the chassis 200 includes a first, front roller brush 510 rotatably mounted substantially near and substantially parallel to the front edge 202 of the chassis 200. The cleaning assembly 500 includes second and third side roller brushes 550, 560 rotatably mounted orthogonally to the front roller brush 510 substantially near respective right and left side edges 306, 308 of the body 300. The roller brushes 510, 550, 560 are driven by a cleaning motor 530 coupled to the roller brushes 510, 550, 560 by a gear box 532. The cleaning motor 530 is positioned rearward of the front roller brush 510 and between the side roller brushes 550, 560.

The robot 101, in a preferred implementation, includes only one kind of cleaning mechanism. For example, the robot 101 shown in FIG. 18 includes bristle-brush rollers for the front roller brush 510 and side roller brushes 550, 560. The bristle-brush rollers may be similar to the brush rollers found in the SCOOBA® robot marketed by iRobot Corporation, for example; or it may be similar to the R2 or R3 brush types used in the ROOMBA® robot, as further examples. In one implementation, the brush does not pick up long hairs or fibers that would tend to become tightly wrapped around the brush, in order to minimize the frequency of maintenance required by the user for removing debris from the brush. Alternatively, the robot 101 may include two or more varieties of cleaning mechanism, such as both a vacuum and bristle brushes, inter alia.

In the some examples, the front roller brush 510 and the side roller brushes 550, 560, each rotate about a horizontal axis parallel to the work surface, thereby providing a horizontal cleaning assembly 500, although the main work width of the coverage robot 100 may include vertically rotating brushes, no brushes in lieu of a vacuum, a reciprocating brush, a circulating belt member, and other known cleaning implements. Each roller brush 510, 520, 550, 560 may have a cylindrical body that defines a longitudinal axis of rotation. Bristles are attached radially to the cylindrical body, and, in some examples, flexible flaps are attached longitudinally along the cylindrical body. As the roller brush 510, 520, 550, 560 rotates, the bristles and the flexible flaps move debris on the work surface, directing it toward the bin 610 in the robot 100. In examples including a vacuum unit, the brushes 510, 520, 550, 560 may also direct debris or dirt toward a suction path under the cleaning robot 100. In the case of a wet cleaning robot, the brushes 510, 520, 550, 560 may have instead a scrubbing function, and a vacuum or other collector may collect waste fluid after scrubbing.

Figure 27:
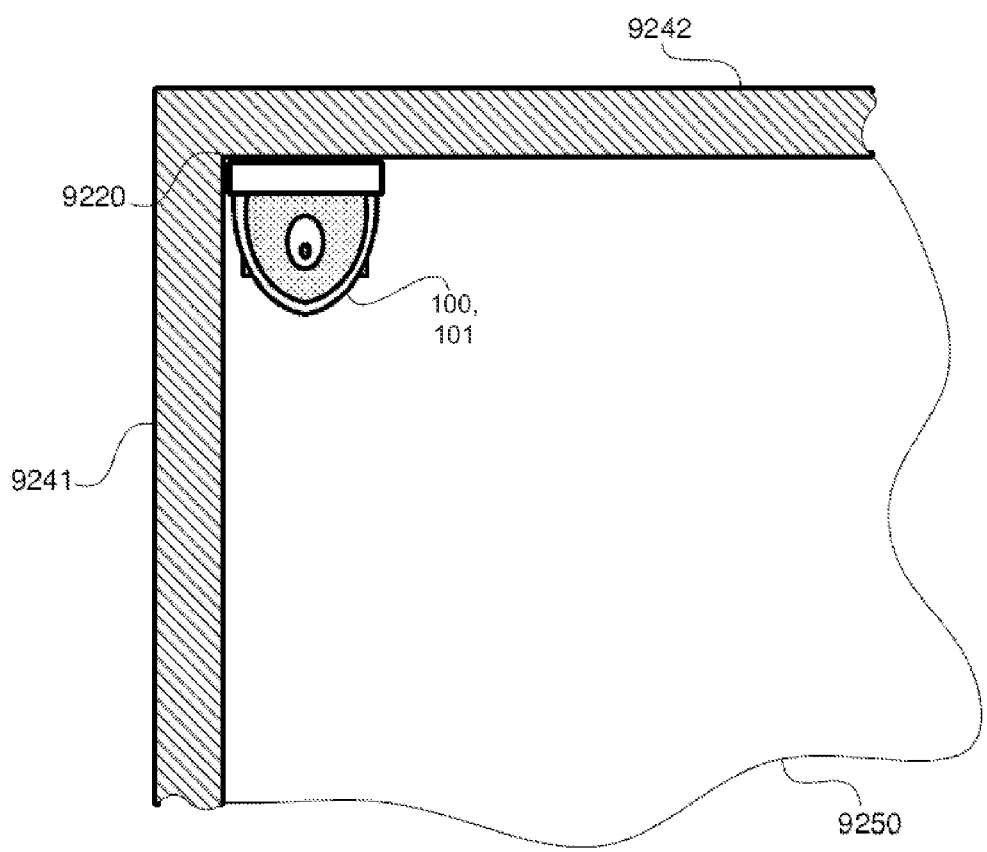
FIG. 27 is a plan view of a compact cleaning robot navigating flush into a wall corner.

In the examples shown, the effective components of the cleaning assembly 500 such as the brushes 510, 550, 560 are disposed toward the extreme front corners of the forward portion 210 of the chassis 200. As a result, the area of floor that the rectangular forward portion 210 of the chassis 200 can cover is maximized, and portions of the floor that are not covered are minimized, as illustrated in FIG. 27.

By including only a single cleaning mechanism, such as the cleaning assembly 500, rather than a combination of two or more varieties of cleaning mechanisms (such as, for example, both a roller brush and a vacuum; or both wet and dry cleaning mechanisms, which may necessitate two or more storage chambers, inter alia), the robot 101 may be made more compact relative to otherwise.

Referring to FIGS. 18, 20, 21 and 24, the robot 101 includes a bin assembly 600, as described above. In the examples shown, the chassis 200 defines the debris chamber or bin 610, which is positioned between the cleaning assembly 500 and the drive system 400. In specific examples, the bin 610 is forward of the drive wheels 410, 420 and rearward of the front roller brush 510. As the front roller brush 510 and the side roller brushes 550, 560 spin against the floor, they agitate debris and sweep the debris into a debris chamber/bin 610 within the robot 101 via an intake slot or other suitable opening leading from the roller brushes 510, 550, 560 to the debris chamber 610.

The bin cover 620, in the example shown, is releasably connected to the chassis 200 by one or more hinges 622 (e.g., living hinge, peg and socket, etc.). In some implementations, the bin-cover release 630 is actuatable from substantially near or at the handle 330, thereby allowing actuation of the bin-cover release 630 while holding the handle 330. In other implementations, the bin-cover release 630 is actuatable near or on the bin cover 620, such that a user holds the handle 330 with one hand and opens the bin cover 620 via the bin-cover release 630 with another hand (see FIG. 24). In some implementations, the bin cover release 630 is a spring biased latch or latching button attractable by pressing downwardly (e.g., button) or pulling upwardly (e.g., trigger).

Figure 24:
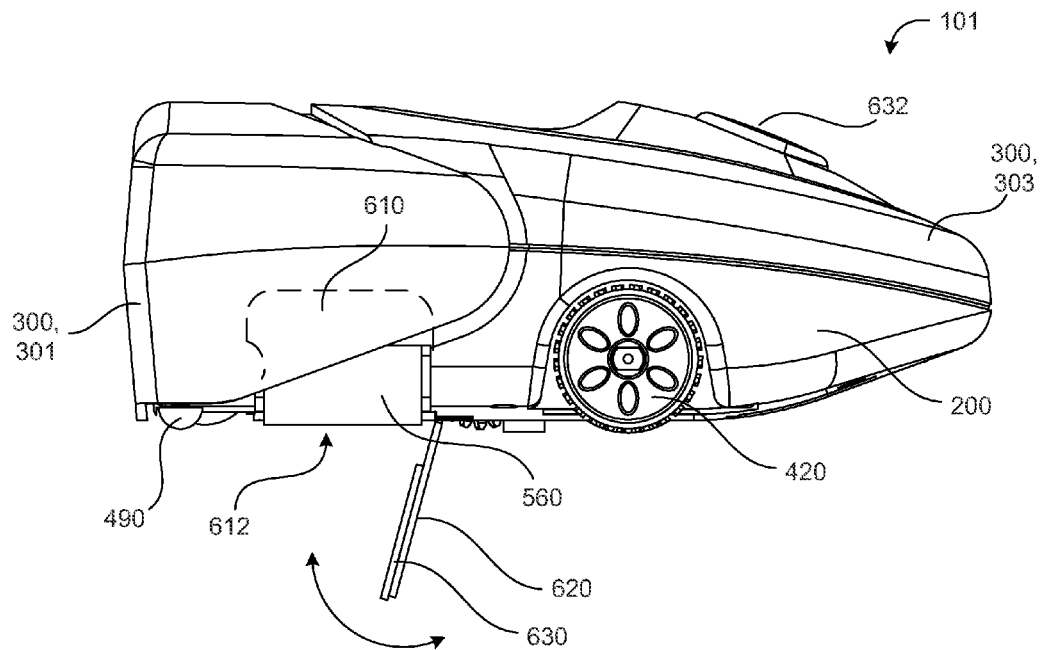
FIG. 24 is a left side view of the robot shown in FIG. 17 with a bin cover in its open position.
Figure 25:
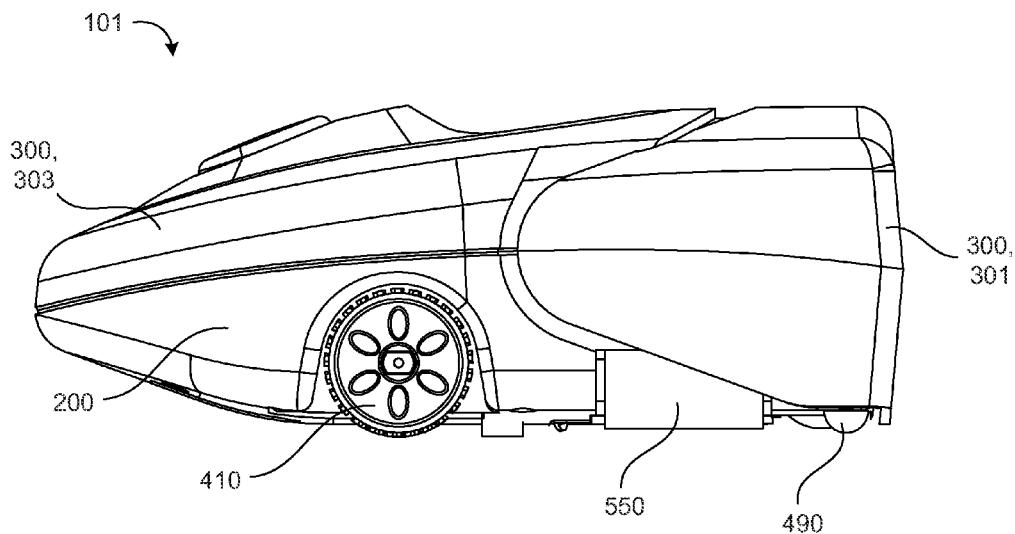
FIG. 25 is right side view of the robot shown in FIG. 17.

In the examples shown, the robot 101 includes a handle 330 is disposed on or defined by an upper portion 305 of the body 300. A user can grasp the handle 330 to lift the robot 101 and transport it manually. In addition, the robot 101 may include one or more buttons 632 proximal to the handle 330. The button 632 is preferably operable by one hand, while the user's hand grips the robot 101 by the handle 330. The button 632 is configured to actuate a bin-cover release 630, which is operable to control holding the bin cover 620 in its closed position and releasing the bin cover 620 to move to its open position. In one example, as illustrated in FIG. 24, when the user operates the button 632, the bin-cover release 630 disengages and the bin cover 620 swings open about the hinges 622. With the bin cover 620 in its open position, the contents of the debris chamber/bin 610 can drop out of the robot 101 under the force of gravity. The robot 101 may also include a spring to ensure that the bin cover 620 opens in case the weight of the debris in the debris chamber 610 is insufficient to swing the bin cover 620 open, for example.

The robot 101 includes a power source 160 (e.g., battery) in communication with the drive system 400 and/or the controller 450, and removably secured to the chassis 200. In the examples shown in FIGS. 20 and 21, the power source 160 is received by a power receptacle 260 defined by the rearward portion 220 of the chassis 200. A power cover 262 is releasably secured to the chassis 200 to hold and/or cover the power source 160 in the power receptacle 260. In the examples shown, the power source 160 is positioned in the rearward portion 220 of the chassis 200, rearward of the drive wheels 410, 420. In this position, the weight of the power source 160 offsets the weight of the cleaning assembly 500 to position a center of gravity of the robot 101 substantially about a center of the chassis 200.

The compact dimensions of the robot 101 allow the robot 101 to navigate under potential obstacles such as chairs, tables, sofas, or other household objects, and perform floor cleaning in these hard-to-reach areas. In addition, the robot 101 may include a clearance sensor disposed on a top surface thereof, such as a sonar range-finder or light-sensitive diode, that scans directly overhead. When the clearance sensor detects the presence of an object within a threshold distance—such as, for example, two feet—the robot 101 may continue moving until the overhead space is clear. Accordingly, the robot 101 may avoid becoming "lost" underneath furniture, out of view of the user, for example.

As the drive system 400 propels the robot 101 over the floor, the front roller brush 510 preferably rotates in the same direction as the drive wheels 410, 420 but at a rate faster than the rate of the robot 101 traversing over the floor, so as to sweep debris into the debris chamber 610. In addition, the side brushes 550, 560 also sweep debris inward at the same time. In one example, the bristles of the brushes 510, 550, 560 may extend downward by about 0.015 to 0.025 inches beyond the extent of the wheels 410, 420, while rotating at between about 600 and about 1600 RPM.

The form factor of the robot 101 may be made more compact by omitting a caster wheel or other support structure. Due to the width of the front brush roller 510, as well as the side brushes 550, 560 disposed at opposite lateral sides of the robot 101, the robot 101 may omit a third caster or free wheel aside from the drive wheels 410, 420 without significantly impacting the balance or stability of the robot 101. Alternatively, the robot 101 may further include support bearings 490, as shown in FIGS. 18, 20, and 22-25, disposed proximal to the extreme opposite corners of the forward portion 210 of the chassis 200. The support bearings 490 may include a single rigid member of a smooth and/or self-lubricating material, such as polytetrafluoroethylene or a polyoxymethylene polymer; or, the support bearings 490 may include a roller bearing or any other suitable mechanism for preventing the robot 101 from tipping or losing balance while providing a low frictional resistance as the robot 101 traverses the floor.

Referring to FIG. 21, the robot 101 includes a navigational sensor system 700 in communication with the controller 450 that allows the robot 101 to be aware of its surroundings/environment and react in prescribed manners or behaviors according to its sensed perception of its surroundings/environment. In the example shown, the navigational sensor system 700 includes one or more bump sensors 800 and/or a stasis detector 720. Using input from the navigational sensor system 700, the controller 450 generates commands to be carried out by the robot 101. As a result, the robot 101 is capable of cleaning surfaces in an autonomous fashion.

The bump sensor 800 is used to determine when the robot 100 has physically encountered an object. Such sensors may use a physical property such as capacitance or physical displacement within the robot 100 to determine when it has encountered an obstacle. In the example shown in FIG. 21, the bump sensor 800 is a contract switch disposed about the periphery of the front portion 210 of the chassis 200, between the chassis 200 and the forward portion 301 of the body 300. The forward portion 301 of the body 300 is flexibly or slidably attached to the chassis 200 in a manner that allows contact with an obstacle to be translated to the bump sensor(s) 800. In preferred implementations, the robot includes bump sensors 800 disposed at the forward corners of the chassis 200, with at least one bump sensor 800 disposed on each side of each corner, thus allowing the robot 100 to determine a direction and/or location of a collision. The forward portion 301 of the body 300 acts as a single mechanical bumper with sensors 800 substantially at the two ends of the bumper for sensing movement of the bumper. When the forward portion 301 of the body 300 is compressed, the timing between the sensor events is used to calculate the approximate angle at which the robot 101 contacted the obstacle. When the forward portion 301 of the body 300 is compressed from the right side, the right bump sensor detects the bump first, followed by the left bump sensor, due to the compliance of the bumper and the bump detector geometry. This way, the bump angle can be approximated with only two bump sensors.

Since the robot 101 preferably has a compact and lightweight form, the momentum carried by the robot 101 may be lighter than a standard-size robot. Accordingly, the robot 101 preferably includes "light touch" or contactless bump sensors. For example, the robot 101 may include one or more accelerometers 458 in communication with the controller 450 (see FIG. 21) for monitoring the robot's acceleration along at least one horizontal axis. When acceleration is detected that exceeds a pre-established threshold, the robot 101 may respond as though a bumper switch had been triggered. As a result, the robot 101 may omit a traditional contact-switch type bump sensor.

In some examples, the robot 101 may utilize the accelerometer 458 as a stasis detector 720. As a benefit, processing accelerometer data for stasis detection may require only a processing rate of about 30 hertz. For example, as the robot 101 is moving over a floor, vibrations cause the accelerometer 458 to detect acceleration of a particular amplitude profile. However, when the robot 101 stops moving, because of either a normal state or it has been blocked by an obstacle, the amplitude of the vibrations detected by the accelerometer 458 decrease accordingly. Therefore, the robot 101 can respond to such decreased acceleration according to a stasis-escape behavior, for example. By monitoring a single accelerometer 458 for purposes of both bump detection and/or stasis detection, the robot 101 may omit bump switches and/or other stasis detection hardware, thus potentially requiring less space aboard the robot 101.

Figure 26:
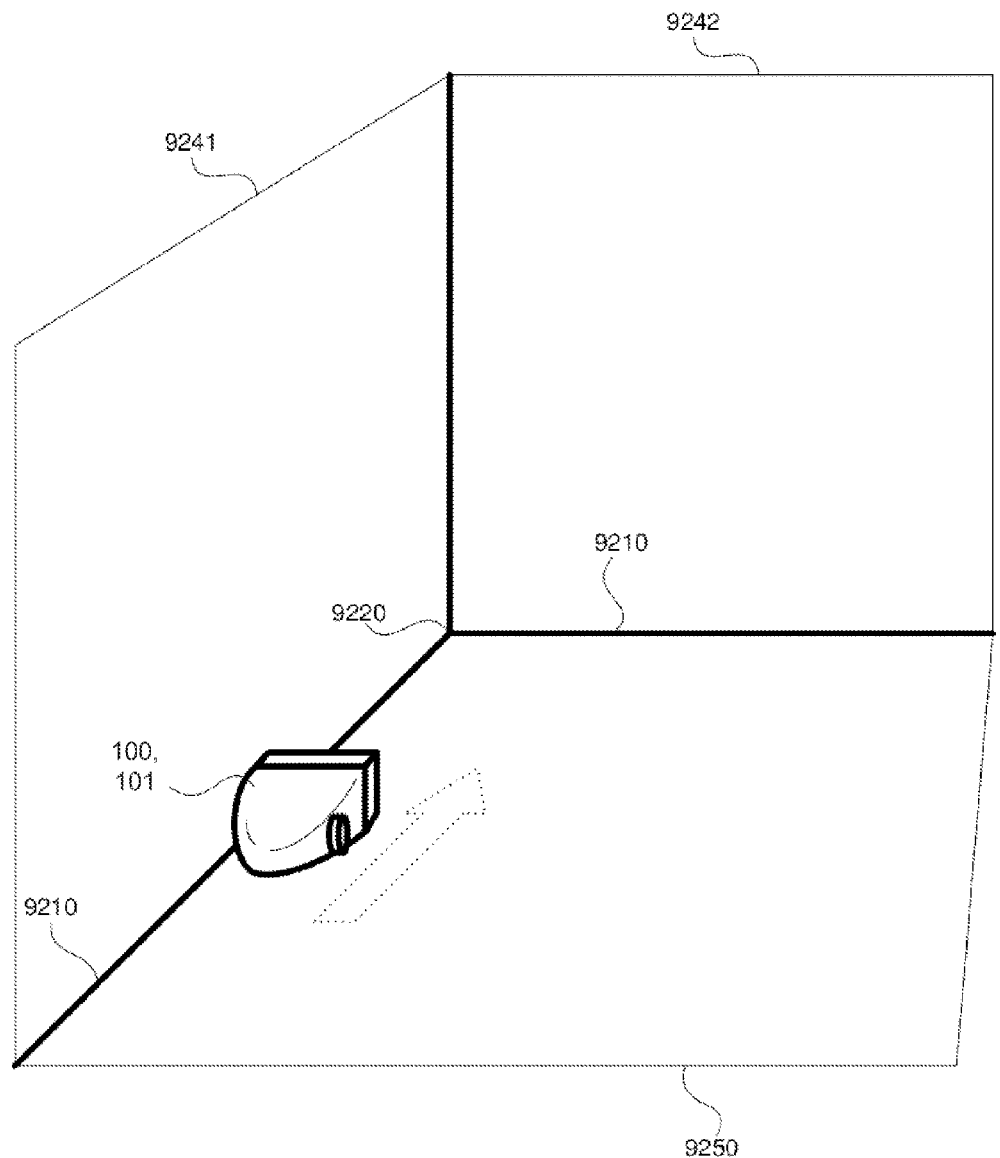
FIG. 26 is an oblique view of a compact cleaning robot having rectangular form traversing along a wall edge.
Figure 28:
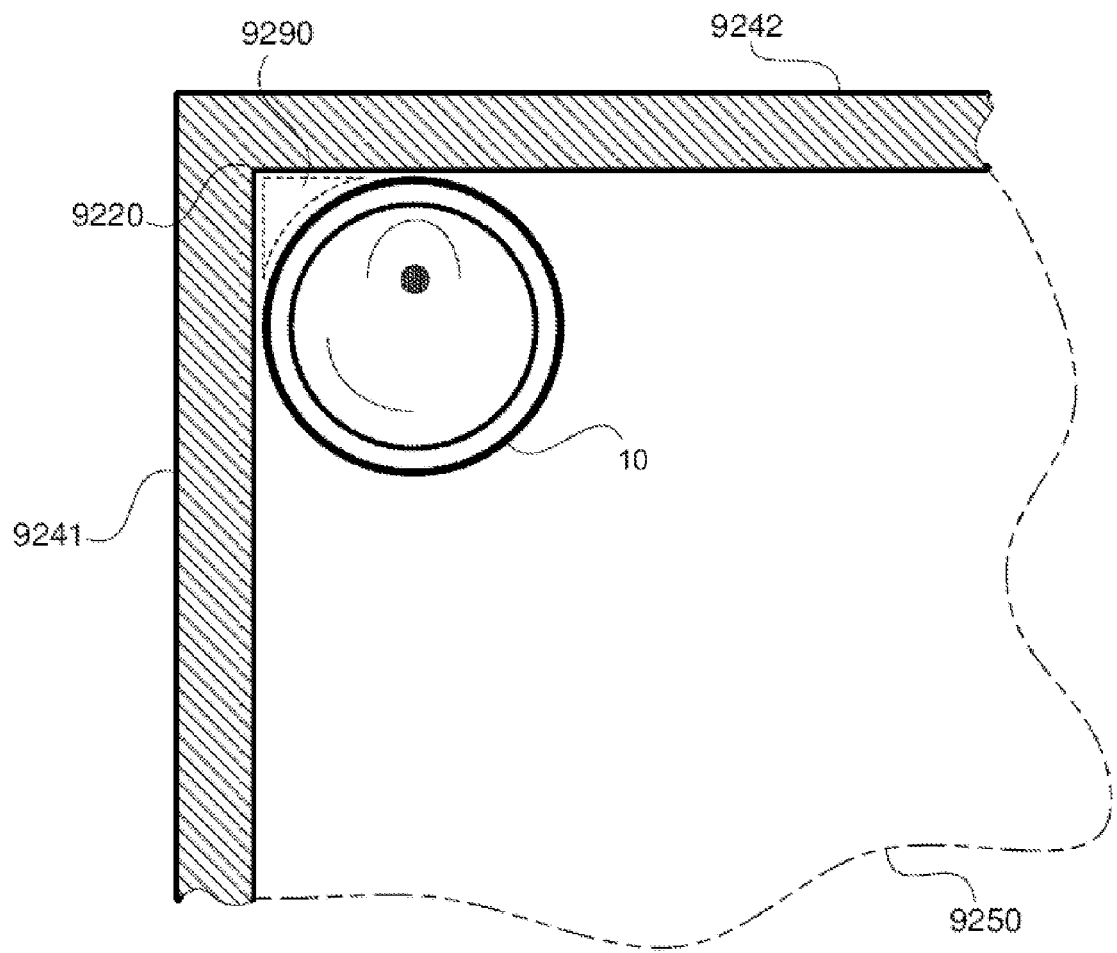
FIG. 28 is a plan view of a round robot navigating into a wall corner, illustrating a gap that the round robot cannot traverse.
Figure 29:
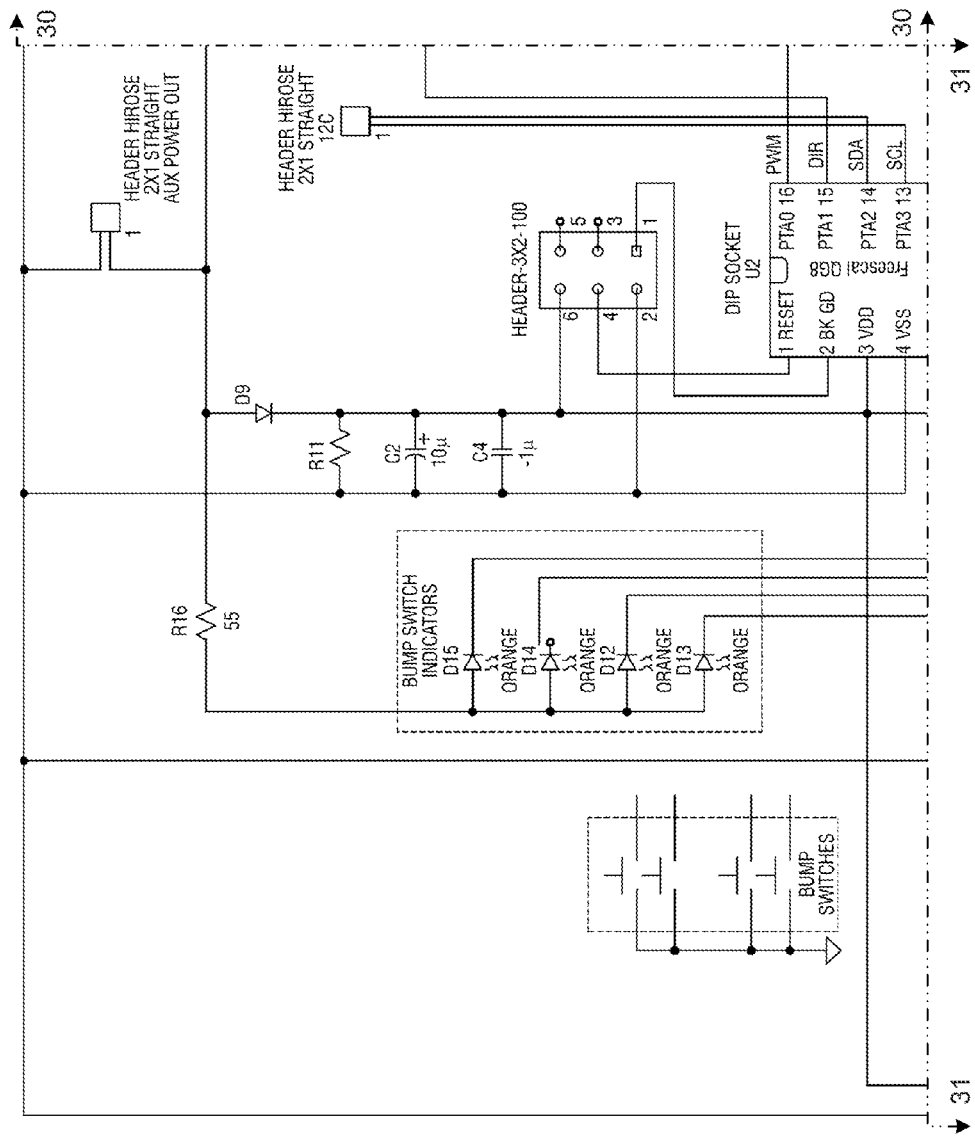
FIG. 29-32 collectively provide a schematic view of a control circuit for an autonomous coverage robot.
Figure 30:
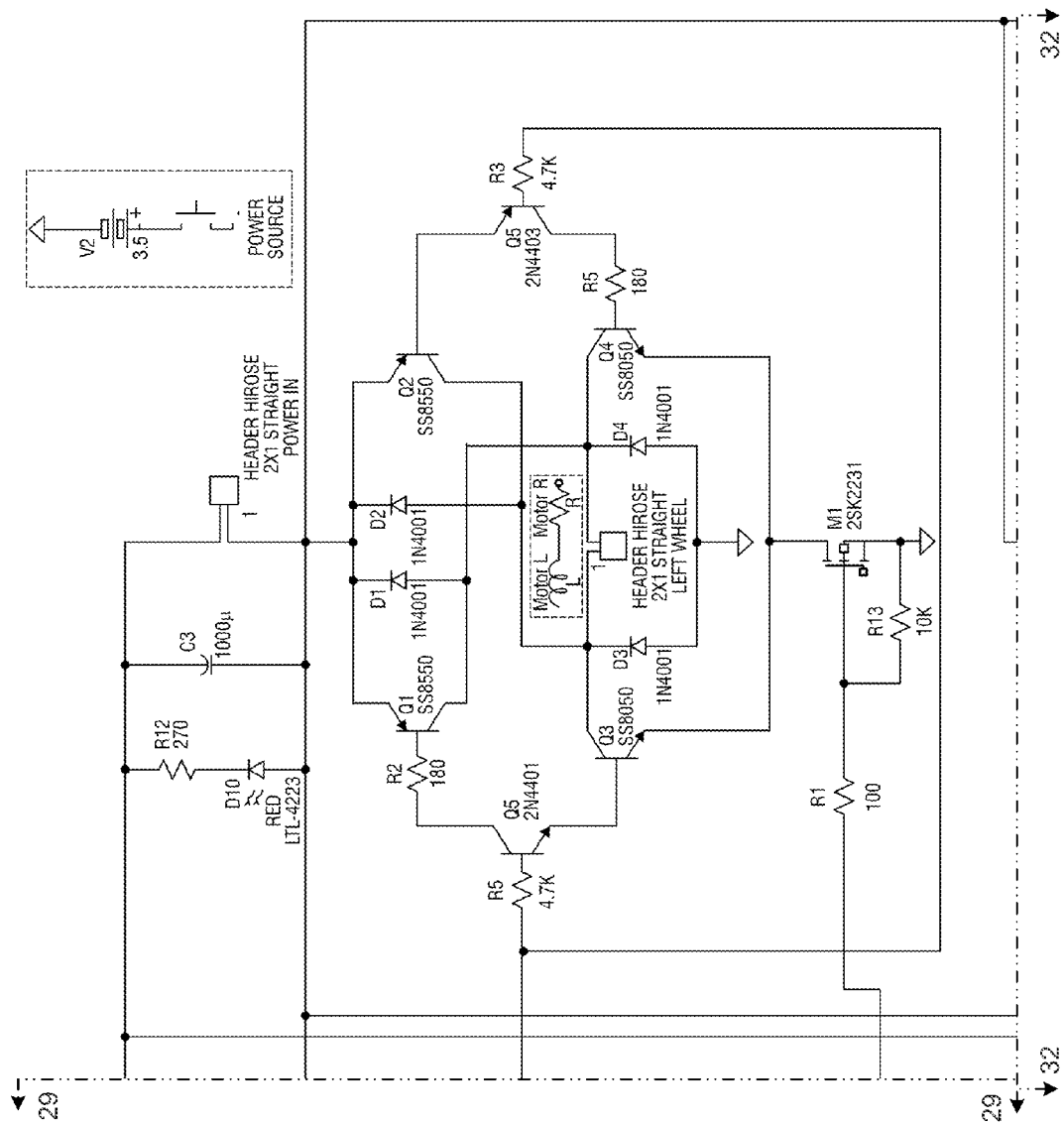
Figure 31:
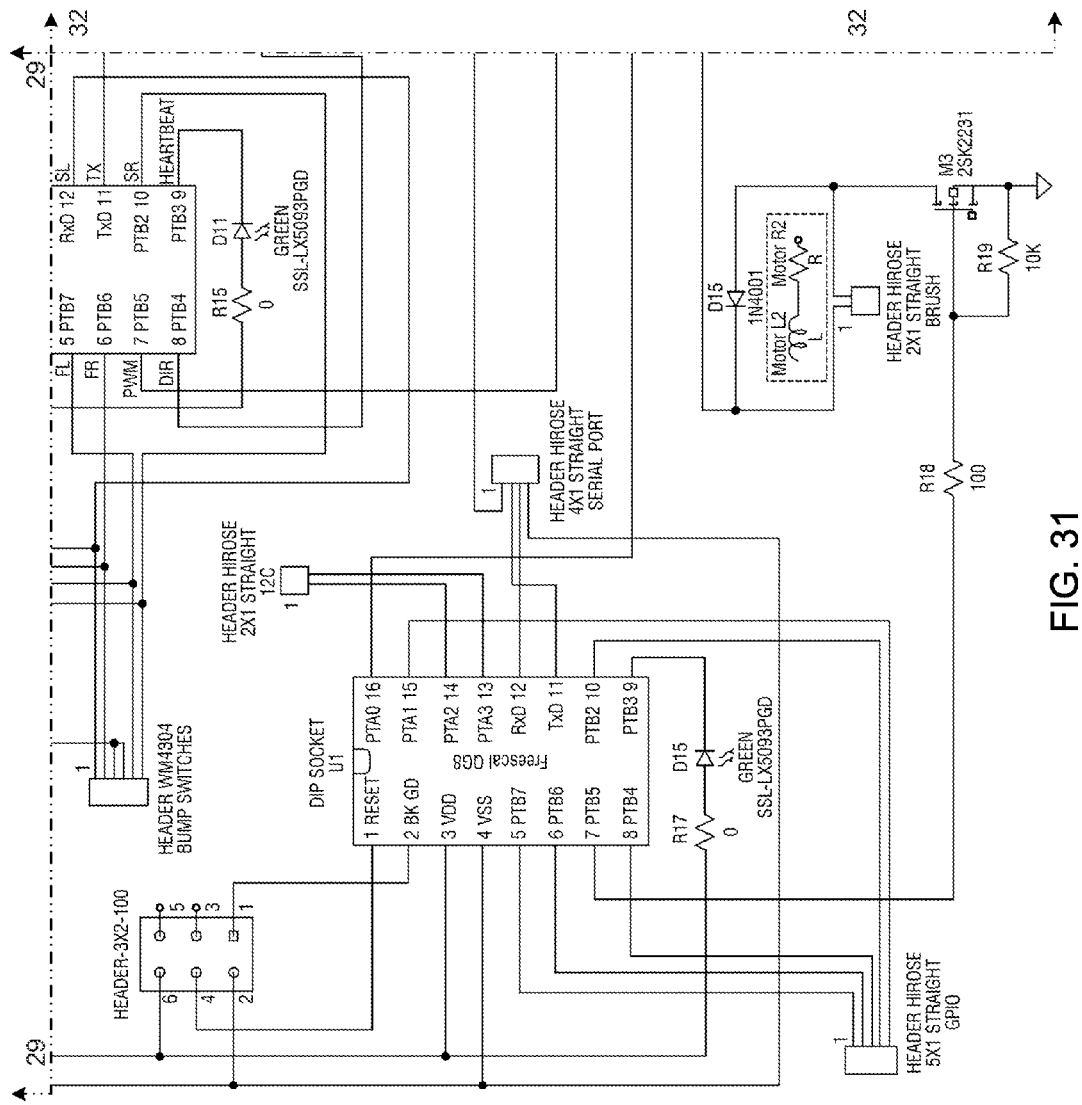
Figure 32:
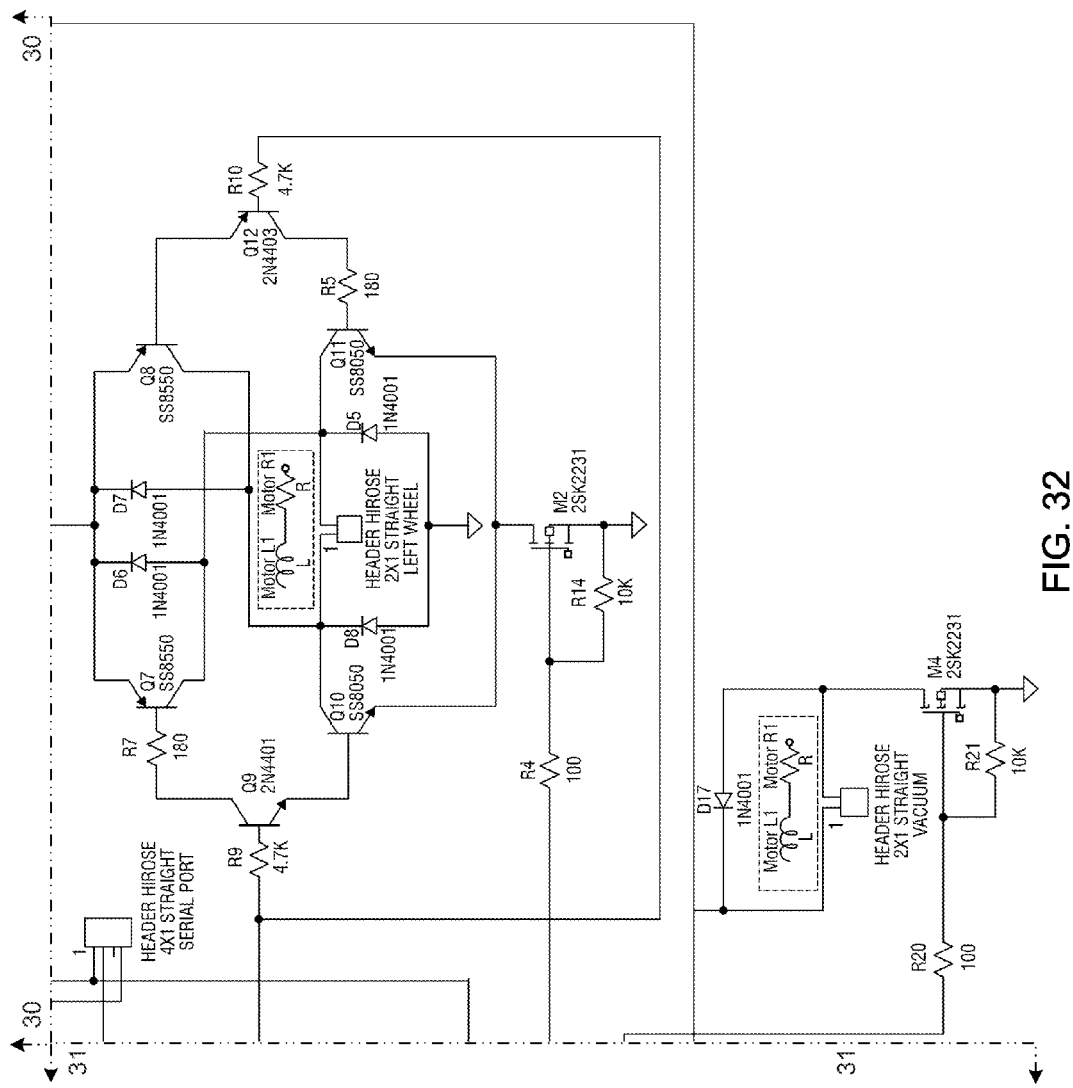

Referring to FIGS. 26-28, the robot 100, 101 can navigate over floor surfaces such as tile, hardwood or carpeting, while collecting debris from the floor within the debris chamber/bin 610. When the robot 100, 101 navigates into a corner, the front roller brush 510 and the end brushes 540 or the side roller brushes 550, 560, respectively, can effectively clean an area that is flush up against the sides of the corner. In comparison, a round-outline robot 10, such as illustrated in FIG. 28, can approach a corner 9220 but cannot move flush against the walls 9241, 9242 intersecting at the corner 9220. As a result, the round-outline robot 10 cannot effectively clean the wedge-shaped area 9290 abutting the corner 9290. As illustrated in FIG. 26, the robot 100, 101 can navigate along a straight path while remaining substantially flush against a wall edge 9210 where a wall 9421 intersects the floor 9250. The robot 100, 101 preferably includes one or more bump sensors 800, 1800 disposed or active within the front portion 210 of the chassis 200; and as the robot 100, 101 taps against the wall 9241, the robot 100, 101 can adjust its heading so as to travel substantially parallel to the wall 9241, for example.

The operation of the robot 101 is preferably controlled by a microcontroller 450, such as a FREESCALE™ QG8 or other microcontroller suitable to receive input from the robot's sensors and operate the motors or other output devices of the robot 101. As illustrated in FIGS. 29-32, for example, the microcontroller 450 receives input from bump sensor 800 and outputs control signals to the drive motors 412, 422 coupled to the right and left drive wheels 410, 420. Alternatively, a microprocessor or other control circuitry may be used. The robot 101 may execute behavior-based control software; or may operate according to simple, single-threaded control loops, inter alia.

The rectangular outline of the front portion 210 of the chassis 200 may cause the corners thereof to collide with obstacles which might not be detected by bump sensors or cliff sensors, in contrast to round-outline robots that can rotate freely without such risk, the robot 101 preferably responds to bumps detected while rotating in place by halting the rotation and backing up directly in reverse. As a result, the robot 101 may be less likely to become inextricably wedged or stuck, notwithstanding the square corners of the front portion 210 of the chassis 200. Alternatively, the robot 101 may behave in accordance with control software generally similar to the ROOMBA™ or SCOOBA™ robots, as examples.

In accordance with a further example, the robot 100, 101 may automatically return to a cradle or base station for storage after completing a cleaning cycle. The robot 100, 101 may also include an electrical interface for recharging on-board batteries. Additionally, the cradle or base station may include a receptacle positioned below a "home" position of the robot 100, 101. When the robot 100, 101 interfaces the cradle and stops at the home position, the robot 100, 101 may automatically actuate the bin-cover release 630 and evacuate the debris from the debris chamber 610 into the cradle's receptacle positioned below the robot 100, 101.

In robot implementations using the omni-directional receiver 900, the base station may include an omni-directional beam emitter and two navigational field emitters. The robot 100 may maneuver towards base station by detecting and advancing along one of the lateral field edges of the overlapping fields aligned with a docking direction until docked with the base station. The robot 100 may detect the emissions of base station with the omni-directional receiver 900 and maneuver to detect an outer lateral field edge of at least one field emission. The robot 100 may then advance along the outer lateral field edge to the aligned lateral field edge of the overlapping fields. Upon detecting the aligned lateral field edge, the robot 100 advances along the aligned lateral field edge until docked with base station.

Figure 33:
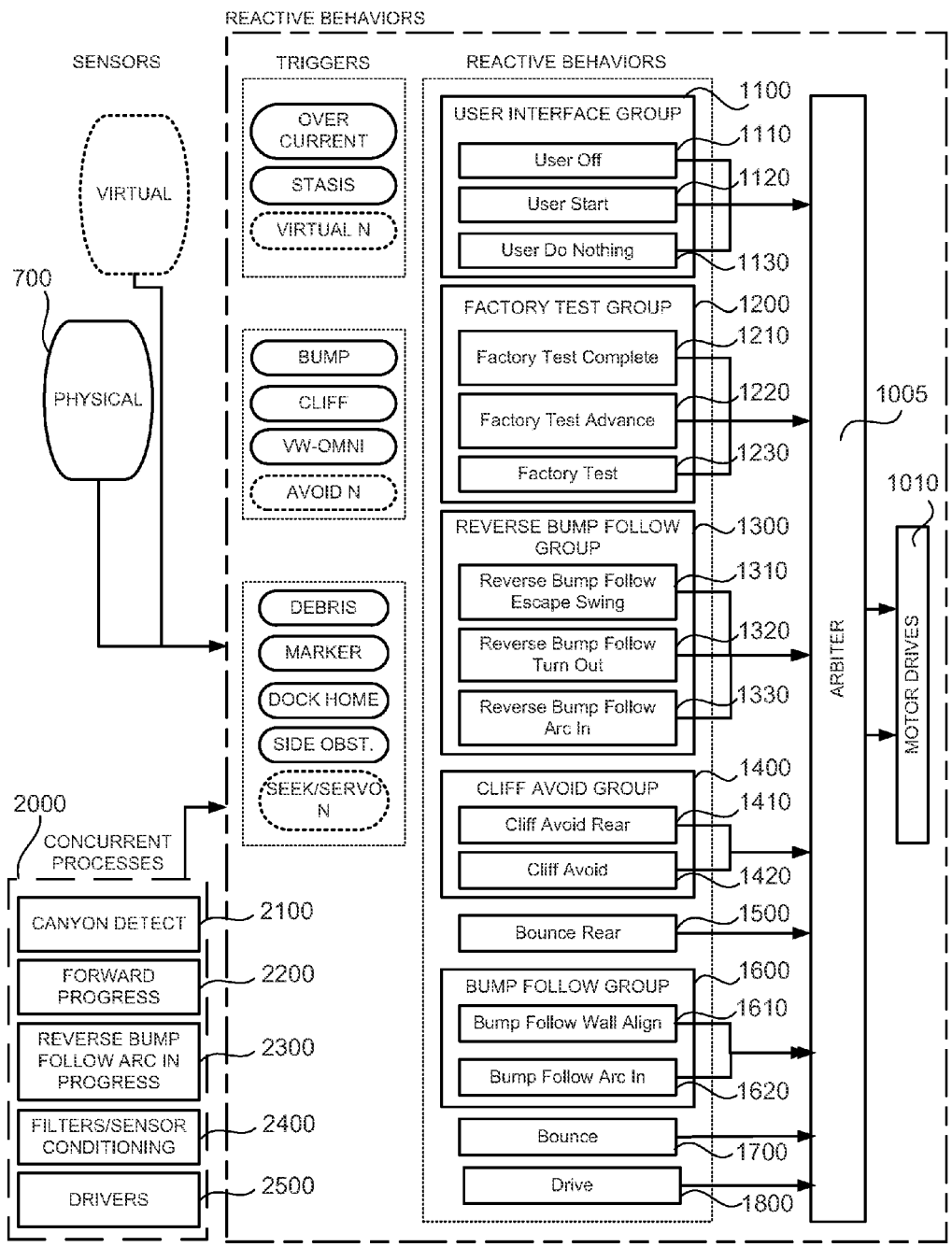
FIG. 33 is a schematic view of a software architecture for a behavioral system of autonomous coverage robot.

FIG. 33 is a block diagram showing a behavioral software architecture within the controller 450. The behavioral software architecture includes goal-oriented behaviors. The robot 100, 101 employs a control and software architecture that has a number of behaviors that are executed by an arbiter 1005 in the controller 450. The arbiter 1005 executes commands on motor drives 1010 in communicates with each drive motor 412, 422. A behavior is entered into the arbiter 1005 in response to a sensor event. In one implementation, all behaviors have a fixed relative priority with respect to one another. The arbiter 1005 (in this case) recognizes enabling conditions, which behaviors have a full set of enabling conditions, and selects the behavior having the highest priority among those that have fulfilled enabling conditions. The diagram shown in FIG. 33 does not necessarily reflect the (fixed) priority hierarchy of the robot 100, 101. In order of decreasing priority, the behaviors are generally categorized as escape and/or avoidance behaviors (such as avoiding a cliff or escaping a corner) and working behaviors (e.g., wall following, bouncing, or driving in a straight line). Movement of the robot 100, 101, if any, occurs while a behavior is arbitrated. If more than one behavior is in the arbiter 1005, the behavior with a higher priority is executed, as long as any corresponding required conditions are met. For example, a cliff avoiding behavior 1400 will not be executed unless a cliff has been detected by a cliff detection sensor, but execution of the cliff avoiding behavior 1400 always takes precedence over the execution of other behaviors that also have satisfied enabling conditions.

The reactive behaviors have, as their enabling conditions or triggers, various sensors and detections of phenomena, but, in general, not (arbitrary) states of a sequence. As shown in FIG. 33, these include sensors for obstacle avoidance and detection, such as cliff sensors 710, stasis detector 720, side proximity sensor 730, bump sensor 800, and/or an omni-directional receiver 900 (e.g., for detection of a virtual wall signal (which may instead be considered a coverage trigger)). Sensors of these types are monitored and conditioned by filters, conditioning, and their drivers, which can generate the enabling conditions as well as record data that helps the behavior act predictably and on all available information (e.g., conversion to one-bit "true/false" signals, recording of likely angle of impact or incidence based on strength or time differences from a group of sensors, or historical, averaging, frequency, or variance information).

Actual physical sensors may be represented in the architecture by "virtual" sensors synthesized from the conditioning and drivers. Additional "virtual" sensors that are synthesized from detectable or interpreted physical properties, proprioceptive or interpreted upon the robot 100, 101, such as over-current of a motor, stasis or stuck condition of the robot 100, 101, battery charge state via coulometry, and other virtual sensors "virtual N."

In some implementations, the robot 100 includes the following behaviors listed in priority order from high to low: 1) User Interface Group 1100, 2) Factory Test Group 1200, 3) Reverse Bump Follow Group 1300, 4) Cliff Avoid Group 1400, 5) Bounce Rear 1500, 6) Bump Follow Group 1600, 7) Bounce 1700, and 8) Drive 1800. A behavior group refers to a set of behaviors that work together to implement an overall behavior. For example, the "User Interface Group" behavior is a set of three behaviors that handles the user interface while the robot is at rest.

Figure 17:
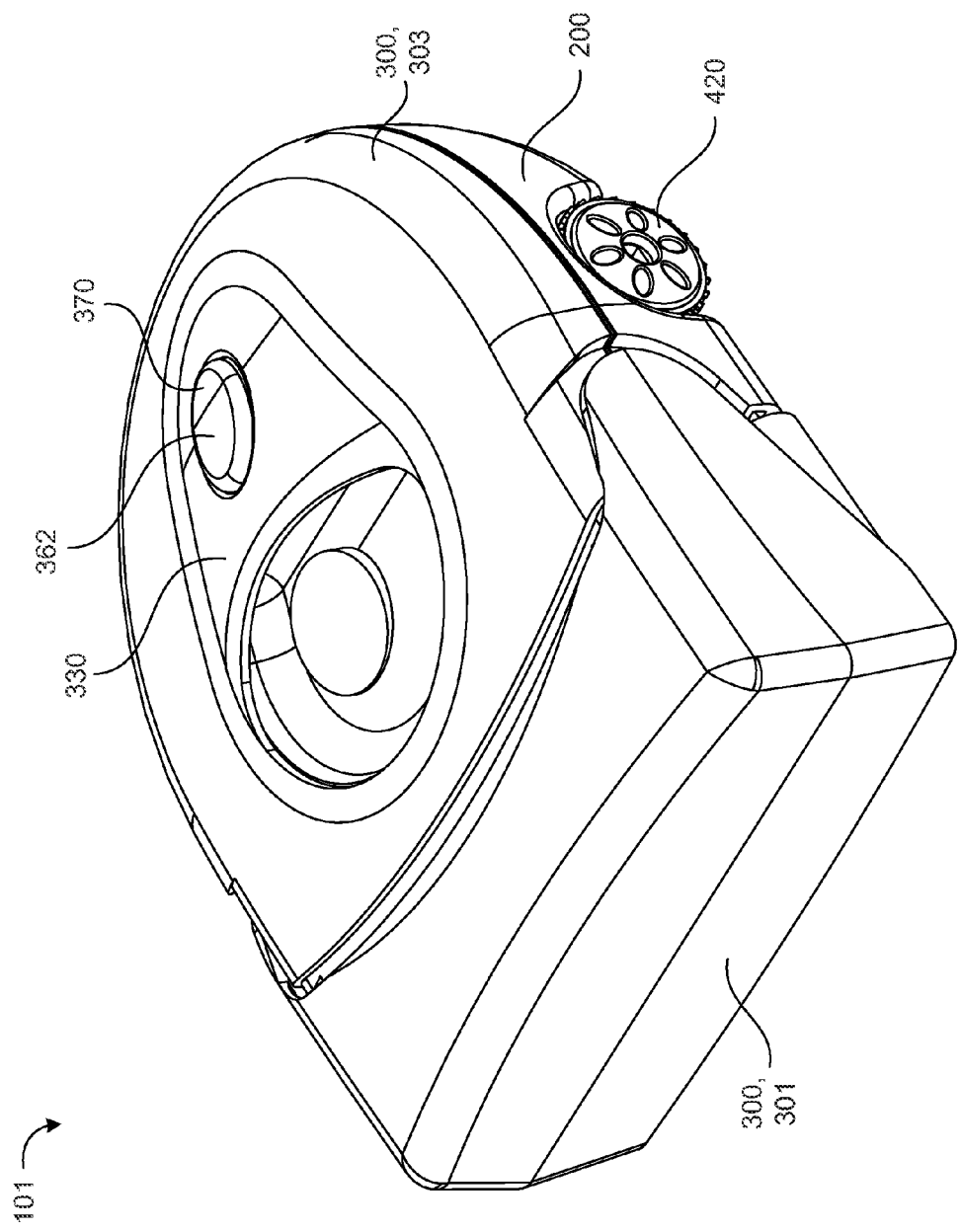
FIG. 17 is a top perspective view of a compact autonomous coverage robot.

The robot may include a user interface 370, which is a single clean/power button in the examples shown in FIGS. 1 and 17, for allowing a user to interact with the robot 100. The following sub-behaviors of the User Interface Group behavior 1100, prioritized from high to low, execute the user interface 370 implemented as a single clean/power button: 1) User Off 1110, 2) User Start 1120, and 3) User Do Nothing 1130. The following sub-behaviors of the Factory Test Group behavior 1200, prioritized from high to low, implement a factory test mode for quality control purposes: 1) Factory Test Complete 1210, 2) Factory Test Advance 1220, and 3) Factory Test 1230.

The following sub-behaviors, prioritized from high to low, implement the Reverse Bump Follow escape behavior 1300: 1) Reverse Bump Follow Escape Swing 1310, 2) Reverse Bump Follow Turn Out 1320, and 3) Reverse Bump Follow Arc In 1330. Due to the rectangular shape of the front portion 210 of the chassis 200, it is possible for the robot 100 to drive into a space that is too narrow to turn around in (e.g., like a parking space). These confinement areas are referred to as canyons. The term "canyon" refers generically to any narrow confinement source. If a cliff is similarly confining the robot 100 to a narrow space, this is referred to as a plank. Since the strategy for escaping these confinement obstacles is the same, the directional cliff sensor and bumper sensor data is aggregated into a set of four "directional confinement" sensors which are the basis for the discussion below. The four sensors are front-left, front-right, rear-left and rear-right. The direction of a reverse bump follow is clockwise if the Reverse Bump Follow Arc In behavior 1330 is driving the robot 100 backward while rotating clockwise. The direction of a reverse bump follow is counterclockwise if the Reverse Bump Follow Arc In behavior 1330 is driving the robot 100 backward while rotating counterclockwise.

The Reverse Bump Follow Escape Swing behavior 1310 causes the robot 100 to turn in place with enough angular progress to deduce that the presence of a canyon. The activation condition for the Reverse Bump Follow Escape Swing behavior 1310 is evaluated at the end of the Reverse Bump Follow Turn Out behavior 1320. After the Reverse Bump Follow Escape Swing behavior 1310 is armed, it executes once and then disables itself until armed again by the Reverse Bump Follow Turn Out behavior 1320. At the start of the Reverse Bump Follow Escape Swing behavior 1310, an escape angle is set to a random number between 120 and 160 degrees. The robot 100 then turns in place in the opposite direction of the reverse bump follow direction until the escape angle is achieved. If any rear directional confinement sources appear while turning in place, the robot 100 moves forward to avoid them. If a front directional confinement source is encountered, the turn in place is aborted. After completion of the turn in place, the success of the escape is determined in the following order. First, if the turn in place was aborted due to detection of a front confinement source, the angular progress of the turn in place is compared to a minimum escape angle which is computed by generating a random number between 80 and 120 degrees. If the angular progress does not exceed this amount, a similar maneuver for the Reverse Bump Follow Turn Out behavior 1320 is performed. This is done to return the robot 100 back to an orientation conducive to continuing the reverse bump follow. Second, if the turn in place was aborted due to detection of a front confinement source, and the angular progress exceeded the minimum escape angle computed above but fell short of the escape angle computed at the beginning of the behavior, the following is done. The reverse bump follow activation is cancelled, and a forward bump follow is triggered if the confinement source that stopped the turn in place was a bump. This improves the chances that the robot 100 will find its way out of a tight spot without detecting a new canyon and retriggering the reverse bump follow. Third, if the turn in place completed due to achieving the escape angle computed at the start of the behavior, the reverse bump follow activation is cancelled.

The Reverse Bump Follow Turn Out behavior 1320 attempts to orient the robot 100 relative to an obstacle such that forward progress can be made while arcing toward the obstacle again. Simply turning in place as a circular robot would is not sufficient for the robot 100 since the rectangular forward portion 210 of the chassis 200 would, at some point, hit the obstacle and prevent the robot 100 from turning in place further. To avoid this problem, the robot 100 instead follows a tight arc to maintain space from the obstacle. The Reverse Bump Follow Turn Out behavior 1320 begins after the backing up along an arc that is performed in the Reverse Bump Follow Arc In behavior 1330 finishes as a result of the rear bumper getting activated. The first task of the Reverse Bump Follow Turn Out behavior 1320 is to release the bumper 300 from the rear hit. This is done by driving the robot 100 forward until the bumper 300 is released. In the course of doing this, front confinement sources are handled in the following way. A front-left confinement source causes the robot 100 to turn clockwise. A front-right confinement source causes the robot 100 to turn counterclockwise. After the bumper 300 is released, the robot 100 computes a constrained random arc radius and angular progress that it must travel in the forward direction in order to reorient the robot 100 for the next iteration of the Reverse Bump Follow Arc In behavior 1330. The robot 100 travels along this arc until the computed angular progress is achieved. While doing this, the robot 100 responds to the front confinement sensor 710, 730, 800 (e.g., cliff sensor 710, proximity sensor 730, and/or bump sensor 800) on the opposite side of the robot 100 to the obstacle being followed. When this is detected, the robot 100 turns in place in the same rotational direction as the arc it is following. The Reverse Bump Follow Turn Out behavior 1320 ends when the computed angular progress is achieved or the front confinement sensor 710, 730, 800 on the same side of the robot 100 as the obstacle being followed is triggered. At the end of the behavior, a random number generator is used to decide whether or not to trigger a Reverse Bump Follow Escape Swing behavior 1310. At a minimum, the probability of triggering the Reverse Bump Follow Escape Swing behavior 1310 will be about 20%. If the angular progress of the Reverse Bump Follow Turn Out behavior 1320 was between about 2 and about 5 degrees, the probability increases to about 50%. If the angular progress is less than 2 degrees, the probability is about 100%.

The Reverse Bump Follow Arc In behavior 1330 attempts to make forward progress while keeping an obstacle close to one side of the robot 100 by driving backward in an arc that begins shallow and gets progressively more severe with elapsed time in the behavior. The Reverse Bump Follow Arc In behavior 1330 executes when the robot 100 is in the reverse bump following mode 1300 and none of the other reverse bump follow behaviors 1310, 1320 are activated. While traveling in the arc, the robot 100 will respond to the front confinement sensor 710, 730, 800 (e.g., cliff sensor 710, proximity sensor 730, and/or bump sensor 800) on the opposite side of the robot 100 to the obstacle. It does this by turning in place in the opposite rotational direction to the arc being followed. The Reverse Bump Follow Arc In behavior 1330 ends when a rear confinement sensor 710, 800 (e.g., cliff sensor 710 and/or bump sensor 800) is triggered or the arc has made over 120 degrees of angular progress.

The Cliff Avoid Group behavior 1400 is a group of escape behaviors that includes the following sub-behaviors, prioritized from high to low: 1) Cliff Avoid Rear 1410, and 2) Cliff Avoid 1420. Referring to FIG. 4, in preferred implementations, the robot 100 has four cliff sensors 710 positioned at the front-right, front-left, rear-right and rear-left extremes of the robot 100. The front-right and front-left cliff sensors 710A, 710B detect when the either of the respective front corners of the robot 100 move over a cliff. Since the drive system 400 is positioned rearward of the cleaning assembly 500, which is located near the front edge, the robot 100 can back-up before an appreciably amount of the robot 100 moves over the cliff edge. The rear-right and rear-left cliff sensors 710C, 710D are positioned directly rearward of the respective right and left drive wheels 410, 420. As a result, the rear-right and rear-left cliff sensors 710C, 710D detect when a rearward portion of the robot 100 moves over a cliff edge before the drive wheels 410, 420 move over the cliff edge, so as to prevent driving in reverse at angle off of a cliff. If the robot 100 included rear cliff sensors 710 only along a center portion of the rearward portion 220 of the chassis 200, the robot 100 could drive in reverse at an angle and move a drive wheel 410, 420 over a cliff edge before detecting the cliff edge.

The Cliff Avoid Rear behavior 1410 executes whenever the rear cliff sensors 710C, 710D are triggered. Front cliffs sensors 710A, 710B are also handled in this behavior 1410 since it is higher priority than Cliff Avoid 1420. At the beginning of the Cliff Avoid Rear behavior 1410, an escape direction of clockwise or counterclockwise is selected. The decision is made in the following order. 1) If front-left cliff sensor 710B is triggered, set to clockwise. 2) If front-right cliff sensor 710A is triggered, set to counterclockwise. 3) If rear-right cliff sensor 710C is triggered, set to clockwise. 4) If rear-left cliff sensor 710D is triggered, set to counterclockwise. After the direction is set, the robot 100 turns in the specified direction along an arc that is centered on a drive wheel 410, 420. While traveling, the front cliff sensors 710 are monitored and used to alter the direction of travel as follows. If the front-right cliff sensor 710A is triggered, the robot 100 turns in place counterclockwise. If the front-left cliff sensor 710B is triggered, the robot 100 turns in place clockwise. The robot 100 continues to travel as described above until both rear cliff sensors 710C, 710D are not triggering.

The Cliff Avoid behavior 1420 only handles the front cliff sensors 710A, 710B of the robot 100 and typically executes when the robot 100 is driving forward. At the beginning of the Cliff Avoid behavior 1420, an escape direction is chosen based on which front cliff sensors 710A, 710B have been triggered. If only the front-left cliff sensor 710B is triggered, the clockwise escape direction is chosen. If only the front-right cliff sensor 710A is triggered, counterclockwise escape direction is chosen. If both front cliff sensors 710A, 710B are triggered, the escape direction is randomly selected. An escape angle is randomly chosen between about 25 and about 50 degrees. The Cliff Avoid behavior 1420 starts by backing up straight until both of the front cliff sensors 710A, 710B are not triggering. Then, the robot 100 turns in place until the escape angle is achieved. If any of the front cliff sensor 710A, 710B is retriggered as part of the turn in place, the entire Cliff Avoid behavior 1420 is retriggered and hence re-executed.

The Bounce Rear behavior 1500 runs when the bumper 300 is activated from the rear direction. This most commonly happens when the robot 100 drives backward to release the front part of the bumper 300 as part of the Bounce behavior 1700. The robot 100 drives forward until the bumper 300 is released, and then continues forward another 5 mm in order to reduce the chance that the turn in place about to be performed will not retrigger a rear bump. A rotational direction for the turn in place is decided based on the direction of the original rear bumper hit. If the hit came from the rear-right side of the robot 100, counterclockwise is chosen. If the hit came from the rear-left side of the robot 100, clockwise is chosen. If the hit was in the center part of the rear, the direction is randomly chosen. An escape angle is randomly chosen between about 10 degrees and about 200 degrees. The robot 100 turns in the chosen direction until the escape angle is achieved.

The Bump Follow Group 1600 includes the following subbehaviors prioritized from high to low: 1. Bump Follow Wall Align 1610, 2. Bump Follow Arc In 1620. Bump following is used to escape from and clean cluttered areas. It is also used to follow a wall with the goal of dispersing the robot 100 evenly through its floor space.

The Bump Follow Wall Align behavior 1610 is designed to align the side of the robot 100 with an obstacle such as a wall. If the bump-follow-direction is clockwise, the goal is to have the robot's left side against the wall. If the direction is counterclockwise, the goal is to have the robot's right side against the wall. When bump following is enabled, the Bump Follow Wall Align behavior 1610 begins when a front bump is triggered. The location of the bumper hit is used to decide how much the robot 100 should turn in place before performing another iteration of the Bump Follow Arc In behavior 1620. If the bumper 300 is triggered on the side of the bumper 300 that should not be near the obstacle, the robot 100 sets a turn in place goal of between about 25 and about 45 degrees. This larger increment saves time in the alignment process. If the bumper 300 is triggered on the side that should be near the obstacle, the robot 100 turns in place in the direction that swings the bumper 300 into the obstacle even more. The goal of this maneuver is to see if the bumper 300 tends to stay engaged or releases. If it releases, it suggests that the robot 100 is not yet at a very shallow angle to the wall, and a turn in place goal of between about 5 and about 25 degrees is selected. Otherwise, the robot 100 is probably at a shallow angle to the wall, and a turn in place goal of between about 1 and about 5 degrees is selected. If the turn in place goal was selected to be greater than 5 degrees, the robot 100 backs up until the bumper 300 is released. The robot 100 turns in place in the direction that swings the front of the robot 100 away from the obstacle until the target angle is achieved. If the bumper 300 is retriggered during the turn in place, the robot 100 backs up enough to release it.

The Bump Follow Arc In behavior 1620 runs when the bump following mode 1600 is enabled and Bump Follow Wall Align 1610 is not active. The robot 100 drives forward in a shallow arc, at first, in order to make forward progress. As more time elapses, the arc gradually tightens to bring the robot 100 back in contact with the obstacle. This allows the obstacle to be followed closely which can help the robot 100 find its way around it. If the bump follow mode 1600 was selected to maneuver through clutter, the robot 100 can continue arcing in without a bumper hit for up to about 100 degrees of angular progress. At that point, the bump follow 1600 is considered ended due to the robot escaping. If the bump follow mode 1600 was selected to help disperse the robot 100 through its space, it can continue arcing in without a bumper hit for up to about 210 degrees to allow for turning wall corners. At that point, the wall is considered lost and the bump follow behavior 1600 ends.

The Bounce behavior 1700 runs when the bumper 300 is activated from the front direction. The robot 100 drives backward until the bumper 300 is released. It then continues backward another 30 mm in order to reduce the chance that the turn in place about to be performed will not retrigger the bumper 300 from the front. This large additional clearance is required due to the rectangular shape of the forward portion of the bumper 300 creating the potential for the corner of the bumper 300 to swing into contact with the obstacle when turning in place. A rotational direction for the turn in place is decided based on the direction of the original front hit on the bumper 300. If the hit came from the front-right side of the robot 100, counterclockwise is chosen. If the hit came from the front-left side of the robot 100, clockwise is chosen. If the hit was in the center part of the front, the direction is randomly chosen. An escape angle is randomly chosen between about 10 degrees and about 200 degrees. The robot 100 turns in the chosen direction until the escape angle is achieved.

The drive behavior 1800 may run when no other behavior is active. The robot 100 drives straight until it experiences an event that triggers another behavior.

The robot 100 maintains concurrent processes 2000, "parallel" processes that are not generally considered reactive behaviors. As noted, filters and conditioning 2400 and drivers 2500, can interpret and translate raw signals. These processes are not considered reactive behaviors, and exercise no direct control over the motor drives or other actuators.

Some parallel processes 2000 are important in assisting the activation and execution of various behaviors. These processes are software finite state machines that are evaluated at a frequency of 64 Hertz, for example. The period is referred to as the processing interval.

In some implementations, the robot 100 includes a Canyon Detect process 2100, which assists in identifying canyons. A canyon is declared by monitoring four signals. Each of these signals is evaluated every processing interval. When the input signal is true, the output signal becomes true. The output signal becomes false after 100 consecutive processing intervals of the input signal being false. The four input signals are evaluated as follows: 1) The front-left cliff sensor 710B is active and the front-right cliff sensor 710A is inactive, or the rear-left cliff sensor 710D is active and the rear-right cliff sensor 710C is inactive. 2) The front-right cliff sensor 710A is active and the front-left cliff sensor 710B is inactive, or the rear-right cliff sensor 710C is active and the rear-left cliff sensor 710D is inactive. 3) The bumper 300 is depressed at the front-left side of the robot 100. 4) The bumper 300 is depressed at the front-right side of the robot 100. The processed versions of these signals are named, respectively, as follows: 1) cliff-left-held; 2) cliff-right-held; 3) bump-left-held; and 4) bump-right-held. A canyon is detected when cliff-left-held or bump-left-held are true while cliff-right-held or bump-right-held are true. When a canyon is detected, the Reverse Bump Following Group 1300 is enabled.

In some implementations, the robot 100 includes a Forward Progress process 2200. In the Forward Progress process 2200, every processing interval, the forward progress of the robot 100 is added to an accumulator while a fixed distance quantity corresponding to 1 millimeter is subtracted. When this accumulator reaches 100 millimeters, forward progress is declared to be true. The accumulator is not allowed to exceed 200 millimeters. When forward progress is true for 10 seconds, the Reverse Bump Following Group 1300 is enabled to escape the excessively cluttered environment the robot 100 is traveling in.

In some implementations, the robot 100 includes a Reverse Bump Follow Arc In Progress process 2300. While the robot 100 is in the reverse bump following mode 1300, the forward progress of each iteration of the Reverse Bump Follow Arc In behavior 1330 is fed into a low pass filter. At the beginning of a reverse bump follow, this filter is initialized to 60 millimeters. When the output falls below 50 millimeters, the arc in progress is considered poor. This triggers a toggle in the reverse bump follow direction, i.e. the side of the robot 100 where the primary obstacle is assumed to be.

Other robot details and features combinable with those described herein may be found in the following U.S. patent applications, entitled "AUTONOMOUS COVERAGE ROBOT," filed on May 9, 2008, having assigned Ser. No. 12/118,219, and published as U.S. Pat. App. Pub. 2008/0276408 A1; and "AUTONOMOUS COVERAGE ROBOT SENSING," filed on May 9, 2008, having assigned Ser. No. 12/118,250, and published as U.S. Pat. App. Pub. 2008/0281470 A1; the entire contents of the aforementioned applications are hereby incorporated by reference.

A number of implementations have been described. Nevertheless, it will be understood that various modifications may be made without departing from the spirit and scope of the disclosure. Accordingly, other implementations are within the scope of the following claims.

What is claimed is:

1. An autonomous coverage robot comprising:
a chassis having a substantially rectangular forward portion having a front edge and a substantially arcuate rearward portion defined by a radius forming a profile circle;
a rectangular bumper having a flat forward portion and flat lateral sides, the rectangular bumper disposed along the front edge of the chassis and along lateral sides of the chassis such that the rectangular bumper is about the rectangular forward portion of the chassis on three sides, the bumper movable in response to a bump in a direction of travel and in a direction perpendicular to the direction of travel;
a proximity sensor in the flat forward portion of the bumper and/or in at least one of the flat lateral sides the bumper, along a lateral side of the chassis;
bump sensors connected to the bumper, each bump sensor configured to detect movement of the bumper in a direction of travel and perpendicular to the direction of travel;
a drive system along the rearward portion of the chassis, the drive system comprising right and left differentially driven drive wheels along a drive axis substantially along or rearward of a parallel diameter of the profile circle;
an idler wheel within the profile circle, along a transverse axis parallel to the drive axis; and
a cleaning assembly along the forward portion of the chassis such that a substantial portion of the cleaning assembly is outside of the profile circle, the cleaning assembly comprising a roller brush adjacent the front edge of the chassis, the bumper disposed about three sides of the cleaning assembly, and supported between the flat lateral sides of the rectangular bumper and the cleaning assembly cantilevered above the cleaning surface forward of the idler wheel to clean corners ahead of the robot, and the proximity sensor and the bump sensors each arranged actuatable in a sideways direction to detect a wall parallel to one of the lateral sides the flat lateral sides of the bumper ahead of the arcuate rear portion of the chassis when the robot turns about the drive axis.

2. The autonomous coverage robot of claim 1, wherein the robot has a dominant side and only one proximity sensor is disposed on the dominant side of the robot.

3. The autonomous coverage robot of claim 1, further comprising only two cliff sensors disposed along a forward portion of the robot.

4. The autonomous coverage robot of claim 1, further comprising cliff sensors suspended at respective right and left edges of the bumper.

5. The autonomous coverage robot of claim 1, further comprising a battery carried by the chassis rearward of the cleaning assembly, the battery powering the drive system and the cleaning assembly, the cleaning assembly further comprising a roller brush motor to rotate the roller brush.

6. The autonomous coverage robot of claim 5, wherein the battery is disposed between the right and left driven wheels.

7. The autonomous coverage robot of claim 1, wherein the drive axis is equal to or less than 9 cm rearward of the cleaning assembly.

8. The autonomous coverage robot of claim 1, wherein a wheelbase is defined between the drive axis and the idler wheel and the wheelbase is substantially equal to or greater than one third of the circular radius defining the profile circle.

9. The autonomous coverage robot of claim 1, wherein the bump sensors detect bumper movement independently in the direction of travel and in the direction perpendicular to the direction of travel, each bump sensor activatable in each direction without activation in the remaining direction.

10. An autonomous coverage robot comprising:
a chassis having a substantially rectangular forward portion having a front edge and a substantially arcuate rearward portion defined by a radius forming a profile circle;
a rectangular bumper having a flat forward portion and flat lateral sides, the rectangular bumper disposed along the front edge of the chassis and along lateral sides of the chassis such that the rectangular bumper is about the rectangular forward portion of the chassis on three sides, the bumper movable in response to a bump in a direction of travel and in a direction perpendicular to the direction of travel;
a proximity sensor in the flat forward portion of the bumper and/or in at least one of the flat lateral sides the bumper, along a lateral side of the chassis;
bump sensors connected to the bumper, each bump sensor configured to detect movement of the bumper in a direction of travel and perpendicular to the direction of travel;
a drive system along the rearward portion of the chassis, the drive system comprising right and left differentially driven drive wheels along a drive axis substantially along or rearward of a parallel diameter of the profile circle;
an idler wheel within the profile circle, along a transverse axis parallel to the drive axis;
a cleaning assembly along the forward portion of the chassis such that a substantial portion of the cleaning assembly is outside of the profile circle, the cleaning assembly comprising a roller brush adjacent the front edge of the chassis, the bumper disposed about three sides of the cleaning assembly, and supported between the flat lateral sides of the rectangular bumper and the cleaning assembly cantilevered above the cleaning surface forward of the idler wheel to clean corners ahead of the robot, and the proximity sensor and the bump sensors each arranged actuatable in a sideways direction to detect a wall parallel to one of the lateral sides the flat lateral sides of the bumper ahead of the arcuate rear portion of the chassis when the robot turns about the drive axis,
a battery carried by the chassis rearward of the cleaning assembly, the battery powering the drive system and the cleaning assembly, the cleaning assembly further comprising a roller brush motor to rotate the roller brush, and
a bin rearward of the cleaning assembly to receive debris agitated by the cleaning assembly, wherein the center of gravity of the robot is between the drive axis and the idler wheel, the center of gravity of the robot including a variable mass of debris within the bin, a mass of the roller brush motor, and a mass of the battery.

11. The autonomous coverage robot of claim 10, wherein the drive system further comprises right and left drive motors to drive the respective right and left driven wheels and the center of gravity of the robot is forward of the drive axis.

12. An autonomous coverage robot comprising:

a chassis having a substantially rectangular forward portion having a front edge and a substantially arcuate rearward portion defined by a radius forming a profile circle;

a rectangular bumper along the front edge of the chassis and along lateral sides of the chassis, the bumper movable in response to a bump;

a proximity sensor in the bumper;

bump sensors connected to the bumper, each bump sensor configured to detect movement of the bumper in a direction of travel and a direction perpendicular to the direction of travel;

a bumper guide that guides the bumper relative to the bump sensors to detect bumper movement independently in the direction of travel and in the direction perpendicular to the direction of travel and capable of detection in each direction without activation in the remaining direction;

a drive system comprising right and left differentially driven drive wheels along a drive axis extending through the rearward portion of the chassis;

an idler wheel along a transverse axis parallel to the drive axis; and a cleaning assembly along the forward portion of the chassis such that a substantial portion of the cleaning assembly is outside of the profile circle, the cleaning assembly comprising a roller brush rearward of the bumper, the cleaning assembly cantilevered above the cleaning surface forward of the idler wheel to clean corners ahead of the robot, and the proximity sensor and the bump sensors each arranged to detect a wall parallel to one of the lateral sides of the chassis.

13. The autonomous coverage robot of claim 12, wherein the robot has a dominant side and only one proximity sensor is disposed on the dominant side of the robot.

14. The autonomous coverage robot of claim 12, further comprising only two cliff sensors disposed along a forward portion of the robot.

15. The autonomous coverage robot of claim 12, further comprising two cliff sensors suspended at respective right and left edges of the bumper.

16. The autonomous coverage robot of claim 12, further comprising a battery carried by the chassis rearward of the cleaning assembly, the battery powering the drive system and the cleaning assembly, the cleaning assembly further comprising a roller brush motor to rotate the roller brush.

17. The autonomous coverage robot of claim 16, wherein the battery is disposed between the right and left driven wheels.

18. The autonomous coverage robot of claim 12, wherein the bumper is movable in response to a bump in a direction of travel and in a direction perpendicular to the direction of travel.

19. The autonomous coverage robot of claim 12, wherein the bump sensors detect bumper movement independently in the direction of travel and in the direction perpendicular to the direction of travel, each bump sensor activatable in each direction without activation in the remaining direction.

20. The autonomous coverage robot of claim 12, wherein the bumper guide is defined in a portion of the chassis.

21. The autonomous coverage robot of claim 12, wherein the bumper guide influences a direction of movement of the rectangular bumper under displacement.

22. The autonomous coverage robot of claim 21, wherein the bumper guide translates rotational forces on the rectangular bumper into translation of the rectangular bumper.

23. The autonomous coverage robot of claim 12, wherein the bump sensors are disposed at the corners of the substantially rectangular forward portion of the chassis, with at least one of the bump sensors disposed on each side of each corner.

* * * * *

UNITED STATES PATENT AND TRADEMARK OFFICE
CERTIFICATE OF CORRECTION

PATENT NO. : 8,370,985 B2  
APPLICATION NO. : 13/245118  
DATED : February 12, 2013  
INVENTOR(S) : Mark Steven Schnittman et al.

It is certified that error appears in the above-identified patent and that said Letters Patent is hereby corrected as shown below:

In the Claims:

Claim 1, column 27, line 41, after "chassis," delete ", the bumper disposed about three sides of the cleaning assumbly,";

Claim 1, column 27, line 43, after "bumper and" delete "the cleaning assembly";

Claim 1, column 27, line 47, after "each" delete "arranged";

Claim 1, column 27, line 48, after "parallel to" delete "one of the lateral sides".

Signed and Sealed this  
Ninth Day of July, 2013

Teresa Stanek Rea  
*Acting Director of the United States Patent and Trademark Office*